US 6,564,730 B2

(12) United States Patent
Crabb et al.

(10) Patent No.: US 6,564,730 B2
(45) Date of Patent: May 20, 2003

(54) SEED PLANTER APPARATUS AND METHOD

(75) Inventors: Richard J. Crabb, Naperville, IL (US); Guntis Ozers, Woodridge, IL (US); David N. Slowinski, Naperville, IL (US); Chad M. Johnson, Lockport, IL (US); Donald Johnson, Lockport, IL (US); Lisle J. Dunham, Downers Grove, IL (US); John F. Stufflebeam, Romeoville, IL (US); Thomas A. Olson, Bolingbrook, IL (US); Stephen D. Berry, Plainfield, IL (US); Thomas Brown, Romeoville, IL (US); Gerald J. Tiedt, Willow Springs, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/025,719

(22) Filed: Dec. 17, 2001

(65) Prior Publication Data

US 2002/0050238 A1 May 2, 2002

Related U.S. Application Data

(63) Continuation of application No. 09/527,160, filed on Mar. 17, 2000, now Pat. No. 6,374,759, and a continuation-in-part of application No. 08/702,294, filed on Aug. 20, 1996, and a continuation-in-part of application No. 08/700,214, filed on Aug. 20, 1996, and a continuation-in-part of application No. 08/700,225, filed on Aug. 20, 1996, and a continuation-in-part of application No. 08/700,217, filed on Aug. 20, 1996, and a continuation-in-part of application No. 08/700,222, filed on Aug. 20, 1996, and a continuation-in-part of application No. 08/581,444, filed on Dec. 29, 1995.

(51) Int. Cl.⁷ .................................. A01C 7/04
(52) U.S. Cl. .................... 111/185; 111/900; 221/211
(58) Field of Search .......................... 111/185, 184, 111/183, 177, 200, 900; 221/211, 266, 264

(56) References Cited

U.S. PATENT DOCUMENTS

| 1,331,235 | A | 2/1920 | Bristow |
| 1,591,637 | A | 7/1926 | Matheson |
| 1,651,605 | A | 12/1927 | Kuhn et al. |
| 2,723,742 | A | 11/1955 | Marshall |
| 2,880,906 | A | 4/1959 | Probasco |

(List continued on next page.)

FOREIGN PATENT DOCUMENTS

| DE | 25 17 758 A1 | 11/1976 |
| EP | 0 140 701 A2 | 5/1985 |

(List continued on next page.)

OTHER PUBLICATIONS

Four Photographs of Nodet and Deere Seed Meters, 1994–95.
Brochure. Maxemerge Plus Planters: Strength, Accuracy, and Convenience. Design by John Deere of Deere & Company.

(List continued on next page.)

Primary Examiner—Christopher J. Novosad
(74) Attorney, Agent, or Firm—Rebecca Henkel

(57) ABSTRACT

A planter apparatus includes a seed meter including a housing assembly with a cover releasably connected to a shell. The housing assembly includes at least one opening formed therein adjacent a seed discharge area to promote the release of seeds from a disc rotatably attached to the housing assembly. The disc divides an interior of the housing assembly to include a vacuum chamber and a seed chamber. The disc including a plurality of openings formed adjacent a periphery of the disc. The planter apparatus may also include a singulator assembly having rotatably spools, a rotatable chute door, a disc having clusters of openings for simultaneous release, and a one-piece baffle.

13 Claims, 59 Drawing Sheets

U.S. PATENT DOCUMENTS

| | | |
|---|---|---|
| 3,156,201 A | 11/1964 | Tweedale |
| 3,412,908 A | 11/1968 | Ferrault |
| 3,434,437 A | 3/1969 | Mark et al. |
| 3,533,535 A | 10/1970 | Knapp |
| 3,552,601 A | 1/1971 | Hansen et al. |
| 3,596,615 A | 8/1971 | Fisher |
| 3,608,787 A | 9/1971 | Grataloup |
| 3,627,050 A | 12/1971 | Hansen et al. |
| 3,659,746 A | 5/1972 | Winslow |
| 3,680,737 A | 8/1972 | Zagotta et al. |
| 3,693,833 A | 9/1972 | Weitz |
| 3,789,575 A | 2/1974 | Bross |
| 3,796,346 A | 3/1974 | Ribouleau |
| 3,820,666 A | 6/1974 | Nye et al. |
| 3,888,387 A | 6/1975 | Deckler |
| 3,990,606 A | 11/1976 | Gugenhan |
| 3,999,690 A | 12/1976 | Deckler |
| 4,018,358 A | 4/1977 | Johnson et al. |
| 4,019,651 A | 4/1977 | Starr et al. |
| 4,029,235 A | 6/1977 | Grataloup |
| 4,047,638 A | 9/1977 | Harrer et al. |
| 4,074,830 A | 2/1978 | Adams et al. |
| 4,091,964 A | 5/1978 | Harrer |
| 4,148,414 A | 4/1979 | Parks, Jr. |
| 4,162,744 A | 7/1979 | Barker et al. |
| 4,239,126 A | 12/1980 | Dobson et al. |
| 4,241,849 A | 12/1980 | Harrer |
| 4,251,011 A | 2/1981 | Hamilton et al. |
| 4,286,530 A | 9/1981 | Conley |
| 4,314,515 A | 2/1982 | Jimenez et al. |
| 4,363,423 A | 12/1982 | Larsen |
| 4,399,757 A | 8/1983 | Maury |
| 4,403,713 A | 9/1983 | Herriau |
| 4,449,642 A | 5/1984 | Dooley |
| 4,450,979 A | 5/1984 | Deckler |
| 4,469,244 A | 9/1984 | Maury |
| 4,503,786 A | 3/1985 | Tautfest |
| 4,508,243 A | 4/1985 | Deutsch et al. |
| 4,511,061 A | 4/1985 | Gaspardo |
| 4,515,291 A | 5/1985 | Holmes |
| 4,519,525 A | 5/1985 | Wunschl et al. |
| 4,533,066 A | 8/1985 | Holmes et al. |
| 4,569,486 A | 2/1986 | Balmer |
| 4,579,251 A | 4/1986 | Gugenhan |
| 4,589,433 A | 5/1986 | Abe |
| 4,600,122 A | 7/1986 | Lundie et al. |
| 4,601,372 A | 7/1986 | Swales et al. |
| 4,613,056 A | 9/1986 | Olson |
| 4,616,577 A | 10/1986 | van der Lely |
| 4,634,855 A | 1/1987 | Friend et al. |
| 4,635,215 A | 1/1987 | Friend |
| 4,646,939 A | 3/1987 | Herriau |
| 4,650,093 A | 3/1987 | Meyer-Bosse |
| 4,664,290 A | 5/1987 | Martin et al. |
| 4,688,698 A | 8/1987 | Holland |
| 4,697,721 A | 10/1987 | Johnson et al. |
| 4,703,868 A | 11/1987 | Shaw |
| 4,705,220 A | 11/1987 | Gandrud et al. |
| 4,718,363 A | 1/1988 | Williames |
| 4,718,574 A | 1/1988 | Schoenmaekers |
| 4,793,511 A | 12/1988 | Ankum et al. |
| 4,799,291 A | 1/1989 | Ankum et al. |
| 4,836,412 A | 6/1989 | Webber et al. |
| 4,896,616 A | 1/1990 | Wintersteiger et al. |
| 4,898,108 A | 2/1990 | McDermott |
| 4,915,258 A | 4/1990 | Olson |
| 4,917,029 A | 4/1990 | Upadhyaya et al. |
| 4,924,786 A | 5/1990 | Keeton |
| 4,928,607 A | 5/1990 | Luigi |
| 4,949,869 A | 8/1990 | Ribouleau |
| 4,951,838 A | 8/1990 | Turner |
| 5,027,725 A | 7/1991 | Keeton |
| 5,058,766 A | 10/1991 | Deckler |
| 5,082,126 A | 1/1992 | Ribouleau |
| 5,143,002 A | 9/1992 | Gaspardo |
| 5,156,102 A | 10/1992 | Andersen |
| 5,161,473 A | 11/1992 | Landphair et al. |
| 5,170,909 A | 12/1992 | Lundie et al. |
| 5,325,800 A | 7/1994 | Wisor et al. |
| 5,325,801 A | 7/1994 | Fiorido |
| 5,377,867 A | 1/1995 | Schick et al. |
| 5,392,707 A | 2/1995 | Romans |
| 5,392,722 A | 2/1995 | Snipes et al. |
| 5,401,035 A | 3/1995 | Schoenmaekers |
| 5,501,366 A | 3/1996 | Fiorido |
| 5,517,932 A | 5/1996 | Ott et al. |
| 5,522,328 A | 6/1996 | Long |
| 5,535,917 A | 7/1996 | Ribouleau |
| 5,542,364 A | 8/1996 | Romans |
| 5,549,060 A | 8/1996 | Schick et al. |
| 5,601,209 A | 2/1997 | Barsi et al. |
| 5,655,468 A | 8/1997 | Ledermann et al. |
| 5,720,233 A | 2/1998 | Lodico et al. |

FOREIGN PATENT DOCUMENTS

| | | |
|---|---|---|
| EP | 0 141 638 A2 | 5/1985 |
| EP | 0 141 701 A1 | 5/1985 |
| EP | 0 536 543 A1 | 4/1993 |
| FR | 1.410.390 | 8/1965 |
| FR | 2.135.702 | 12/1972 |
| FR | 2.376.607 | 8/1978 |
| GB | 802899 | 10/1958 |
| SU | 1045-834 A | 10/1983 |

OTHER PUBLICATIONS

Brochure. Planter Attachments for Maxemerge Plus, Maxemerge2, and Maxemerge Planters. Design by John Deere of Deere & Company, Jan. 1997.

Brochure. New Planter . . . New Sales Advantages. Design by John Deere of Deere & Company, May 1995.

Brochure. Dickey–John High Rate Seed Sensors. Design by Dickey–John Corporation.

Brochure. White 6000 Series Planters. Design by White—New Idea. 1993.

Brochure. White 6200/6300 Series Planters. Design by White—New Idea. 1995.

Brochure. White 6800 Series Central Fill. Design by White—New Idea. 1995.

Brochure. Kinze 2000 Series Planters. Design by Kinze Manufacturing, Inc., Aug. 1996.

Brochure. Kinze 2000 Series Planters. Design by Kinze Manufacturing, Inc., Aug. 1993.

Brochure. IS249 Kinze Brush–Type Seed Meter Installation, Operation & Maintenance. Design by Kinze Manufacturing, Inc. Aug. 1992.

Brochure. Monosem: The Precision Vacuum Planter. Design by A.T.I., Inc.

Brochure. Monosem: Pneumatic Planter Operator's Manual. Design by A.T.I., Inc.

Brochure. MT 600. Design by Gaspardo.

Brochure. Stanhay Singulaire 785: The Precision Vacuum Seeder from Stanhay. Design by Stanhay Webb Limited.

Brochure. Accord: Precision Seed Drill Optima Operating Instructions. Design by ACCORD Landmaschinen H. Weiste & Co. GmbH.

Brochure. WIC Precision Vacuum Planter Operator's Manual and Parts Book. Design by WIC, Inc., 1994.

Brochure. Nodet Gougis Planter II Semoirs Monograines Polyvalents. Design by Nodet Gougis.

Brochure. Nodet Gougis Ventilateur. Design by Nodet Gougis, Dec. 1992.

Brochure. White Planters: Accuracy from the Ground Up. Design by White. 1997.

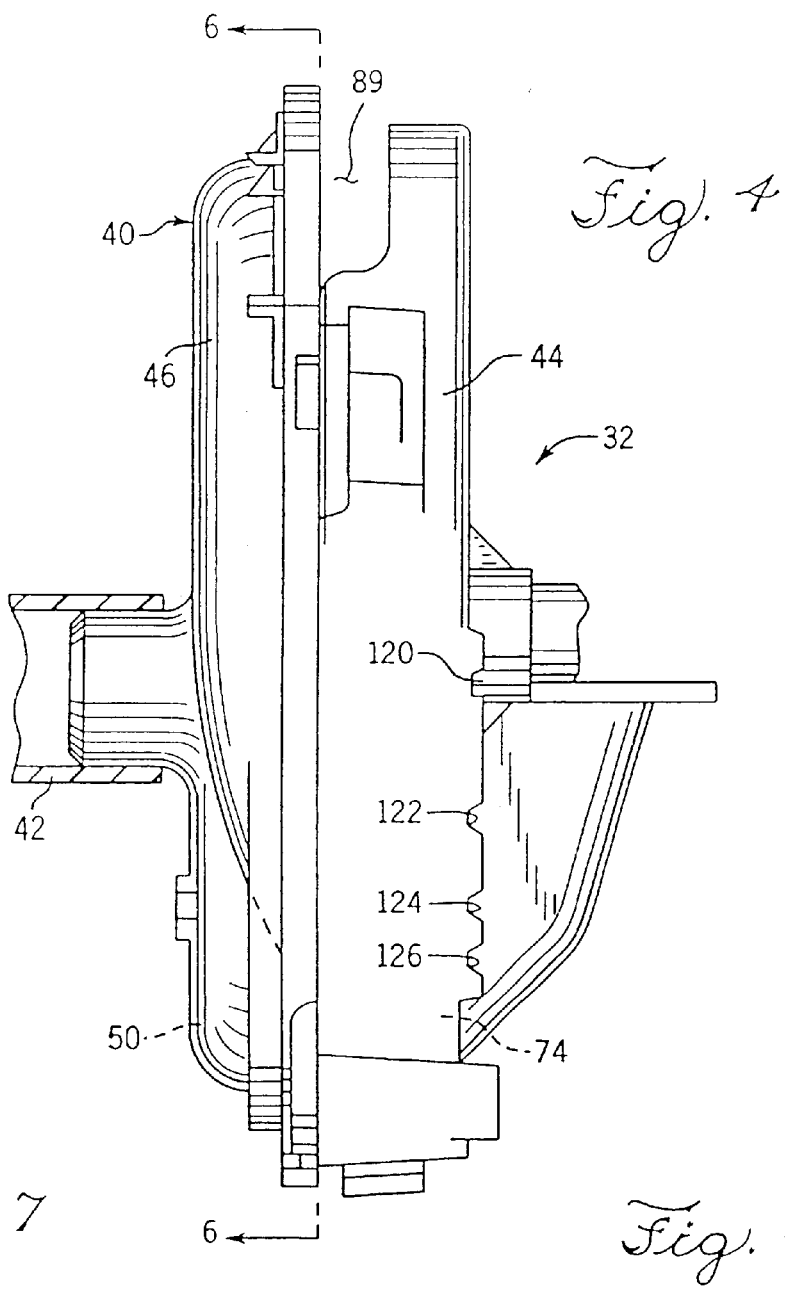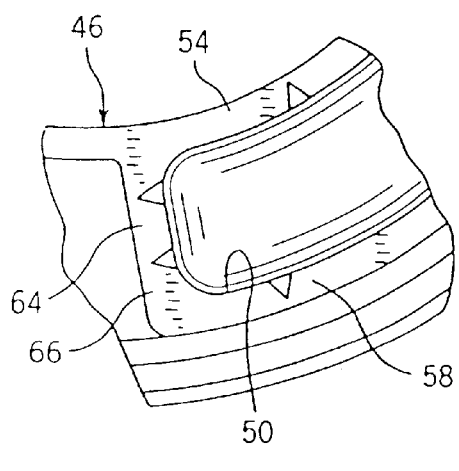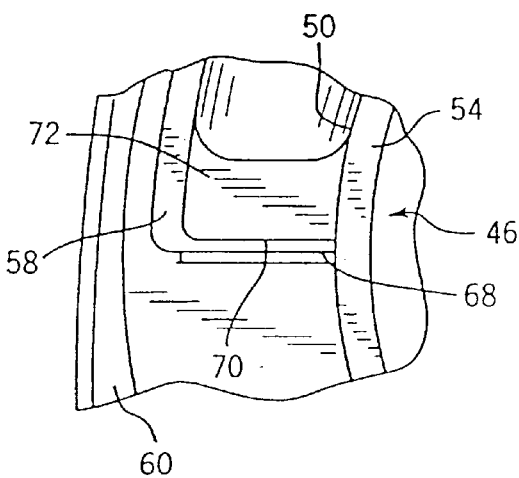

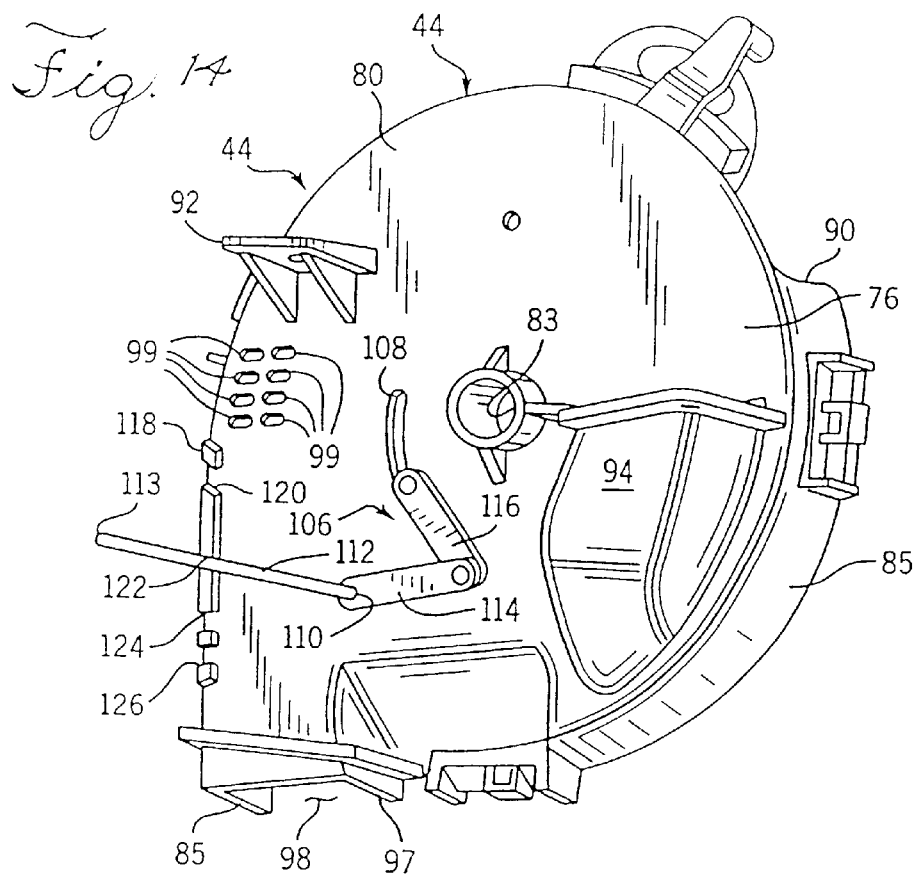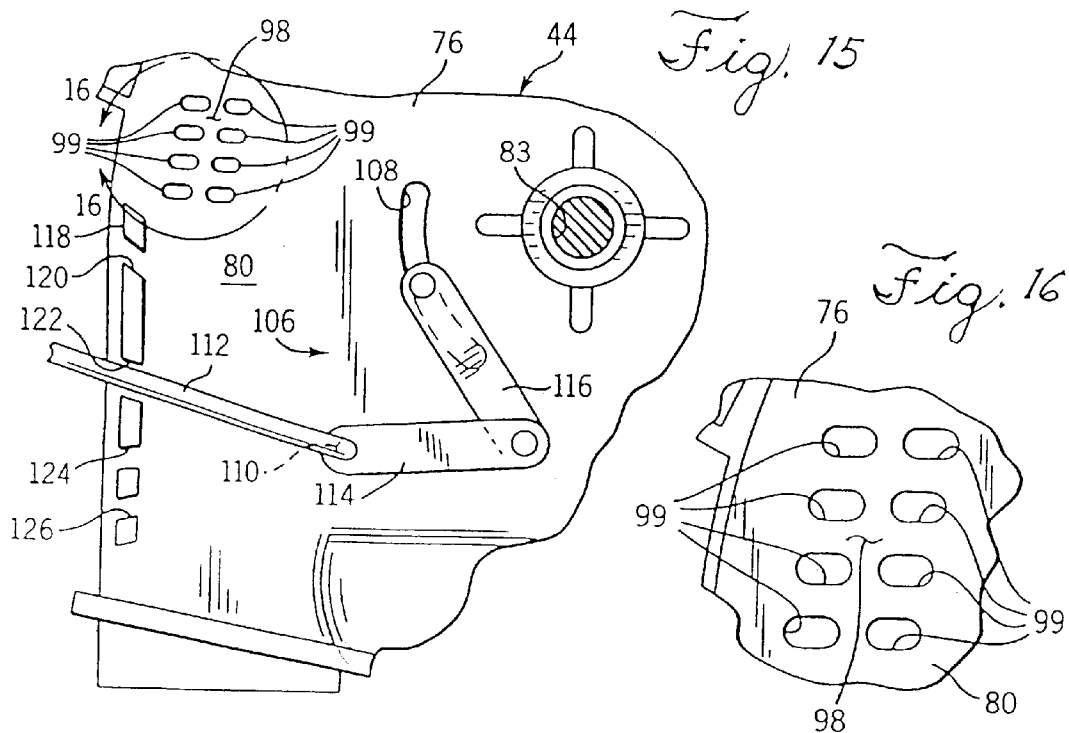

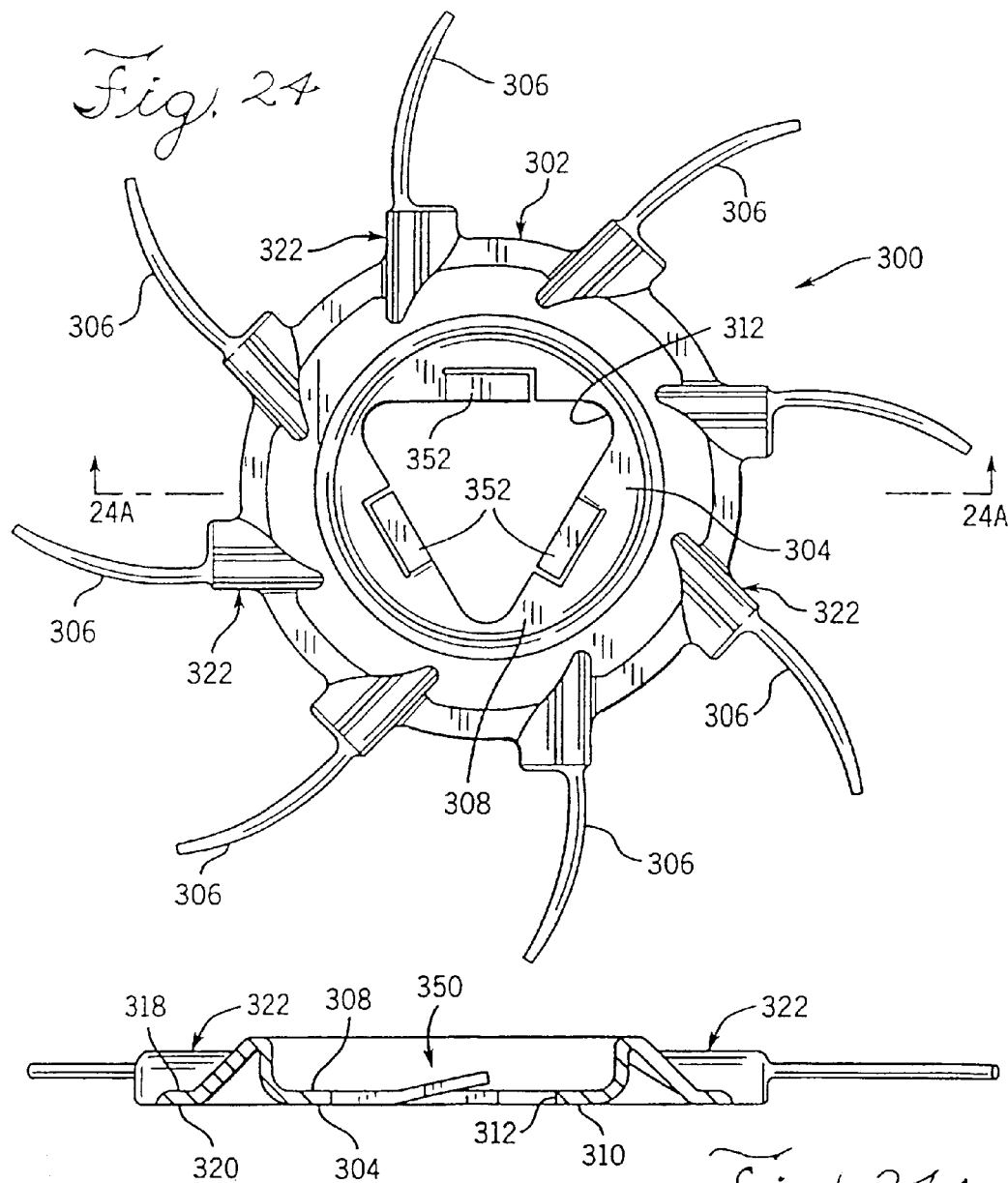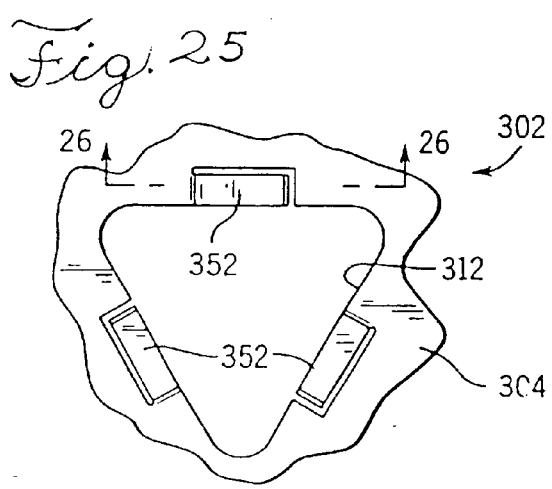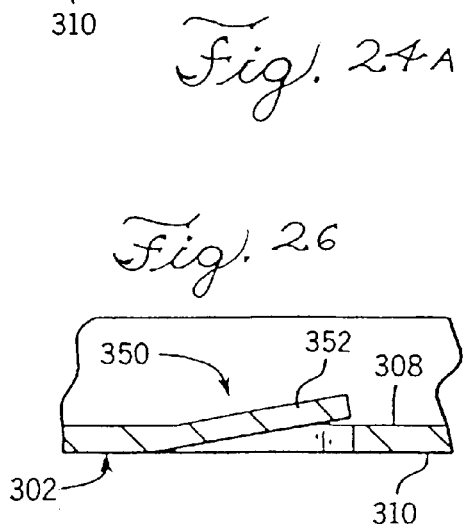

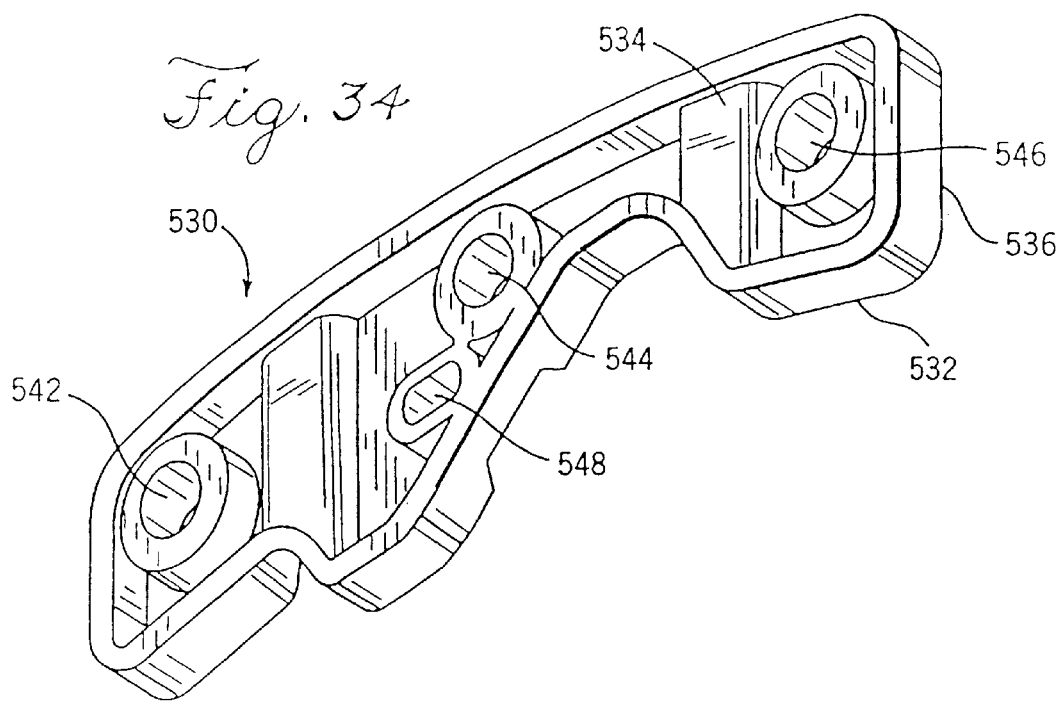
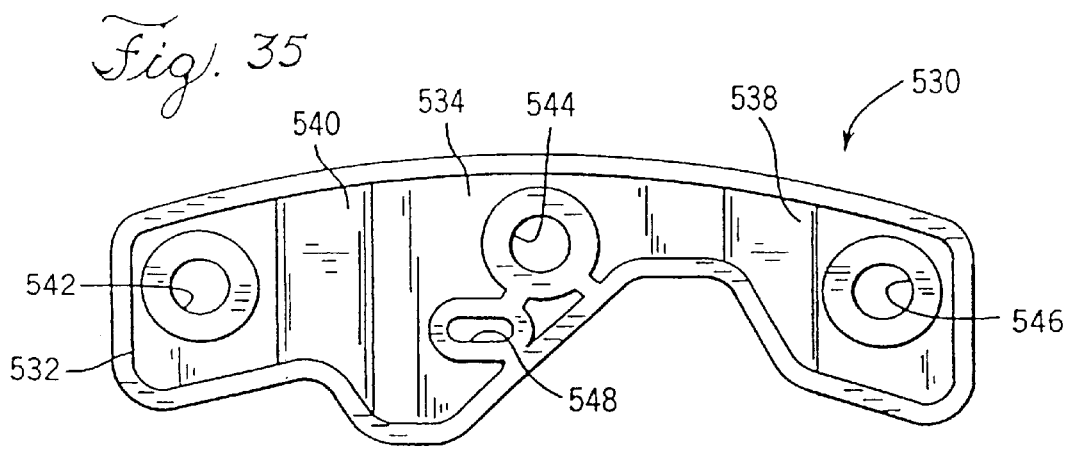
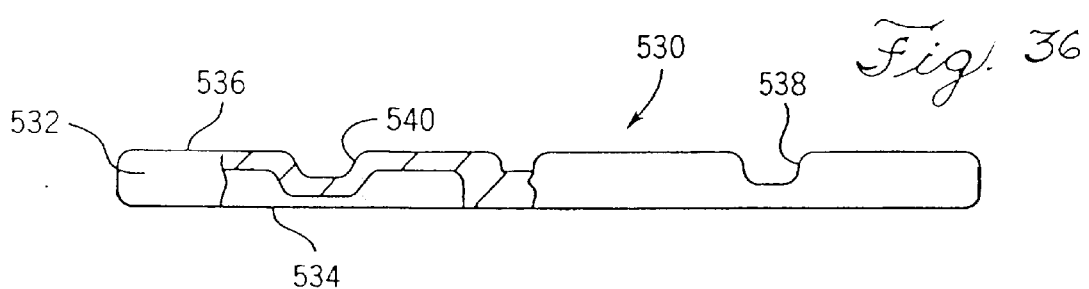

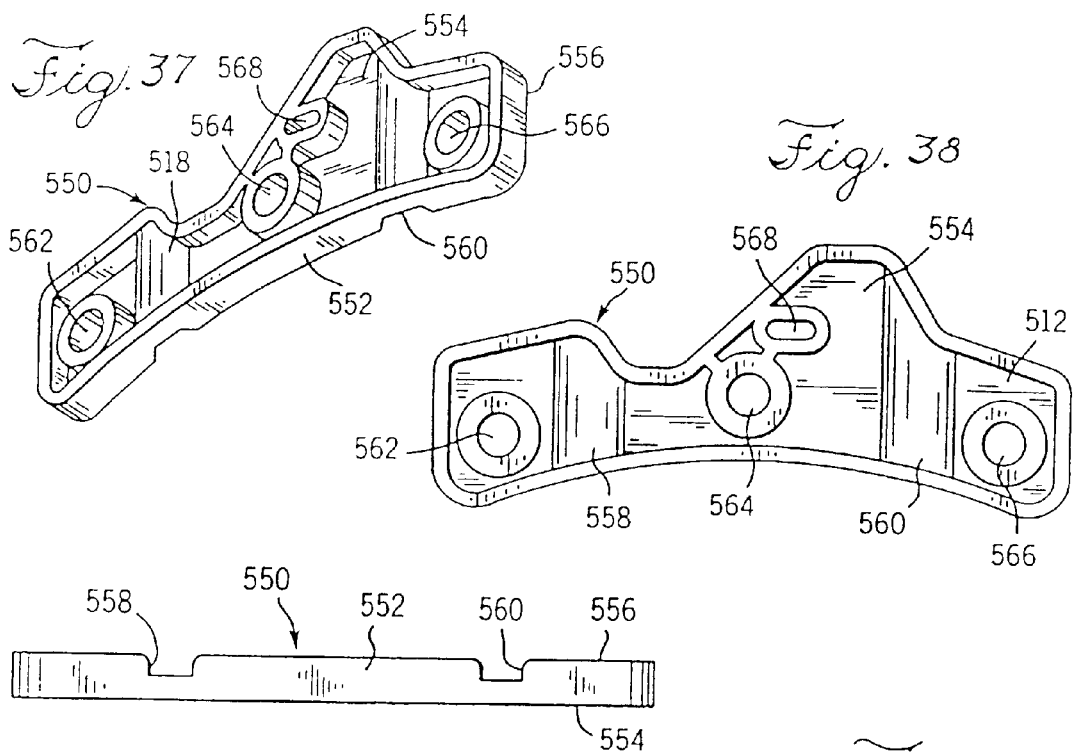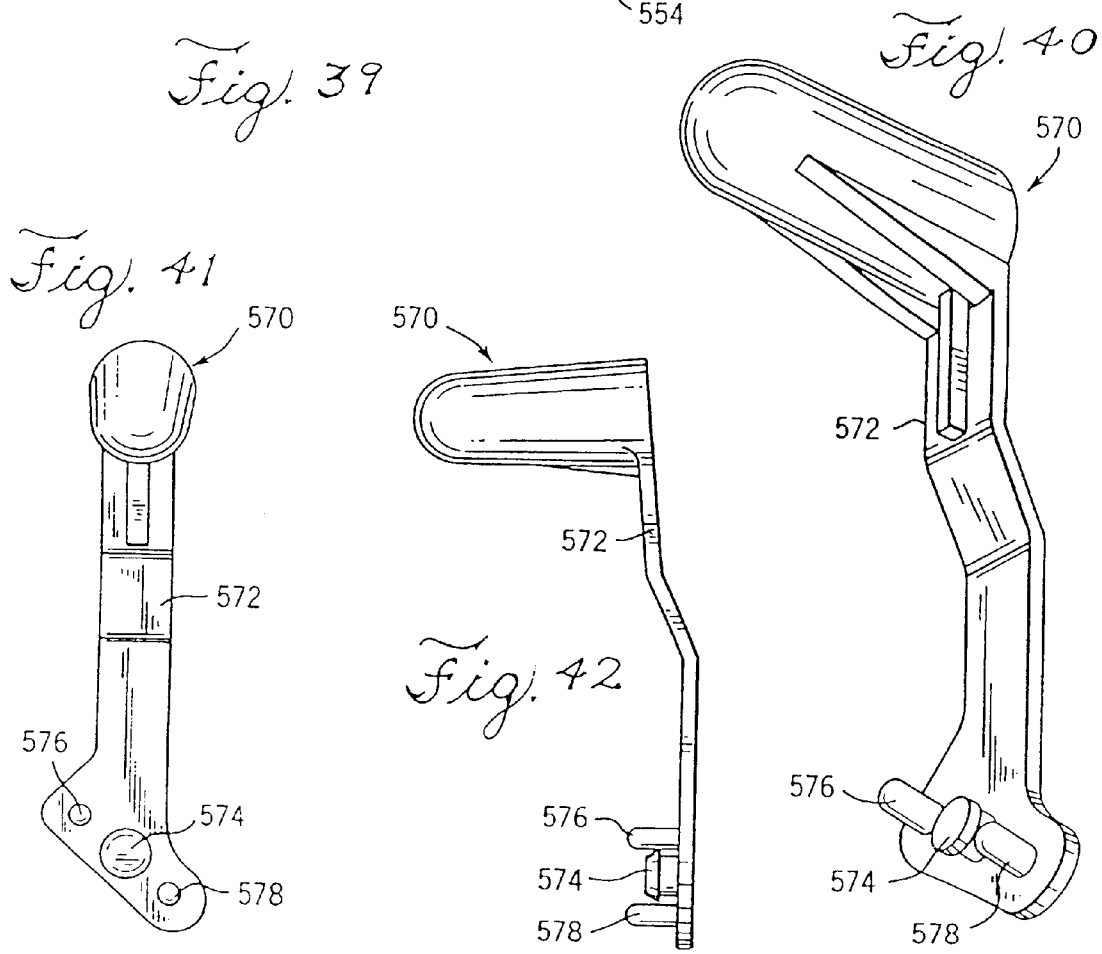

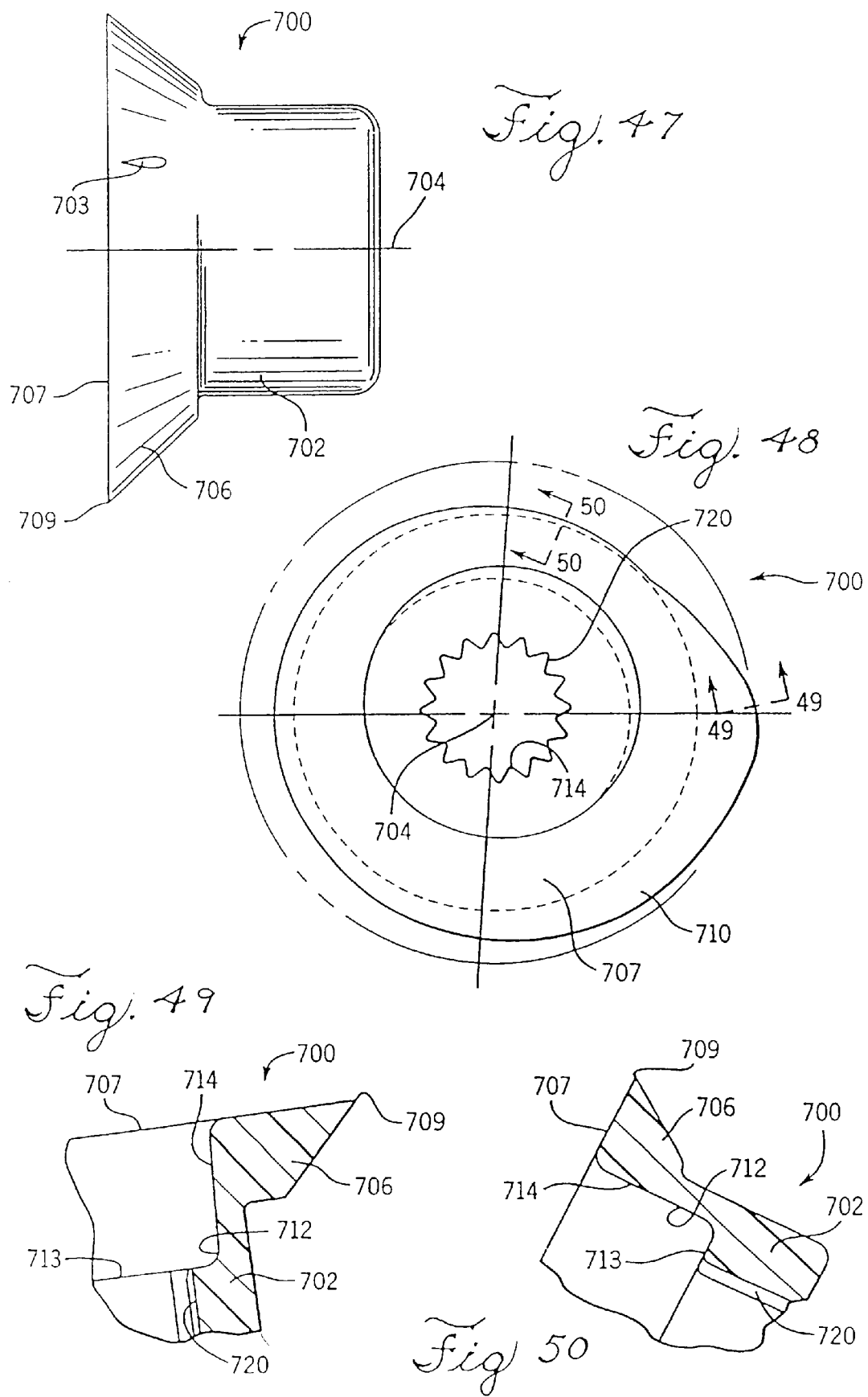

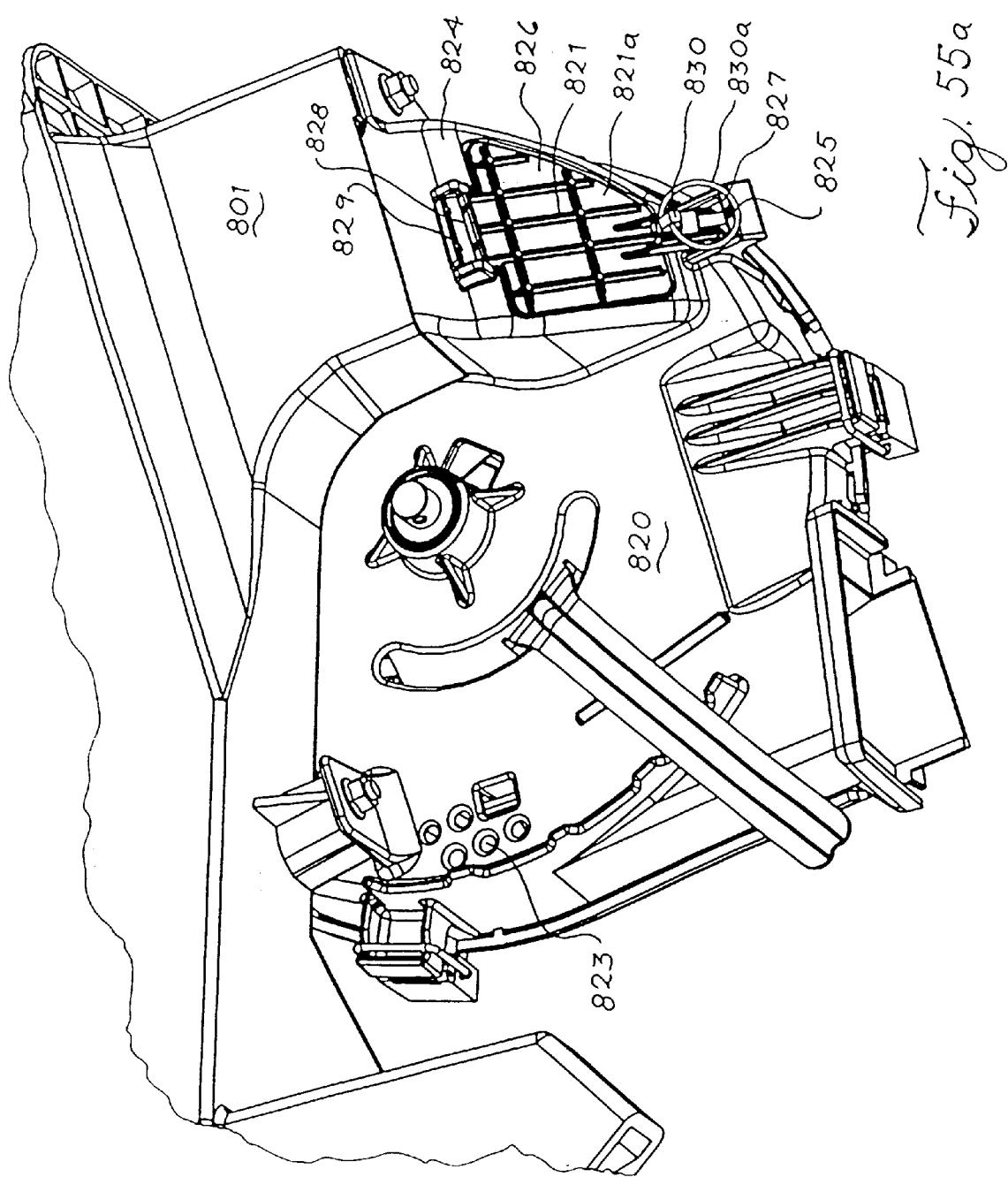

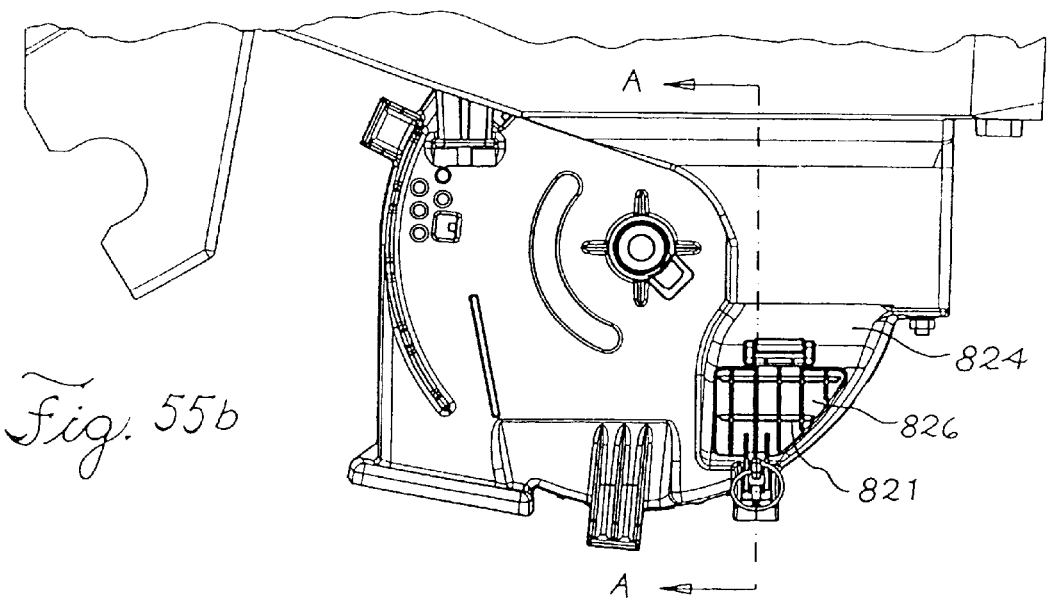
Fig. 55b
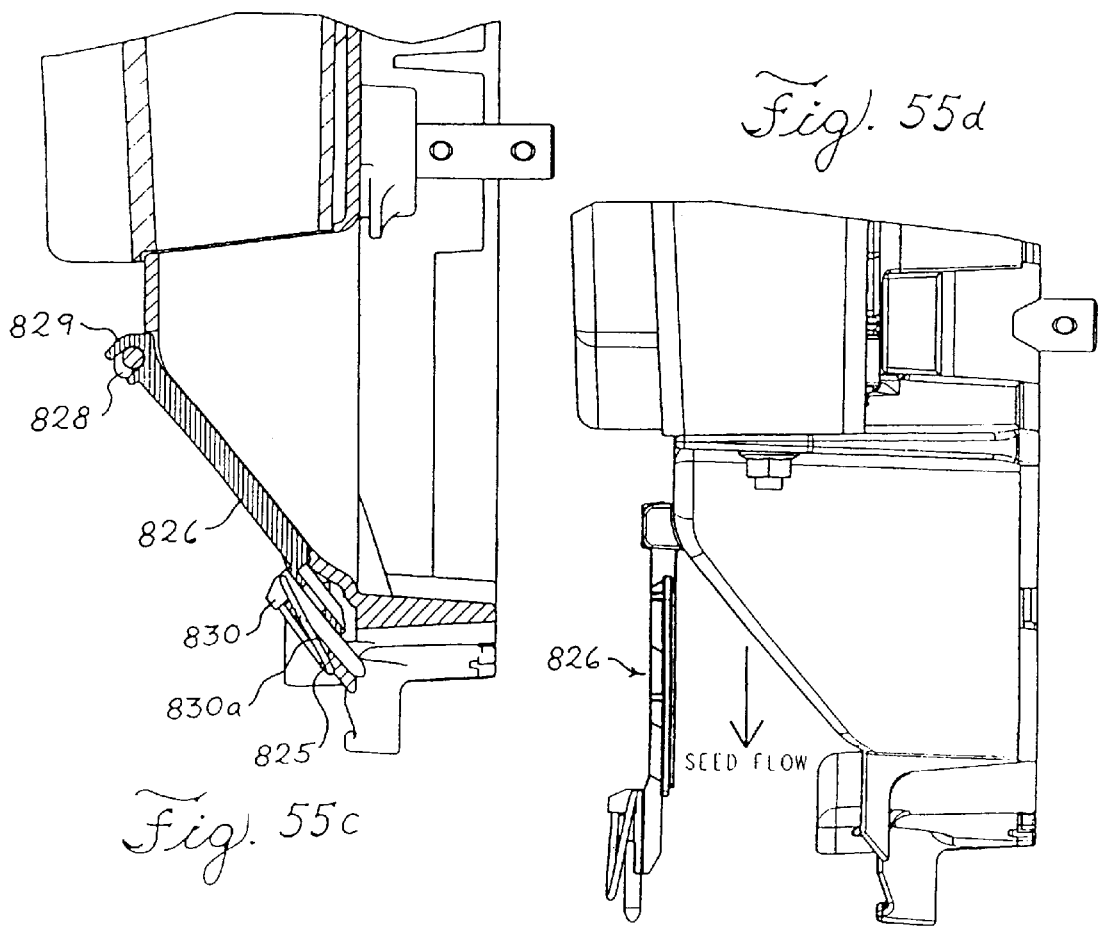
Fig. 55c
Fig. 55d

SEED PLANTER APPARATUS AND METHOD

RELATED APPLICATIONS

This application is a continuation of application Ser. No. 09/527,160 filed Mar. 17, 2000, now U.S. Pat. No. 6,374,759 B1.

This application is a continuation-in-part and claims priority to U.S. Application No. 08/581,444, filed Dec. 29, 1995 and U.S. Application Ser. Nos. 08/702,294, 08/700,214, 08/700,225, 08/700,217, and 08/700,222, filed Aug. 20, 1996, the entire disclosures of the foregoing applications are incorporated herein by reference. The following U.S. Applications entitled: "Seed Tube For Seed Metering Apparatus"; "Seed Planter Self-Tensional Transmission"; "Automatic Coaxial Engagement Drive Coupler;" "Seed Metering System With Improved Wear Enhancement"; and "Hopper System", all of which were filed on Apr. 15, 1998, and the entire disclosure of each of these applications are incorporated herein by reference.

FIELD OF THE INVENTION

The present invention generally relates to seed planters including seed metering mechanisms for dispensing individual seeds at a controlled rate into a seed furrow as the seed meter is advanced above and along the furrow and, more particularly, to a vacuum seed metering mechanism in which a rotating disc element coupled to a vacuum source picks up individual seeds from a seed mass and subsequently discharges the seeds therefrom in a controlled fashion as the seed disc continuously rotates.

BACKGROUND OF THE INVENTION

Seed planters generally include meters of various designs have been used for sometime to dispense seeds at a controlled rate into a seed furrow as the seed meter is advanced above and along the seed furrow. In a typical arrangement, a tractor is coupled to tow a tool bar to which are attached in a generally parallel, spaced apart relation a plurality of planting units with seed meter arrangement attached thereto. Each planting unit typically includes a seed hopper for containing and carrying a large quantity of seeds to be planted or a smaller container fed from a centralized in or large hopper, a device for opening a furrow in the ground as the tractor drawn tool bar is advanced across the field over the ground, a seed meter is coupled to the seed hopper for dispensing individual seeds into the furrow at a controlled rate, and a further device for moving soil at the sides of the furrow to close the furrow over the seeds.

During a planting operation, the tractor typically moves across the field at speeds of about 4 to about 8 miles per hour. The spacing between adjacent individual seeds in each furrow can be as little as 0.5 inches or less or as much as 10 inches or more depending upon the particular seed being planted. The seed metering mechanism therefor must be capable of dispensing seeds at various rates in the order of to 130 seeds per second or greater as well as at rates which are considerably less. The many different types of seeds to be planted using a seed metering mechanism include corn, cotton, sorghum, sugar beets, soybeans and sunflowers to name a few. As will be appreciated, such seeds vary considerably in size, weight and shape. For example, peanut and edible bean seeds are among the largest seeds for planting and have elongated irregular shapes and outer surfaces. Soybean, and pelletized seeds are smaller and tend to be rounder and vary in shape and size. Sorghum and raw sugar beet seeds have a rounder almost spherical appearance. Sorghum seeds have a relatively smooth outer surface. On the other hand, raw sugar beet seeds have a very rough and irregular outer surface configuration. Cotton seed is small and shaped like some corn seed. On the other hand, corn seeds have a somewhat triangular shape with generally flat sides.

Despite these numerous differences in the size, shape and surfaces of such seeds, seed meters are expected and are required to handle all different types of seeds described above plus many more while requiring minimum effort regarding part changes and adjustments. At the same time, required spacing and depth standards of planting accuracy typically mandate a low error rate. A missed seed or doubling of seeds is undesirable and may be tolerated only very infrequently. Such requirements place considerable demands upon the accuracy of the seed metering mechanisms.

Some seed metering mechanisms used in planting operations of the type discussed above are of the mechanical type and include a vertical or horizontal seed plate or disc with mechanically actuated fingers or similarly operated mechanical devices for separating individual seeds from the seed disc and then dispense them into the furrow. While some mechanical seed meters are satisfactory for certain applications, they typically suffer from a number of limitations including the limited speed at which they can accurately dispense seeds, and inability to handle different type seeds without making cumbersome and extensive part changes, and an inherent design complexity which may typically add to the cost, wear and maintenance problems of the mechanically operated seed dispensing mechanisms.

Alternatively, a seed metering mechanism which utilizes an air pressure differential has been developed in an effort to overcome some of the problems of the mechanical seed meters. Air pressure differential seed meters, which are commonly known as air seed meters, are generally of two types. The first type being the positive pressure type and the second type relying upon negative pressure or vacuum.

In the positive pressure type of air seed metering mechanism, air is blown into the seed chamber and onto the surface of a rotating or otherwise movable and apertured member or disc in order to create the higher than atmospheric pressure in the chamber. This forces seeds from a seed mass onto the seed member or disc where they are retained for later release. The apertures or holes in the rotating member or disc open to atmosphere where the individual seeds are held by the blowing air until the seeds are dispensed by interrupting the flow of air to the seeds.

While air seed meters of the positive pressure type offer certain advantages over mechanical seed meters, they have certain limitations of their own which may prove to be a significant disadvantage for various seeding applications. In an effort to fill each hole or opening with a seed as the seed disc rotates through the seed mass, a relatively high pressure differential is applied to the disc. Because the seeds are held in place on the rotating disc or other movable member by differential pressure resulting from positive pressure in the chamber, it is usually necessary that the air flow be directed through the seed mass to aid in the depositing of individual seeds onto the disc. The air flow has been found to interfere with the orderly delivery of seeds from the disc and, ultimately, to the ground. In positive pressure seed metering mechanisms, the seed hopper must be sealed to maintain pressure in the system. If for any reason the hopper lid comes off or the hopper otherwise becomes unsealed, the seed meter will not properly function.

Vacuum seed meters have been found to overcome some of the problems in the positive pressure seed meters and offer more control over the seed being transported by the seed disc. In vacuum seed meters, a vacuum source is typically coupled to a separate chamber on the opposite of the seed disc from the seed mass with the vacuum communicating through the apertures in the seed disc to the seed mass. The vacuum is of sufficient magnitude such that it tends to draw seeds into the openings defined by the disc and hold the seeds thereto as the seeds are moved through the seed disc under the influence of the moving seed disc toward the seed discharge area of the seed metering mechanism. The openings between the outer surface of the seeds and the periphery of the openings in the disc allows air to pass therethrough thereby maintaining the seeds in operable association with the disc. Because the pressure differential at the seed disc comes from a vacuum source on the opposite side thereof and not from the flow of air at the same side thereof as with positive pressure type seed metering mechanisms, the problem of having to direct an air flow through the seed mass and on to the seed disc are eliminated.

Despite the various advantages of vacuum seed meters over seed meters of the positive pressure type, presently known vacuum seed meters are not without problems of their own. For one thing, testing has revealed that when vacuum seed metering mechanisms are used some seeds tend to be drawn rotationally under the influence of the moving seed disc and the vacuum in the discharge area of the seed metering mechanism rather than gravitationally falling for deposit to the ground. Testing has also revealed that the air drawn through the openings between the outer surface of the seeds and the periphery of the openings in the seed disc in the seed discharge area of the seed metering mechanism tends to flow upwardly into the seed metering mechanism in a direction opposed to the direction the seeds are intended to flow under the influence of gravity. Moreover, some vacuum seed metering mechanisms include a seed disc having a pocket or recess arranged in radially extending relation relative to the opening for accommodating a seed therewithin. When the respective openings reach the seed discharge area whereat the vacuum to the seed disc is cutoff, the seeds carried in the pockets tend to move with the disc. The seeds entrapped within the pockets and moving rotationally with the disc, however, tend to interfere with other seeds being released from the disc in the seed discharge area thereby effecting accurate seed spacing between adjacent individual seeds.

Accordingly, it would be desirable to provide a seed planter which includes vacuum seed metering mechanism wherein the release of seeds from the disc is effected positively without seeds sticking or hanging onto the seed disc or releasing erratically therefrom as a result of the vacuum used in combination with the seed mechanism. Moreover, providing a seed disc with a low friction seed release advantageously eliminates or significantly reduces the tendency or likelihood of the seeds to be, carried with or rotationally move with the seed disc allows the seeds discharged from the seed metering disc to be readily and reliably released from the seed disc without the need for complicated release mechanisms.

SUMMARY OF THE INVENTION

One aspect of the invention provides a seed planter apparatus comprising a seed meter including a housing assembly including a cover releasably connected to a shell and including at least one opening formed in the housing assembly adjacent a seed discharge area to promote the release of seeds from a disc rotatably attached to the housing assembly. The disc divides an interior of the housing assembly to include a vacuum chamber and a seed chamber. The disc includes a plurality of openings formed adjacent a periphery of the disc.

A further aspect of the invention provides a method of operating a seed planter apparatus. A housing assembly including a cover releasably connected to a shell is provided. The housing assembly includes at least one opening formed in the housing assembly adjacent a seed discharge area. A disc is rotatably attached to the housing assembly and divides an interior of the housing assembly to include a vacuum chamber and a seed chamber. The disc includes a plurality of openings formed adjacent a periphery of the disc. The disc is rotated. The seeds are held at the disc openings while the disc openings are in communication with the vacuum chamber. The seeds are released from the openings as the disc openings exit from the communication with the vacuum chamber. Air is flowed through the opening formed in the housing assembly to promote the release of seeds from the disc.

A further aspect of the invention provides a seed planter apparatus comprising a seed meter including a vacuum chamber, a seed chamber, and a seed disc. The seed disc includes a plurality of spaced apart clusters formed therein. Each of the clusters includes a plurality of communicating openings to allow seeds held by differential pressure within the openings of each cluster to release the seeds together as the cluster exists from communication with the vacuum chamber.

A further aspect of the invention provides for a method of operating a seed planter apparatus. A seed meter including a vacuum chamber, a seed chamber, and a seed disc, is provided. The seed disc includes a plurality of spaced apart clusters formed therein with each of the clusters including a plurality of communicating openings. The seed disc is rotated in communication with a vacuum chamber. The seeds are held within the cluster openings. The cluster is rotated out of communication with the vacuum chamber. The seeds are released from the openings of each cluster substantially simultaneously.

A further aspect of the invention provides a seed planter apparatus comprising a seed meter including a housing assembly, including a chute portion and a seed chamber. The chute portion including a first opening for receiving seed from a hopper which communicates with the first opening. The chute includes a second opening formed therein. A bar extends from a portion of the chute and positioned above the second opening. A door is shaped to cover the second opening and includes a clip portion for snap-fitting onto the bar to allow the door to rotate on the bar.

A further aspect of the invention provides for a method of operating a seed planter apparatus. A seed meter including a housing assembly with a chute portion and a seed chamber is provided. The chute portion includes a first opening in communication with a hopper and a second opening formed therein. A bar extending from a portion of the chute and positioned above the second opening with a door shaped to cover the second opening with a clip portion snap-fitted to the bar is also provided. The door is rotated about the bar. The seed is passed from the hopper through the first opening. And, the seed is passed through the second opening.

A further aspect of the invention provides for a seed metering apparatus for a seed planter comprising a housing including a seed chamber opening for communicating with a hopper, and a baffle rotatably attached to the housing. The baffle including a body portion and a handle portion. The handle portion extending through an opening formed in the housing. And the housing including a plurality of notches formed on an outer surface of the housing to allow the handle to be positioned within the notches to rotate the body portion and vary the size of the seed chamber opening.

A further aspect of the invention provides for a method of operating a seed metering apparatus for a seed planter. A housing including a seed chamber opening for communicating with a hopper, a baffle rotatably attached to the housing with a body portion and a handle portion is provided. The handle extends through an opening formed in the housing. The housing includes a plurality of notches formed on an outer surface of the housing. The handle is moved between the notches. The handle portion is retained in the notch. The body portion is rotated to vary the size of the seed chamber opening.

A further aspect of the invention provides for a seed metering apparatus for a seed planter comprising a housing assembly including a singulator assembly attached thereto and including at least one spool rotatably attached to a body portion of the singulator assembly. The spool includes a circular cross-section and the spool is in contact with a seed disc. The seed disc includes a plurality of openings formed adjacent a periphery of the disc. The spool partially covers the openings.

A further aspect of the invention provides for a method of operating a seed metering apparatus for a seed planter. A housing assembly including a singulator assembly attached thereto is provided. The singulator assembly includes a plurality of spools rotatably attached to a body portion of the singulator assembly. A seed disc including a plurality of openings formed adjacent a periphery of the disc is also provided. A seed disc contacts with the spools. The openings of the seed disc are partially covered with the spools. The spools are contacted by the seeds and the spools are rotated.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a front elevational view of the seed metering mechanism of the present invention disassembled from the seed hopper;

FIG. 7 is an enlarged fragmentary view of the portion encircled by line 7—7 in FIG. 6;

FIG. 8 is an enlarged fragmentary view of the portion encircled by line 8—8 in FIG. 6;

FIG. 14 is a left side view of the housing component illustrated in FIG. 1;

FIG. 15 is an enlarged left side view of a portion of the housing illustrated in FIG. 14;

FIG. 16 is an enlarged left side view of the portion of the housing encircled in FIG. 15;

FIG. 19 is a perspective view of a driven hub forming part of the seed metering mechanism of the present invention;

FIG. 24 is a right side view of the agitator assembly shown in FIG. 22;

FIG. 24a is a sectional view taken along line 24a—24a of FIG. 24;

FIG. 25 is an enlarged elevational view of a central portion of the agitator assembly showing a series of springs forming an integral part of the agitator assembly;

FIG. 26 is a sectional view taken along line 26—26 of FIG. 24;

FIG. 34 is a perspective view of one form of singulator mount forming part singulator assembly;

FIG. 35 is a right side view of the singulator mount shown in FIG. 33;

FIG. 36 is a top elevational view, partly in section, of the singulator mount illustrated in FIG. 35;

FIG. 37 is a perspective view of another singulator mount forming part of the singulator apparatus shown in FIGS. 29 and 30;

FIG. 38 is a right side view of the singulator mount shown in FIG. 37;

FIG. 39 is a top plan view of the singulator mount shown in FIG. 38;

FIG. 40 is a perspective view of an actuator for the singulator apparatus;

FIG. 41 is a right side view of the actuator shown in FIG. 40;

FIG. 42 is an end view of the actuator shown in FIG. 40;

FIG. 47 is an elevational view of one form of singulator spool that can be used in combination with the singulator apparatus of the present invention;

FIG. 48 is a side view of the singulator spool illustrated in FIG. 47;

FIG. 49 is a partial sectional view taken along line 49—49 of FIG. 48;

FIG. 50 is a partial sectional view taken along line 50—50 of FIG. 48;

FIG. 55a is a perspective view of an alternative embodiment of a seed metering mechanism attached to a seed hopper;

FIG. 55b is a front view of the embodiment of FIG. 55a;

FIG. 55c is a cross-sectional view taken along line A—A of FIG. 55b;

FIG. 55d is a side view of the embodiment of FIG. 55b;

FIG. 56b is a back view of the embodiment of FIG. 56a;

FIG. 60b is a vacuum side view of the embodiment of FIG. 60a;

FIG. 61b is a vacuum side view of the embodiment of FIG. 61a;

FIG. 62a is an enlarged view of a cluster of openings of the embodiment shown in FIG. 61a;

FIG. 63b is a back view of the embodiment of FIG. 63a;

DETAILED DESCRIPTION OF THE PRESENTLY PREFERRED EMBODIMENTS

Figure 1:
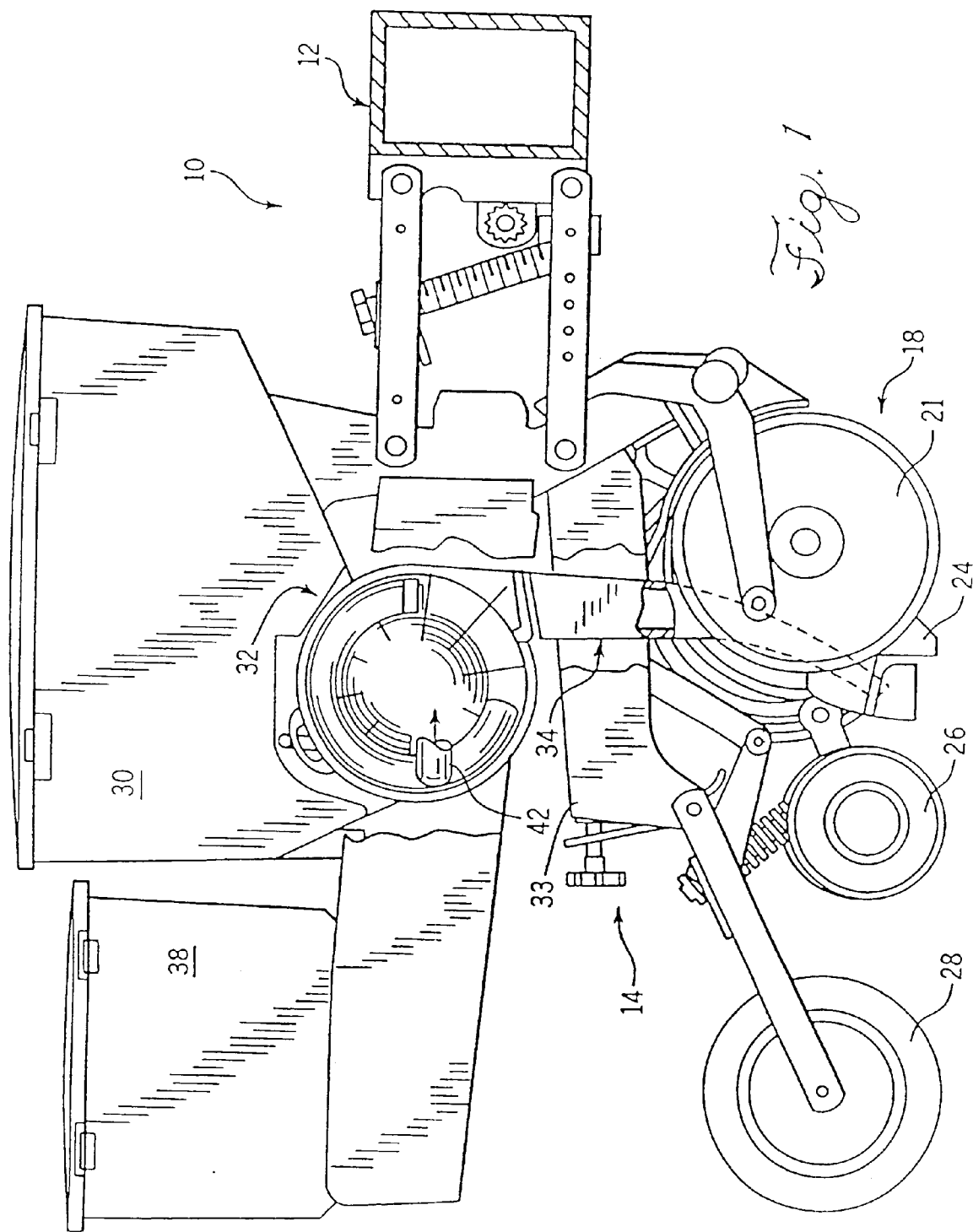
FIG. 1 is a schematic right side elevational view of a planting unit with a seed metering mechanism in accordance with the present invention mounted thereon.

While the present invention is susceptible of embodiment in different forms, there is shown in the drawings and will hereinafter be described a preferred embodiment of the invention with the understanding that the present disclosure is to be considered as setting forth an exemplification of the present invention which is not intended to limit the invention to the specific embodiment illustrated.

Referring now to the drawings, wherein like reference numerals indicate like parts throughout the several views, a seed planting apparatus or implement is schematically illustrated in FIG. 1 and is represented in its entirety by reference numeral 10. Seed planting apparatus or implement 10 includes an elongated tool bar 12 which is supported for movement across and over fields by a plurality of wheels (not shown) and which is adapted to be towed in a given forward direction by a power source such as an off-highway tractor or the like. Attached to the tool bar 12 are a plurality of planting units 14; with only one being illustrated and described in detail and from which a complete understanding of the present invention may be readily determined. As is well known in the art, the planting units 14 are mounted in side-by-side relation relative to each other along the length of the tool bar 12.

In the illustrated embodiment, each planting unit 14 preferably includes a conventional furrow opening apparatus generally indicated in FIG. 1 by reference numeral 18. As is known in the art, the furrow opening unit 18 preferably includes a pair of lateral spaced furrow opener discs 21, a furrow forming point, and an opener shoe 24. Alternatively, and without detracting or departing from the spirit and scope of the present invention, the planting unit 14 can be provided with a runner opener type for providing a furrow in the ground. The planting unit 14 further includes a pair of furrow closer discs 26 and a press wheel 28 arranged in fore-and-at relationship relative to each other.

A seed hopper 30 is likewise carried on each planting unit 14. The purpose of the seed hopper 30 is to provide storage for seed material that is to be gravitationally deposited to the ground as the planting unit moves over and across the field. It will be appreciated that a hopper container, smaller than that exemplified in the drawings, and connected to a centralized bin or large hopper would equally suffice without detracting or departing from the spirit and scope of the present invention. In the illustrated embodiment, a seed metering mechanism or apparatus 32 is arranged in seed receiving relation relative to the hopper 30 and, in the illustrated embodiment, forms part of the planting unit 14. The purpose of the seed metering apparatus or mechanism 32 is to uniformly release seeds received from the seed hopper 30 for deposit onto the ground. To facilitate delivery of seeds from the seed metering mechanism 32 to the ground, a vertically disposed seed tube 34 is mounted on the planting unit 14. The seed tube 34 is preferably of the type disclosed in co-pending and co-assigned patent application Ser. No. 08/581,444, filed Dec. 29, 1995, in the illustrated embodiment, the full disclosure of which is incorporated herein by reference. Suffice it to say, the seed tube 34 defines a vertical passage 36 through which seeds are delivered to the ground.

Figure 51:
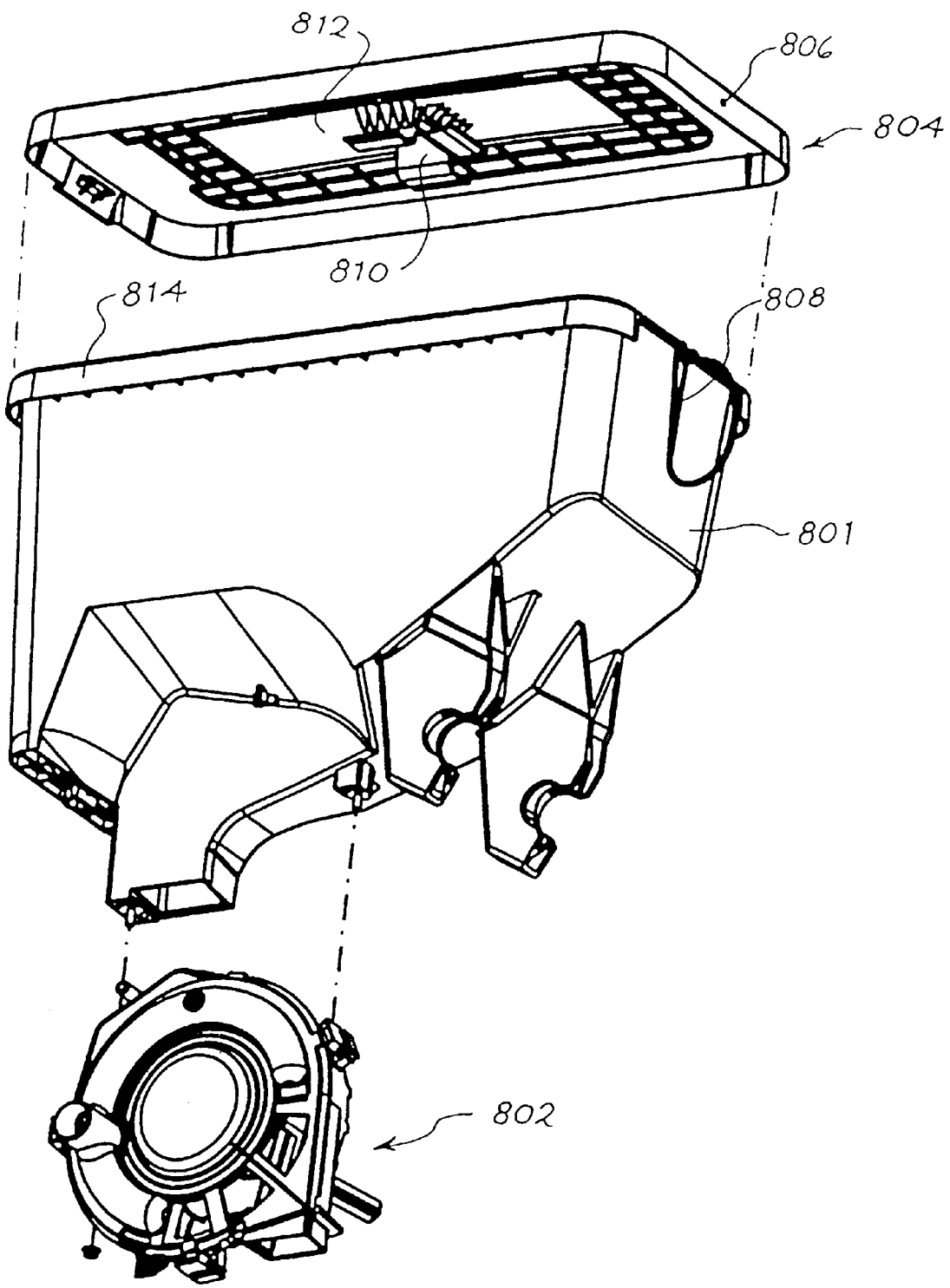
FIG. 51 is an exploded perspective view of an alternative embodiment of a seed metering mechanism, seed hopper, and removable lid.
Figure 52:
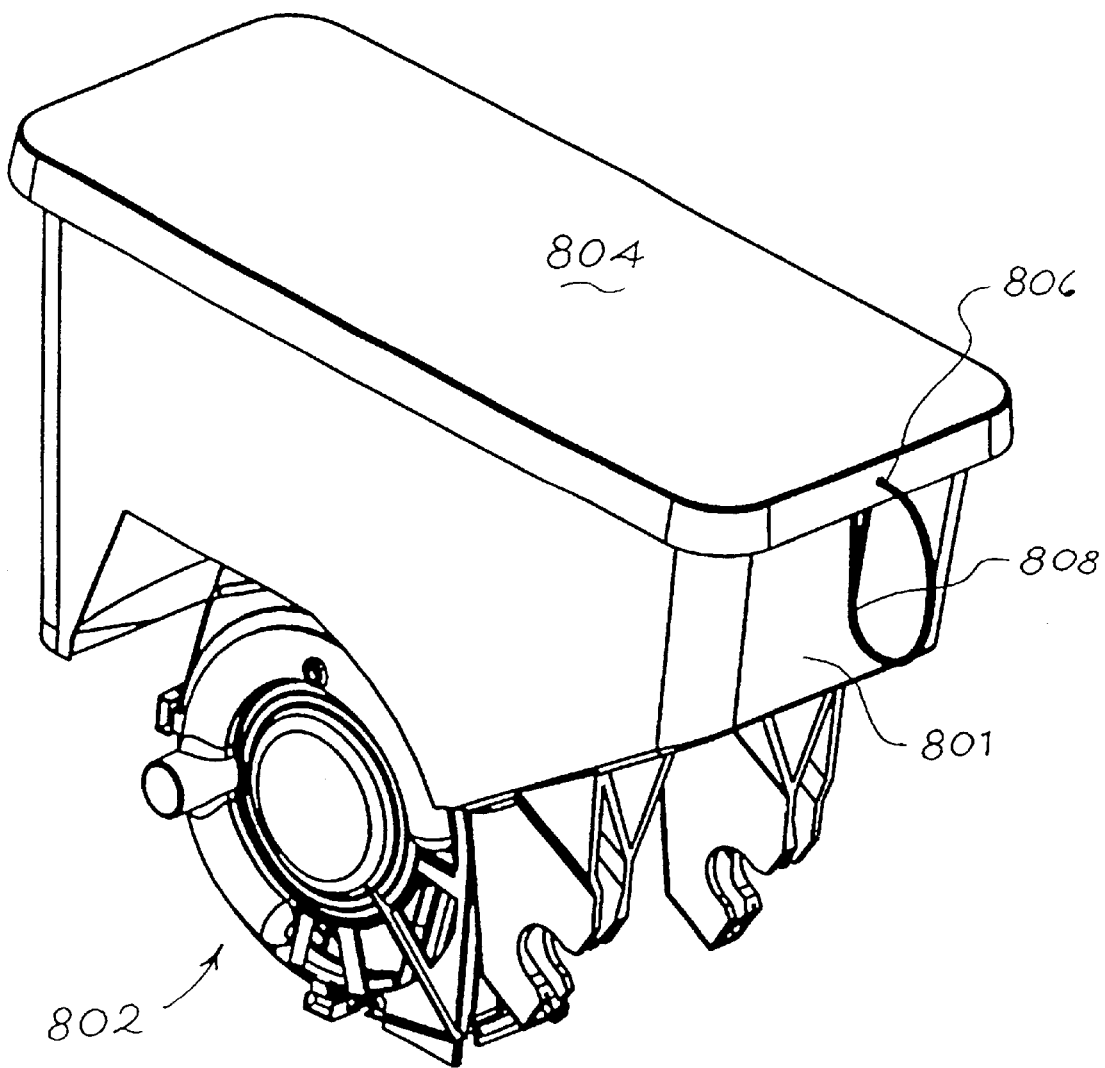
FIG. 52 is a perspective view of the embodiment of FIG. 51 assembled.
Figure 53:
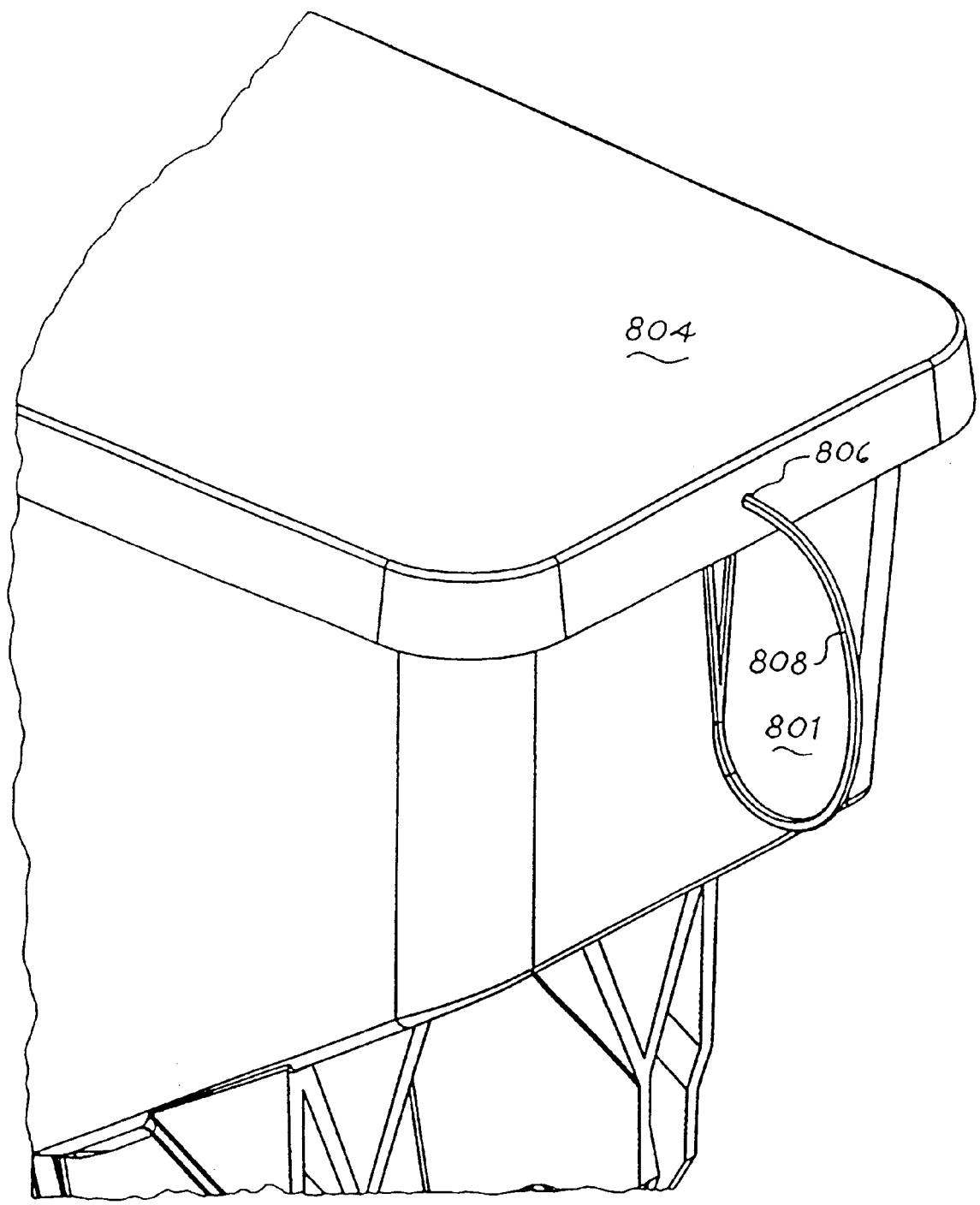
FIG. 53 is an enlarged view of a portion of the embodiment of FIG. 52.

FIGS. 51–53 illustrate an alternative embodiment of a seed hopper 801 and a seed metering mechanism 802. A removable lid 804 may include an opening 806 for receiving a flexible tether 808. The flexible tether 808 may be secured to both the lid 804 and the seed hopper 801 so that when the lid 804 is removed, the lid 804 remains tethered to the seed hopper 801. This assures that the lid 804 remains in close proximity to the see hopper 801 and prevents the lid 804 from being blown away when operating in windy conditions. As shown in FIG. 51, the lid 804 may include at least one hook 810 integrally formed on an inside surface 812 of the lid 804. In the embodiment shown, three hooks 810 are provided which are oriented in three different directions. When the lid 804 is removed from the seed hopper 801 during operation, the lid 804 may be conveniently hung on the seed hopper 801 by positioning the lid 804 so that at least one of the hooks 810 engage an edge 814 of a sidewall of the seed hopper 801. Since the hooks 810 are oriented in different directions, the lid 804 can be mounted to the seed hopper 801 either vertically or horizontally in various positions along the edge 814 of the sidewalls of the seed hopper 801. Moreover, the position of the three hooks 810 provides an ergonomically convenient configuration for both left and right handed operators.

As the power source or tractor pulls the tool bar 12 across and over the ground, the furrow opening apparatus 18 operates to open a furrow in the ground. Seeds from the hopper 30 flow into the seed metering mechanism 32 from whence seeds are introduced at a controlled rate into the seed tube 34 to uniformly move through the vertical passage 36 defined by tube 34 and are, ultimately, deposited onto the ground. The furrow closer 26 trails the furrow opening apparatus 18 and, as the seed planter apparatus 10 is drawn across the field, serves to close the furrow together and over the seed dispensed by the seed metering mechanism 32 into the furrow. The trailing press wheel 28 serves to compact the soil closed over the seeds.

In the illustrated embodiment, a pesticide hopper 38 is mounted toward a rear end of each planting unit 14. Hopper 38 preferably includes an insecticide and is provided with conventional dispensing means for applying controlled amounts of insecticide where desired in connection with the planting of seeds by each planting unit 14.

Figure 2:
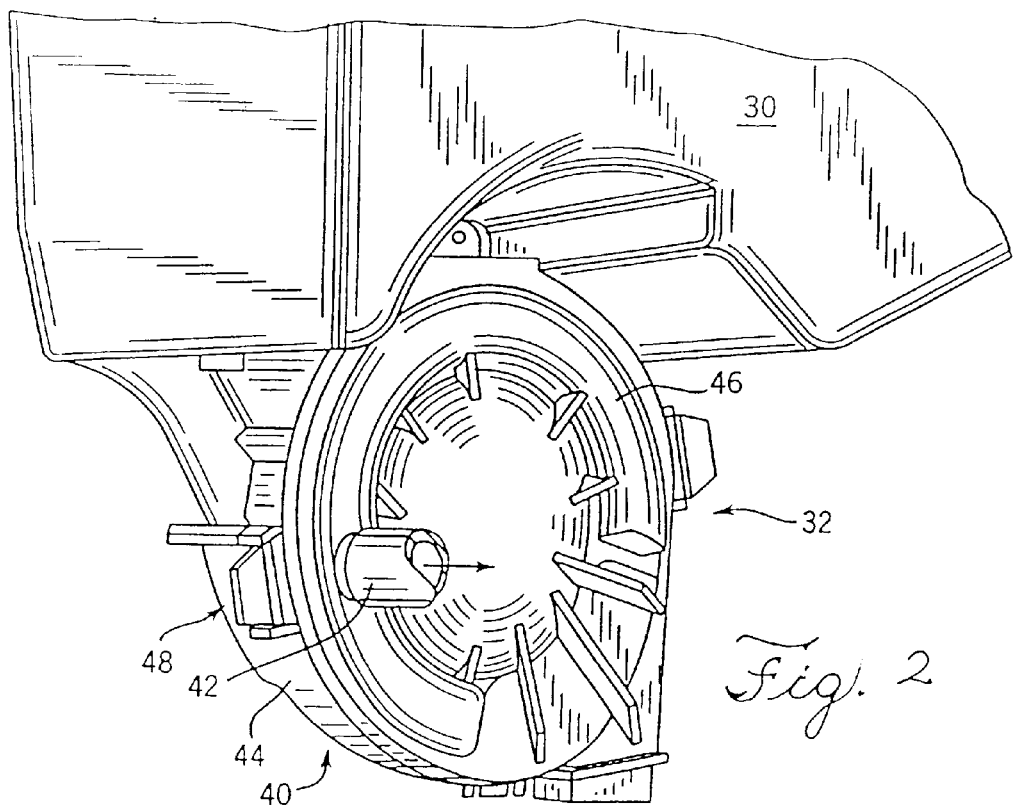
FIG. 2 is a rear perspective view looking forwardly of a seed hopper with a seed metering mechanism according to the present invention mounted thereon.
Figure 3:
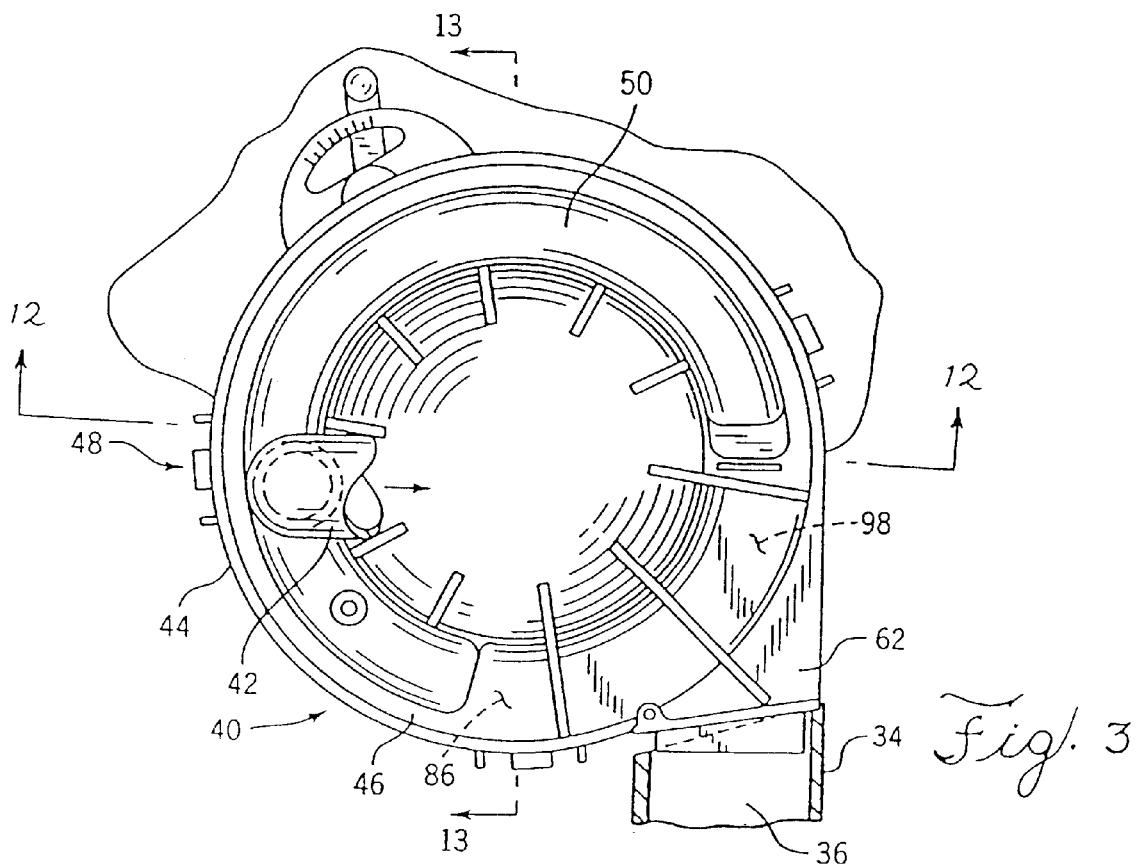
FIG. 3 is an enlarged right side elevational view of the seed metering mechanism with a fragmentary portion of a seed tube shown connected thereto.

According to the present invention, the vacuum seed metering mechanism or apparatus 32 is mounted to and movable with the hopper 30 relative to frame structure 33 (FIG. 1) of the seed planting unit 14 and relative to the seed tube 34. Moreover, the hopper 30 is mounted on and removable from the planting unit 14 in a conventional manner. As shown in FIG. 2, the seed metering mechanism 32 includes a split housing assembly 40 arranged toward the bottom of and in seed receiving relation relative to the seed hopper 30. The seed metering apparatus 32 mounted to each planting unit 14 (FIG. 1) is individually connected via a suitable flexible conduit 42 to a common vacuum source (not shown) suitably mounted for movement over and across the field.

As shown in FIGS. 2 through 5, the housing assembly 40 of the seed metering mechanism 32 has a generally cylindrical-like configuration measuring about 300 mm. in diameter. The housing assembly 40 is comprised of a housing or shell 44 that is rigidly secured to the seed hopper 30 and a cover or shell 46 releasably connected to shell 44. In the preferred form of the invention, the cover 46 is completely removable from the housing 44 when access to the interior of the seed metering mechanism 32 is desired or required. Preferably, a series of manually releasable fasteners 48 are equidistantly arranged about the periphery of the housing assembly 40 for releasably fastening the housing 44 and cover 46 in operable and substantially air tight relation relative to each other. In the illustrated embodiment, three fasteners 48 are provided for releasably securing the cover 46 to the housing 44.

Figure 6:
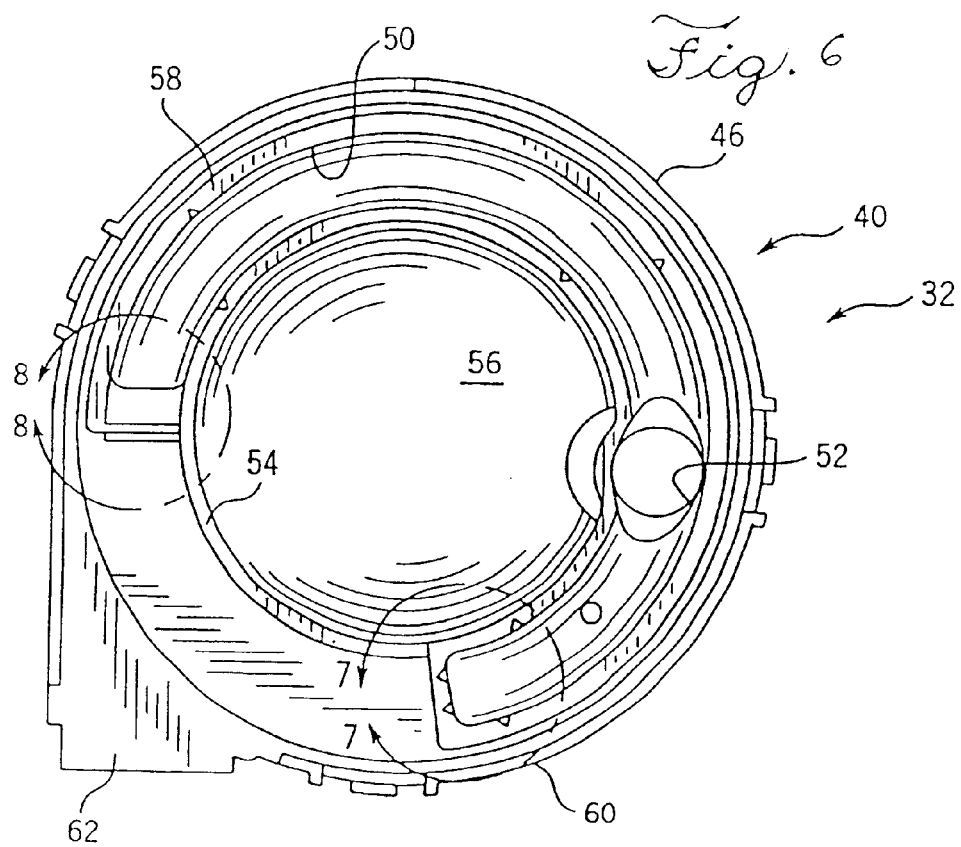
FIG. 6 is a sectional view taken along line 6—6 of FIG. 4.

The cover 46 of the split housing assembly 40 is preferably formed as a unitary or one piece member that is formed with sealing surfaces and suitable cutoffs as an integral part thereof. As such, the seed metering mechanism of the present invention does not require additional parts to be added thereto to effect sealing such as rubber seals and the like. In the illustrated embodiment, the cover 46 is formed of a rigid nylon or thermoplastic material containing conventional antistat and/or other low friction agents such that no graphite, talc, or slick additives need to be used in combination with the seed metering mechanism of the present invention during operation thereof. Graphite powder, however, may be used. Moreover, and as shown in FIG. 6, cover 46 of the split housing assembly 40 has an arcuate shaped chamber 50 extending about 270 degrees and adjacent the periphery of the cover 46. As will be described in detail hereinafter, an exhaust or suction port 52 opens to the chamber 50 intermediate opposite ends thereof. As is conventional, the flexible conduit 42 is exteriorly connected to the exhaust port 52 such that a vacuum or negative pressure may be created in the chamber 50 when the cover 46 is fastened to the housing 44.

Chamber 50 in housing 46 is partially defined by a first annular or circular flat sealing face 54 formed integral with an inner surface 56 of the cover 46. Also arranged on the inner surface 56 of cover 46, in radially spaced congruent relation from the sealing face 54, is a second sealing face 58 that is likewise formed integral with the inner surface 56 of cover 46. Notably, the sealing faces 54 and 58 are arranged in generally planar relation relative to each other and are formed integral with the cover 46 thus eliminating the need or requirement for additional separate rubber seals. Moreover, and as shown in FIG. 6, outwardly spaced from the sealing face 58, cover 46 defines a flat circular lip area 60 extending radially outwardly to the periphery of the cover 46. Notably, both the first and second seating faces 54 and 58 axially project from the inner surface 56 of the cover 44 beyond the circular lip area 60. Cover 46 furthermore defines a leg portion 62 that is generally coplanar with the flat lip area 60 and which extends tangentially away from one end of chamber 50.

Figure 56A:
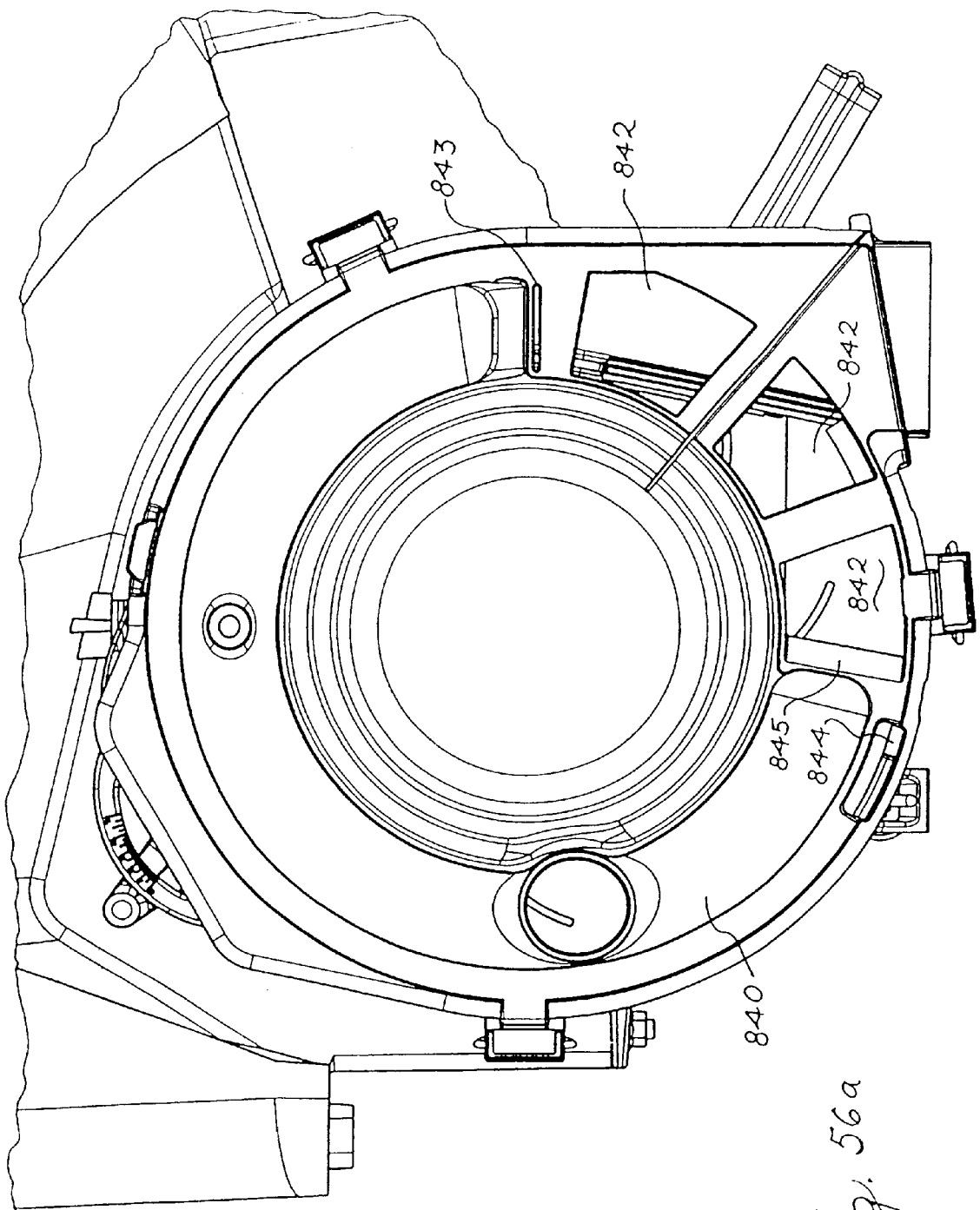
FIG. 56a is a front view of an alternative embodiment of a cover.
Figure 56B:
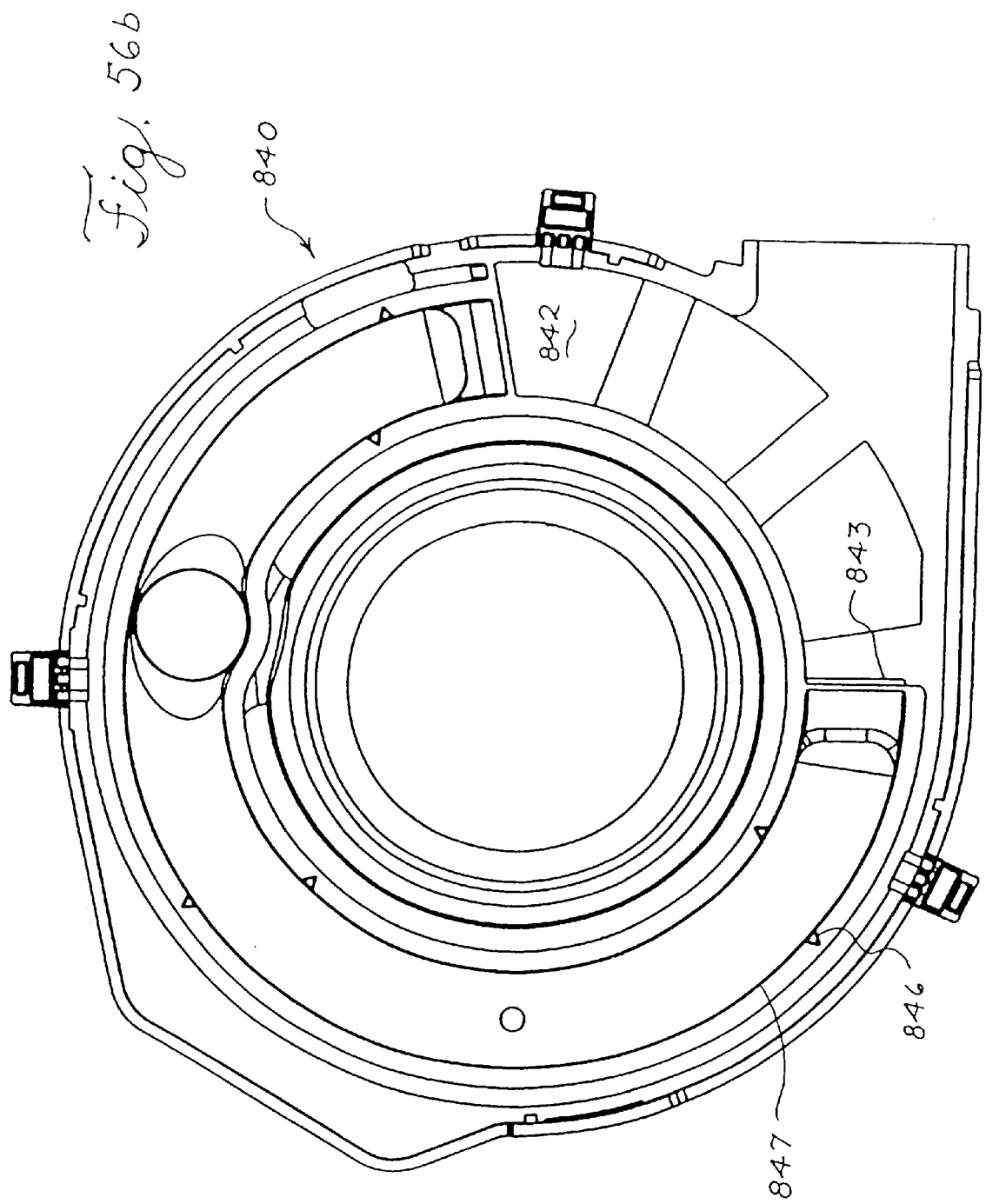

FIGS. 56a–b illustrates an alternative embodiment of a cover 840 which includes at least one discharge opening 842 formed therein adjacent to and extending radially inward from the perimeter of the cover 840. In the embodiment shown, three discharge openings 842 having a generally rectangular shape are provided. The discharge openings 842 allow waste material such as peanut husks, for example, which may be pulled through the seed disc openings and trapped between the seed disc and the cover, to be discharged from the seed metering mechanism during operation. The number, size, shape, and positioning of discharge openings 842 may vary depending on the particular application. A slot 843 may preferably be formed in the cover 840 adjacent the exit area of the vacuum chamber. Air which flows through the slot 843 creates a cut-off curtain of air to enhance the cut-off response of the vacuum thereby improving the timing and release of the seed drop. The size and shape of the slot 843 may vary depending upon the particular application. A perimeter cover opening 844 may be formed in the cover 840 to provide a passageway to view an edge of a seed disc and to discharge debris along the edge of the perimeter of the disc. The cover 840 may preferably have a vacuum gauge opening 841 formed therein which penetrates into the vacuum chamber to allow an operator to determine the pressure within the vacuum chamber. As shown in FIG. 56a, a mechanical ramp 845 is provided adjacent one of the discharge openings 842 to divert debris collected on the vacuum side of the disc away from the seed metering mechanism. As shown in FIG. 56b, a plurality of triangular-shaped depressions 846 are formed along the seed disc contact surface 847 of the cover 840. The depressions 846 divert abrasive debris away from the seed disc contact surface 847. The size, shape, and orientation of the depressions 846 may vary depending upon the particular application. The cover 840 may be comprised of a plastic resin including, for example, Estaloc™ grade 61083 manufactured by BF Goodrich Company. Estaloc™ has been found to have very low shrink characteristics to allow the cover 840 to be molded with a flat contact surface which is important for holding an acceptable vacuum contact surface. In forming the cover 840, use of Estaloc™ also has been found to provide a consistent surface variation pattern on the vacuum contact surface. Estaloc™ also has been found to have excellent wear characteristics in an abrasive environment. Additives may be added to the Estaloc™ to make the cover 840 resistant to static charge build-up or to make it electrically conductive, to enhance seed spacing performance and to dissipate static electricity to prevent shock.

As shown in FIG. 7, the inner and outer radially spaced sealing faces 54 and 58, respectively, are joined, at one end, by a first radial web 64 that separates a leading end of vacuum chamber 50 from a seed discharge area of the seed metering mechanism 32 as will be discussed in detail below. In the illustrated form of the invention, the radial web 64 is preferably formed integrally with the cover 46 and has a flat sealing face 66 that is generally coplanar with the sealing faces 54 and 58 of cover 46.

As shown in FIG. 8, the opposite or trailing end of chamber 50 is defined by a second radial web 68 defining a vacuum cut-off for the chamber 50. The radial web 68 is preferably formed integral with the cover 46 and likewise has a flat sealing face 70 formed planar with the sealing faces 54 and 58 of cover 46. Notably, cover 46 further defines an inclined ramp 72 radially extending through the chamber 50 and toward the vacuum cutoff 58.

Figure 9A:
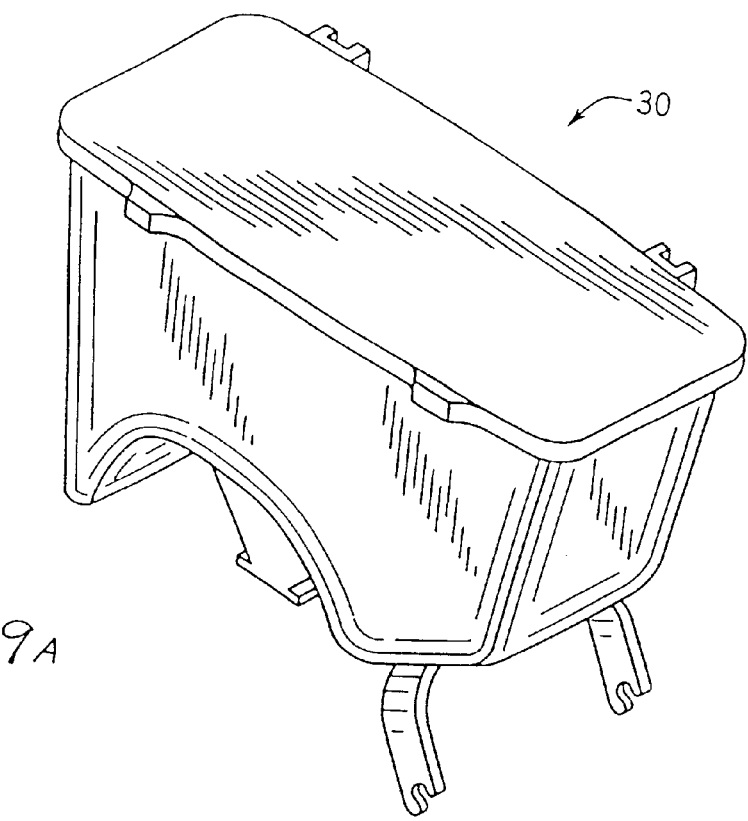
FIG. 9 is an exploded perspective view of the seed metering mechanism of the present invention.
Figure 9:
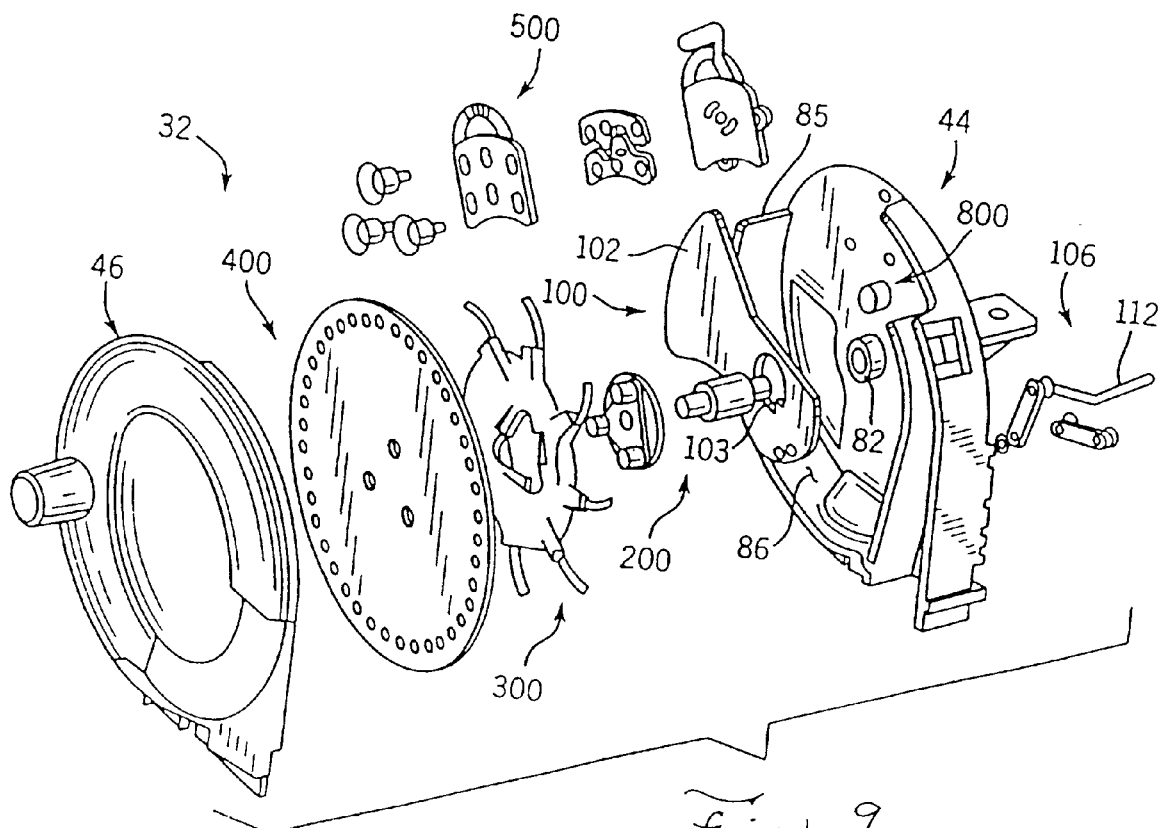

Turning now to FIG. 9, component assemblies of a preferred form of the seed metering mechanism 32 of the present invention are schematically illustrated in exploded perspective relative to each other. As shown, the seed metering mechanism 32 of the present invention preferably comprises the housing 44, a manually operated baffle assembly 100 that is operably adjusted from outside the housing assembly 40 of the seed metering mechanism 32, a drive assembly 200, an agitator assembly 300 for inhibiting seeds from compacting within the housing assembly 32, a seed disc or plate 400 that operably divides the interior of the housing assembly 32 into a seed chamber 74 (FIG. 4) between one side of the seed plate 400 and the interior of housing 44 and the vacuum chamber 50 between the opposite side of the seed plate or disc 400 and the cover 46, a singulator assembly 500 for inhibiting more than one seed from being advanced by the seed plate or disc 400 to the discharge area of the seed metering mechanism 32, a vibration mechanism 800 for facilitating the release of seeds from the disc 400 in the discharge area of the seed metering mechanism 32, and the cover 46 for closing the seed metering mechanism 32.

Figure 10:
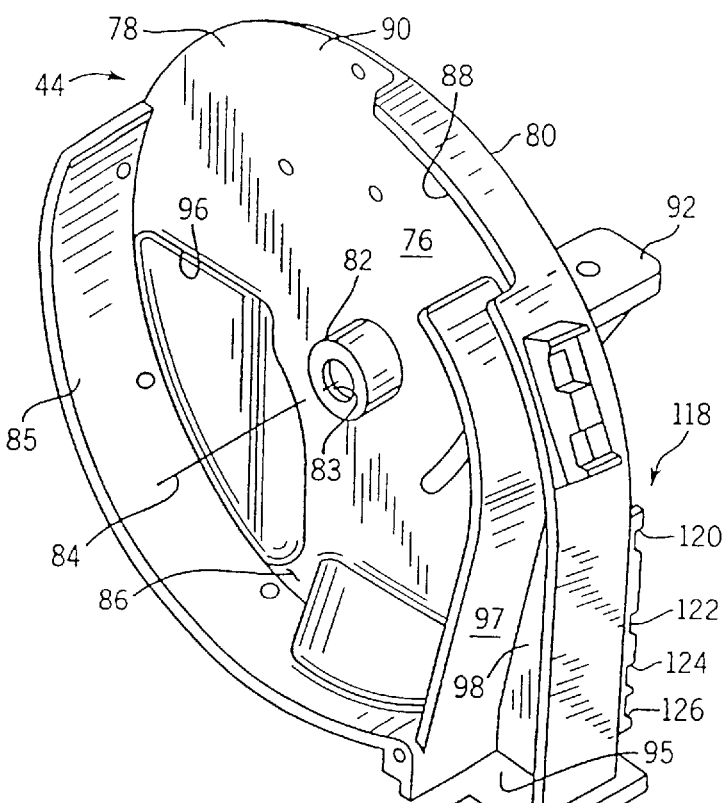
FIG. 10 is a right perspective view of a housing component forming part of the seed metering mechanism of the present invention.
Figure 11:
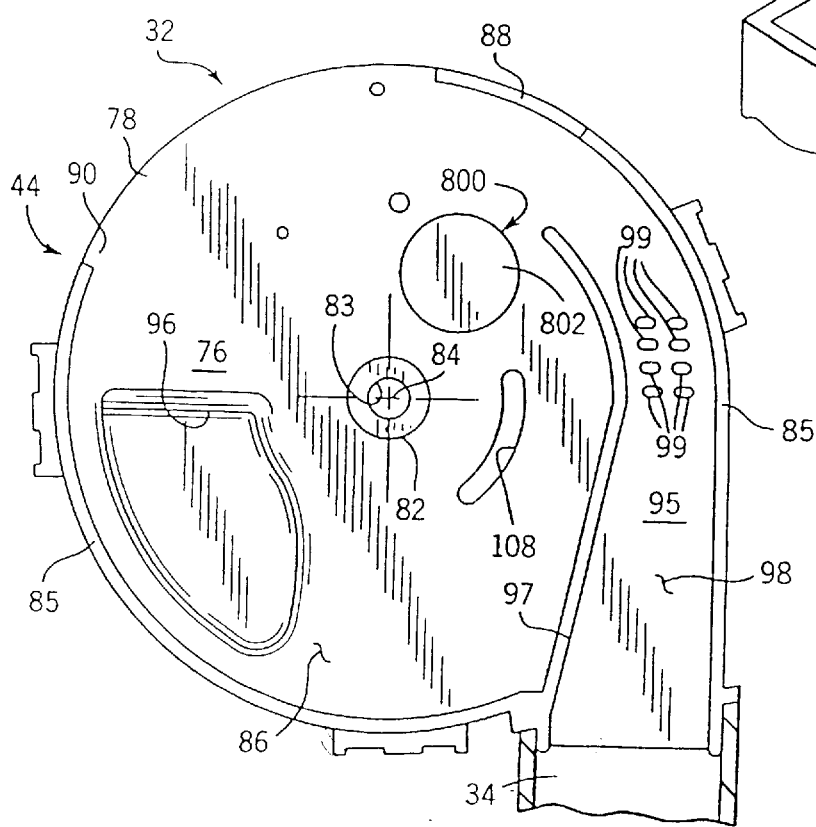
FIG. 11 is an enlarged right side view of the housing component illustrated in FIG. 10.

As shown in FIGS. 10 and 11, housing 44 of the seed metering mechanism 32 is preferably formed from a metal material and includes a generally planar back wall 76 having inner and outer surfaces 78 and 80, respectively. An annular hub 82 is formed at the center of the housing 44 and axially projects inwardly from the inner surface 78. The annular hub 82 defines a central bore 83 defining a longitudinal axis 84 for the seed metering mechanism 32.

Figure 12:
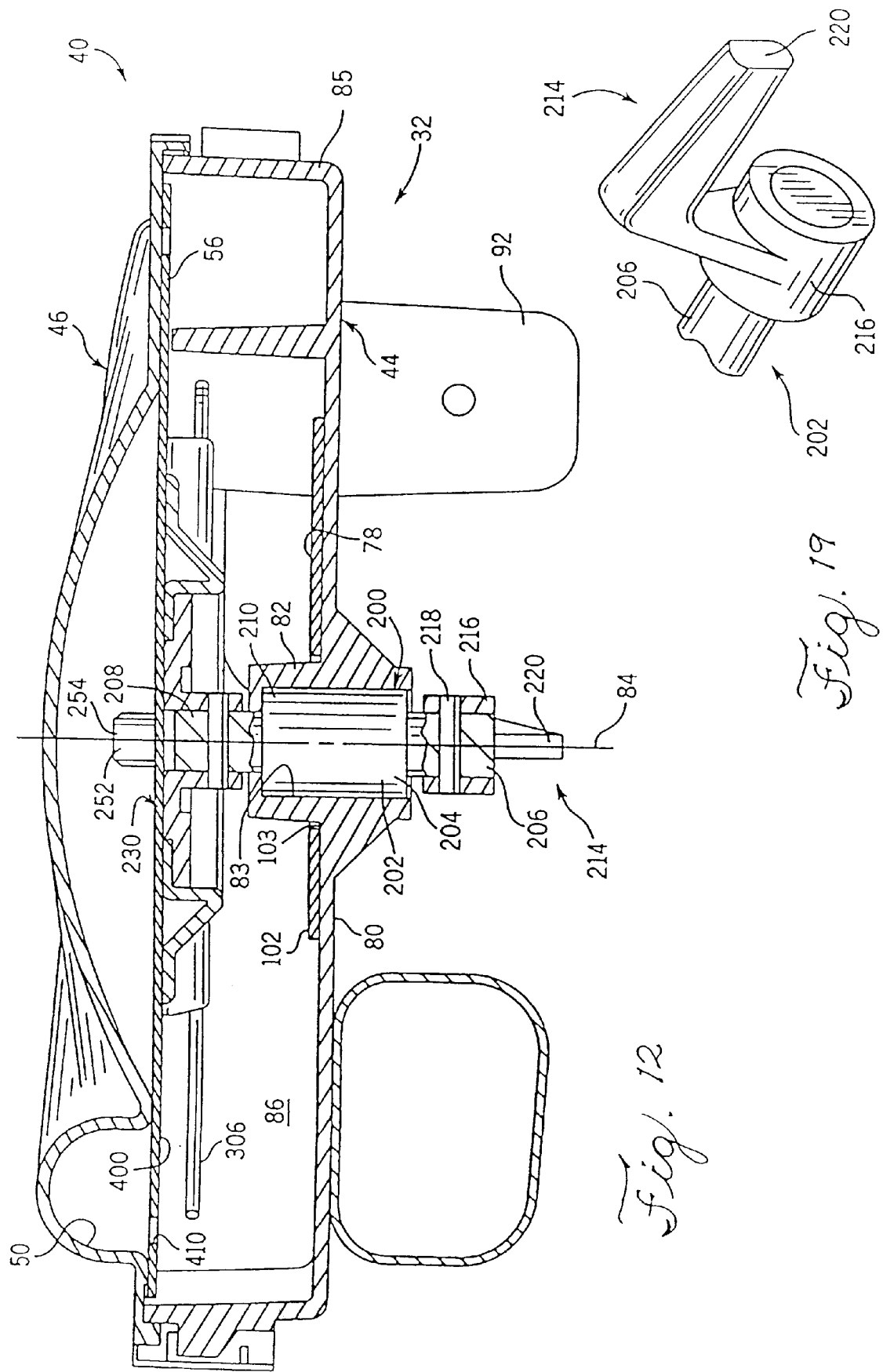
FIG. 12 is a sectional view taken along line 12—12 of FIG. 3.
Figure 13:
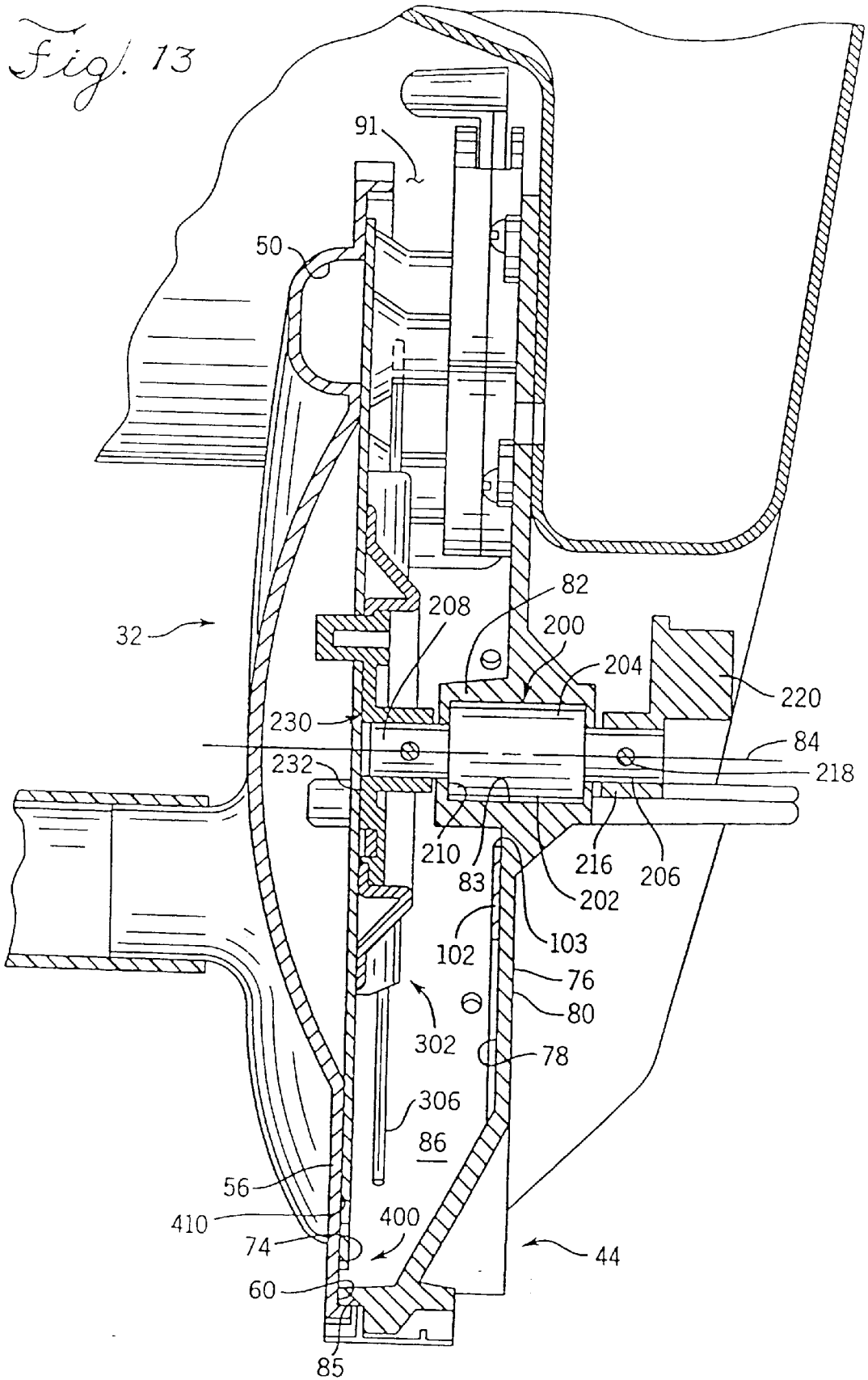
FIG. 13 is a sectional view taken along line 13—13 of FIG. 3.

As shown in FIGS. 12 and 13, the drive assembly 200 axially extends through and is rotatably mounted within the hub 82 of housing 44. As shown in FIGS. 9 through 11, housing 44 defines a circumferential skirt or rim 85 that axially projects forwardly from the inner surface 78 in surrounding relation to a substantial portion of outer periphery of housing 44.

As shown in FIGS. 12 and 13, an annular portion of the edge of rim 85 cooperates and combines with the flat lip area 60 on the inner surface 56 of cover 46 to close the housing assembly 32. Notably, the area surrounded by rim 85 and between the seed plate or disc 400 and the inner surface 78 of the housing 44 defines a seed reservoir or chamber 86 wherein seeds are stored.

As shown in FIGS. 10 and 11, the annular rim or skirt 85 has arcuate areas 88 and 90 that are recessed from the remainder of the edge. When the cover 46 is fastened to the housing 44, these recessed areas 88, 90 define circumferentially extending openings 89 (FIG. 4) and 91 (FIG. 13) allowing atmospheric air to enter the housing assembly 32 and maintain the seeds releasably attached to the disc 400 as a function of the differential air pressures between the suction chamber 50 and the opposite side of the housing 32.

Figure 5:
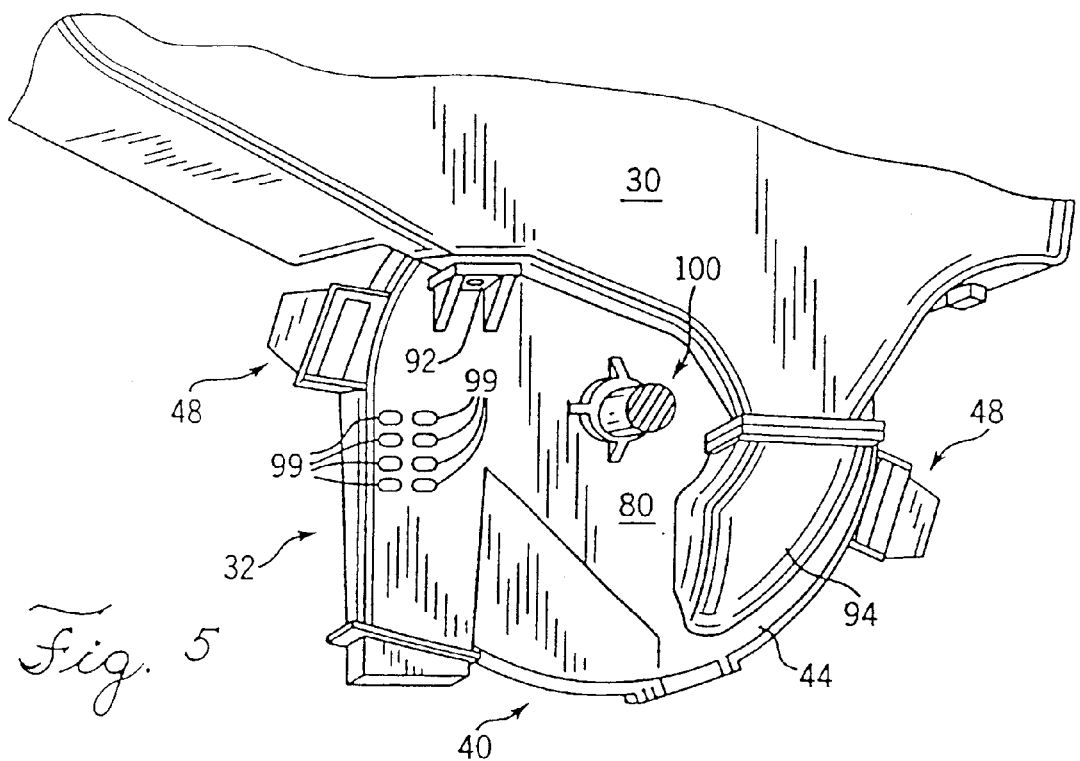
FIG. 5 is a left side perspective view of the seed metering mechanism accor the present invention.

As shown in FIGS. 5, 10 and 14, the outer surface 80 of housing 44 defines a lug 92 which facilitates connection of the housing assembly 32 to the hopper 30. As shown, housing 44 further defines a chute 94 that allows and directs the gravitational flow of seed between the hopper 30 (FIG. 5) and the seed reservoir or chamber 86 (FIG. 12). In this regard, the back wall 76 of housing 44 defines an opening 96 (FIGS. 10 and 11) that allows seeds to pass from the chute 94 into the seed reservoir area or chamber 86 of the seed housing assembly 32.

Figure 54:
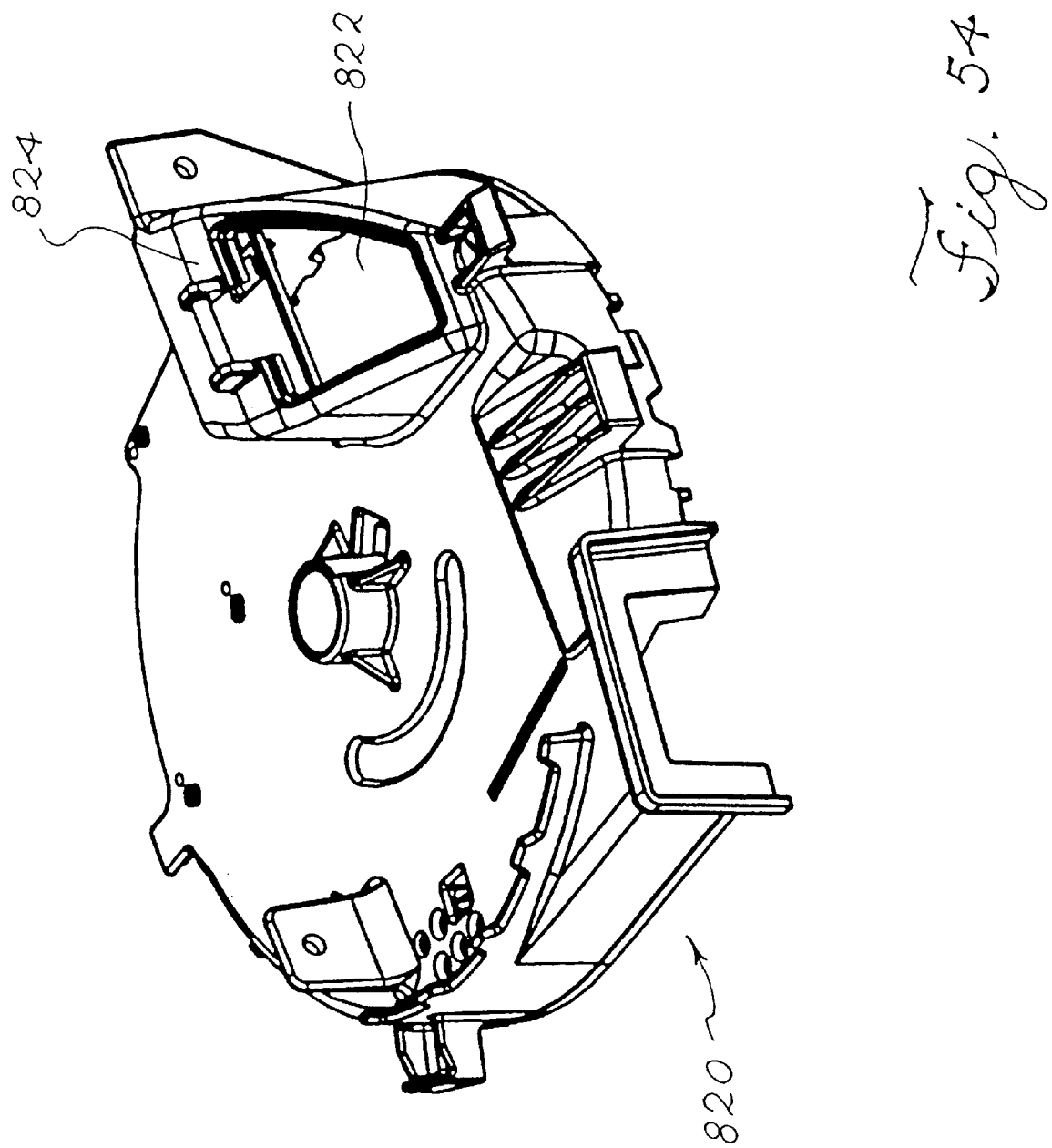
FIG. 54 is a perspective view of an alternative embodiment of a housing.

The chute 94 may also include an opening to allow an operator to remove seeds from the hopper 30. For example, as shown in the alternative embodiment of FIGS. 54–55, the housing 820 includes an opening 822 formed in a chute 824 to allow seeds to be drained from the seed hopper 801. As shown in FIGS. 55a–d, a door 826 is rotatably attached to the chute 824. In particular, a clip portion 829 of the door 826 snaps onto a bar 828 which is formed in the chute 824. The snap-fit clip portion 829 provides simple and convenient means to attach the door 826 to the chute 824. The direction of the snap-in clip portion 829 opposes the direction of force that the seeds exert so that the clip portion 829 cannot snap off the bar 828 while in use. As shown in FIG. 55a and FIG. 55c, the door 826 may be locked into a closed position by pin 830. In the embodiment shown, the pin 830 slides through a collar 827 formed in the door 826 to provide a positive door lock. The pin 830 may include a ring portion 830a which engages a ring retaining tab 825 formed on the housing 820 to lock the pin 830 in place. The door 826 may be locked into the closed position by any suitable means including, for example, mechanical fasteners, latches, etc. As shown in FIG. 55d, when the door 826 is unlocked and opened to drain seeds from the seed hopper 801, the door 826 automatically positions itself vertically so as to not disrupt the seed flow. The door 826 may be comprised of any suitable rigid material including, for example, steel or plastic. In the embodiment shown in FIG. 55a, the door 826 includes a plurality of strengthening ribs 821 formed on an outer surface 821a of the door 826 to provide increased rigidity to ensure that the door 826 remains flat to cover the entire opening 822. The number and configuration of the ribs 821 may vary depending on the amount of rigidity desired.

Referring to FIGS. 10 and 11, housing 44 further defines a wall 97 spaced radially inwardly from run 85 and axially projecting from the inner surface 76 of housing 44. The space or open area 95 between the rim 85 and wall 97 defines a seed exhaust area 98 for the seed metering mechanism 32. The exhaust area 98 opens at its lower end to the seed tube 34 (FIG. 1) and through which the seeds released from the seed plate 400 gravitationally move, ultimately, for deposit onto the ground. In this regard, the back wall 76 of housing 44 defines a series of vertically spaced openings 99 that allow atmospheric air to pass into the exhaust area 98 and facilitate the flow of seeds toward the seed tube 34 by eliminating or significantly reducing the air drawn upwardly into the seed discharge area 98 of the seed metering mechanism. In the preferred embodiment of the invention, and as shown in FIGS. 15 and 16, the openings 99 preferably have slotted or elongated configurations. Alternatively, the openings 99 may be any other shape or configuration to allow air to pass into the exhaust area 98. For example, in the embodiment shown in FIG. 55, the openings 823 may preferably have a circular configuration.

Returning to FIG. 3, when the cover 46 is releasably attached to the housing 44, a substantial portion of chamber 50 extends through the seed reservoir area 86 of housing 44. Moreover, the leading end of the vacuum chamber 50 is disposed proximate to but remains outside of the discharge chute 98 of the housing 44. At its other end, suction chamber 50 terminates toward the upper end of the discharge area or chute 98 such that seeds released from the seed plate 400 pass downwardly into the discharge chute 98 and pass gravitationally toward the seed tube 34. Moreover, with the cover 46 so arranged on the housing 44, leg portion 62 of the housing overlies and closes the open side of the discharge chute 98 defined by housing 44 to prevent seeds released from the seed disc from inadvertently escaping from the housing assembly 32.

Figure 59:
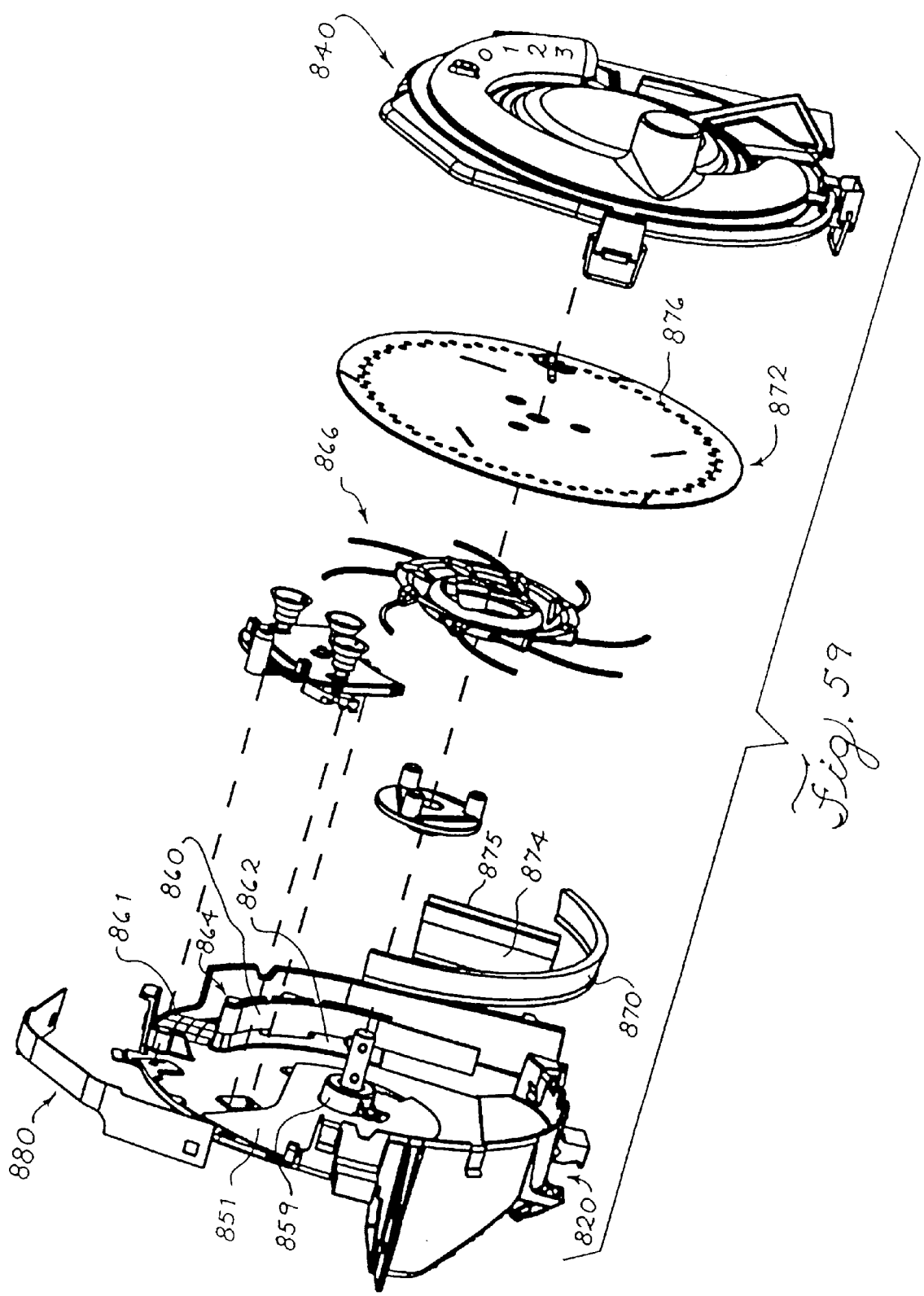
FIG. 59 is a reversed exploded perspective view of the embodiment shown in FIG. 58.

In the embodiment shown in FIG. 59, a wear strip 860 is secured to an inner surface 862 of a wall 864 of the housing 820 to prevent any wear that may be caused by the rotation of an agitator 866. The wear strip 860 may preferably be comprised of a rigid material including, for example, plastic. The plastic may preferably be comprised of, for example, ultra high molecular weight polyethylene.

Figure 58:
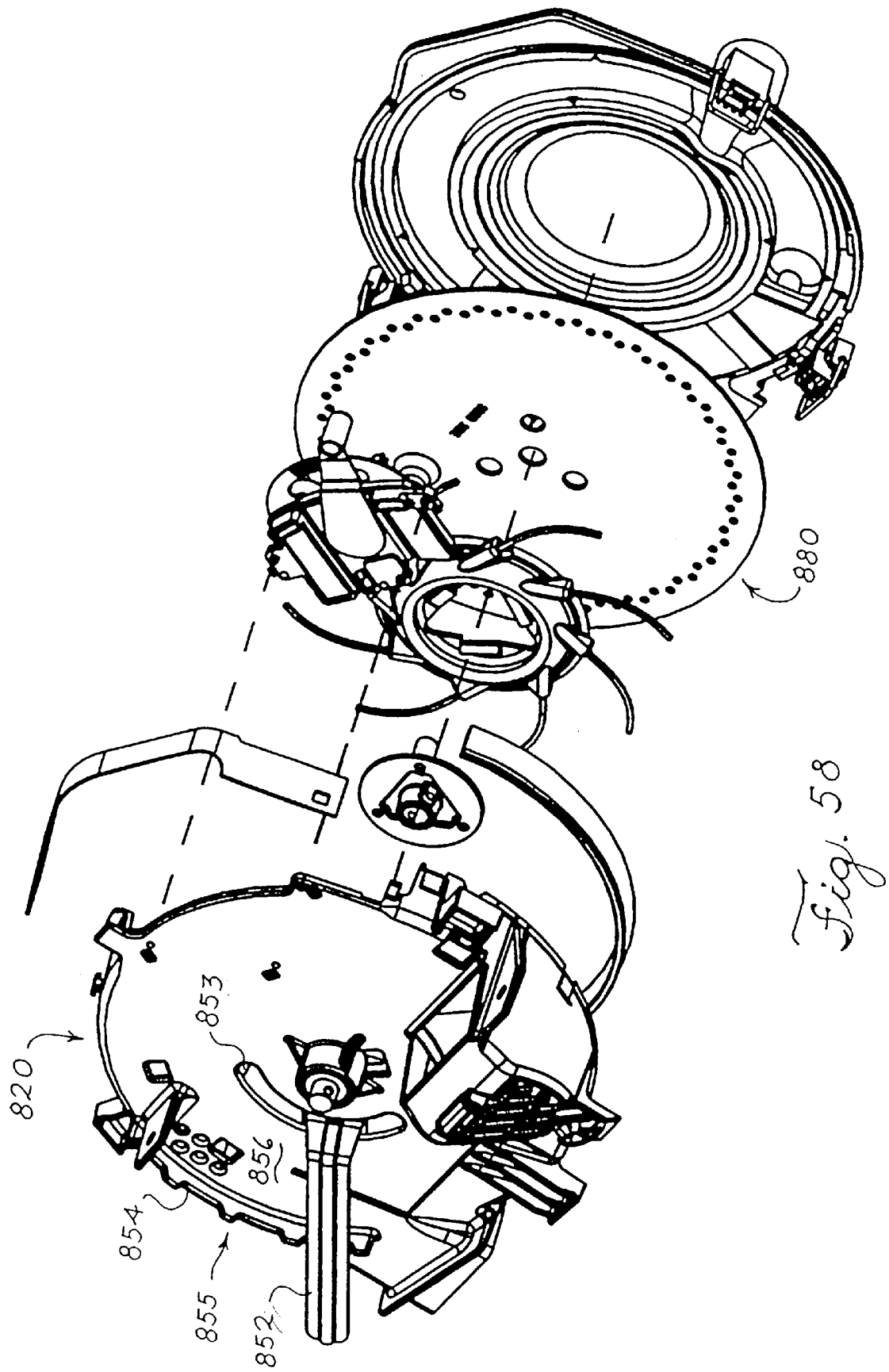
FIG. 58 is an exploded perspective view of an alternative embodiment of a seed metering mechanism.

In the embodiment shown in FIG. 59, an annulus brush 870 may preferably be mounted within the housing 820 to prevent seeds from exiting the seed chamber through a gap formed between the housing 820 and a perimeter edge of a seek disc 872. The annulus brush 870 may be comprised of any rigid material including, for example, plastic. A linear brush 874 may also preferably be mounted within the housing 820 to prevent seeds from exiting the seed chamber. The linear brush 874 may include a brush portion 875 which cleans debris away from openings 876 formed in the seed disc 872 as the disc rotates in operation. As shown in FIGS. 58 and 59, a screen 880 may be positioned between the housing 820 and the cover 840 to prevent seeds which are circulated within the seed reservoir chamber by the agitator 866 from exiting the seed reservoir chamber. Moreover, the screen 880 preferably has a suitable amount of openings to allow air to pass into the interior of the seed metering mechanism, while at the same time preventing airborne debris from entering the interior of the seed metering mechanism. The screen 880 may preferably be comprised of a rigid material such as, for example, plastic. Also shown in FIG. 59, a removable screen or guard 861 may be positioned within the housing 820 to prevent seeds in the seed chamber which are contacted by the agitator 866 from entering the seed discharge area of the housing 820.

The purpose of the seed baffle assembly 100 is to control the seed level in the seed reservoir 86 from outside of the housing assembly 40. With the present invention, and as mentioned above, the cover 46 is preferably removable from the housing 44. After the cover 46 is removed and the seed plate 400 is removed, the seeds in the reservoir 86 will tend to pour out to the ground. Moreover, if there is nothing to close the opening 96 at the bottom of the chute 94, the seeds in the supply hopper 30 will likewise tend to pour onto the ground. Accordingly, the present invention provides the seed baffle assembly 100 for selectively allowing the operator to choose the level of seed mass in the reservoir 86 from outside of the housing 44. That is, and unlike other seed metering mechanisms, the seed baffle assembly 100 is adjustable from the outside and does not require the operator to gain access to the interior of the seed metering mechanism 32 in order to close off the opening 96 leading from the hopper 30.

Figure 17:
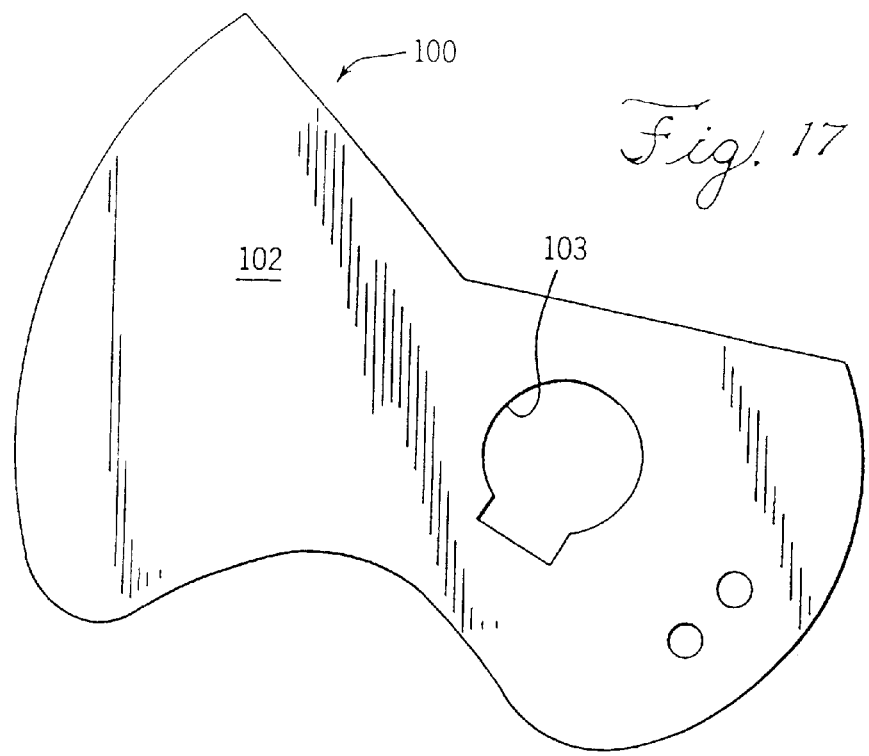
FIG. 17 is a right side view of a baffle used in combination with the housing present invention.
Figure 18:
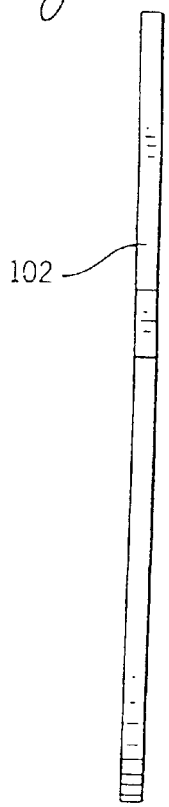
FIG. 18 is an end view of the baffle illustrated in FIG. 17.

As shown in FIGS. 9, 17 and 18, the seed baffle assembly 100 comprises a seed baffle 102 having a general planar configuration. The seed baffle 102 defines a generally central throughbore 103 that allows the seed baffle 102 to be mounted for rotation about the hub 82 of the housing 44 of housing assembly 40. As shown in FIG. 12, the seed baffle 102 is configured to mount in abutting and generally sealing relationship with the inner surface 78 of the housing 44. Notably, the profile of the seed baffle 102 is such that the baffle 102, when properly positioned relative to housing 44 of the housing assembly 40, can completely close the opening 96 (FIG. 11) at the bottom of the chute 94 through which seed is directed into the seed reservoir of housing 44.

As shown in FIGS. 14 and 15, the seed baffle assembly 100 further includes a linkage assembly 106 that is exteriorly manipulated from outside of housing 44 to effect the disposition of the seed baffle 102 and thereby control the operable size of the opening 96 in the housing 44. Returning to FIG. 11, the rear wall 76 of the housing 44 defines an arcuate slot 108 that extends through the wall 76 and has a radius concentric with the longitudinal axis 84 of the hub 82. The exterior surface 80 of the rear wall 76 of housing 44 furthermore defines a pivot 110 (FIG. 15).

In the illustrated embodiment of the invention, and as shown in FIGS. 14 and 15, the linkage assembly 106 of the seed baffle assembly 100 preferably comprises a manually operated elongated lever 112 that extends parallel to the rear wall 76 of housing 44 and is pivotally connected intermediate its ends to a pivot 110 defined on the exterior 80 of housing wall 76. A free end 113 of lever 112 extends beyond the periphery of the housing 44. An elongated link section 114 of lever 112 extends parallel to an exterior side 80 of wall 76 and away from the pivot 110 of lever 112. As will be appreciated, movement of lever 112 will result in pivotal movement of the link section 114. A second elongated link 116, arranged parallel to and extending adjacent the outer surface 80 of wall 76, is articulately joined, at one end, to the free end of link section 114 of lever 112. At its opposite end, link 116 is connected through the slot 108 to the seed baffle 102 (FIG. 17). The connection between and the travel of link 116 of linkage assembly 106 is guided by the arcuate shape of the slot 108. As will be appreciated, opposite ends of the slot 108 limit the travel of the linkage 106 and thereby the travel of the seed baffle 102 relative to the opening 96 in the rear wall 76 of the housing 44.

As shown in FIGS. 10, 14 and 15, the exterior surface 80 of wall 76 on housing 44 defines a flange 118 preferably formed integral with the housing 44 and extending generally normal to the major exterior surface 80 of the housing 44. The flange 118 defines a series of vertically spaced detents or notches 120, 122, 124 and 126. Each notch or detent 120, 122, 124 and 126 opens to a common side of flange 118 to releasably accommodate the lever 112 therewithin.

In an embodiment of the invention, the lever 112 is sized such that the free end thereof extends radially past the flange 118 for easy and ready manual engagement. In an embodiment of the invention, and to facilitate insertion of the lever 112 into the respective notch 120, 122, 124 or 126, in the area where the lever 112 passes in proximity to the notches 120, 122, 124 and 126, the lever 112 is configured with a generally circular cross-sectional configuration. The thickness of each notch or recess 120, 122, 124 and 126 defined on flange 118 closely proximates the diameter of the lever 112. By such construction, the lever 112 can be manually and readily shifted from one notch to the other while the respective notches furthermore serve to releasably maintain the lever 112 in position selectively chosen by the operator during the functioning of the seed metering mechanism 32. As will be appreciated, movement of the lever 112 likewise effects displacement of the seed baffle 102 relative to the opening 96 thereby regulating the flow of seeds through the opening and into the seed reservoir 86.

In the illustrated form of the invention shown in FIG. 13, the notches 120 and 126 define the extreme limits of movement of the seed baffle 102 relative to the opening 96 leading to the seed reservoir 86. Moreover, it should be readily appreciated that less or more notches than that shown can be arranged on the housing 44 without detracting or departing from the spirit and scope of the present invention.

Figure 57:
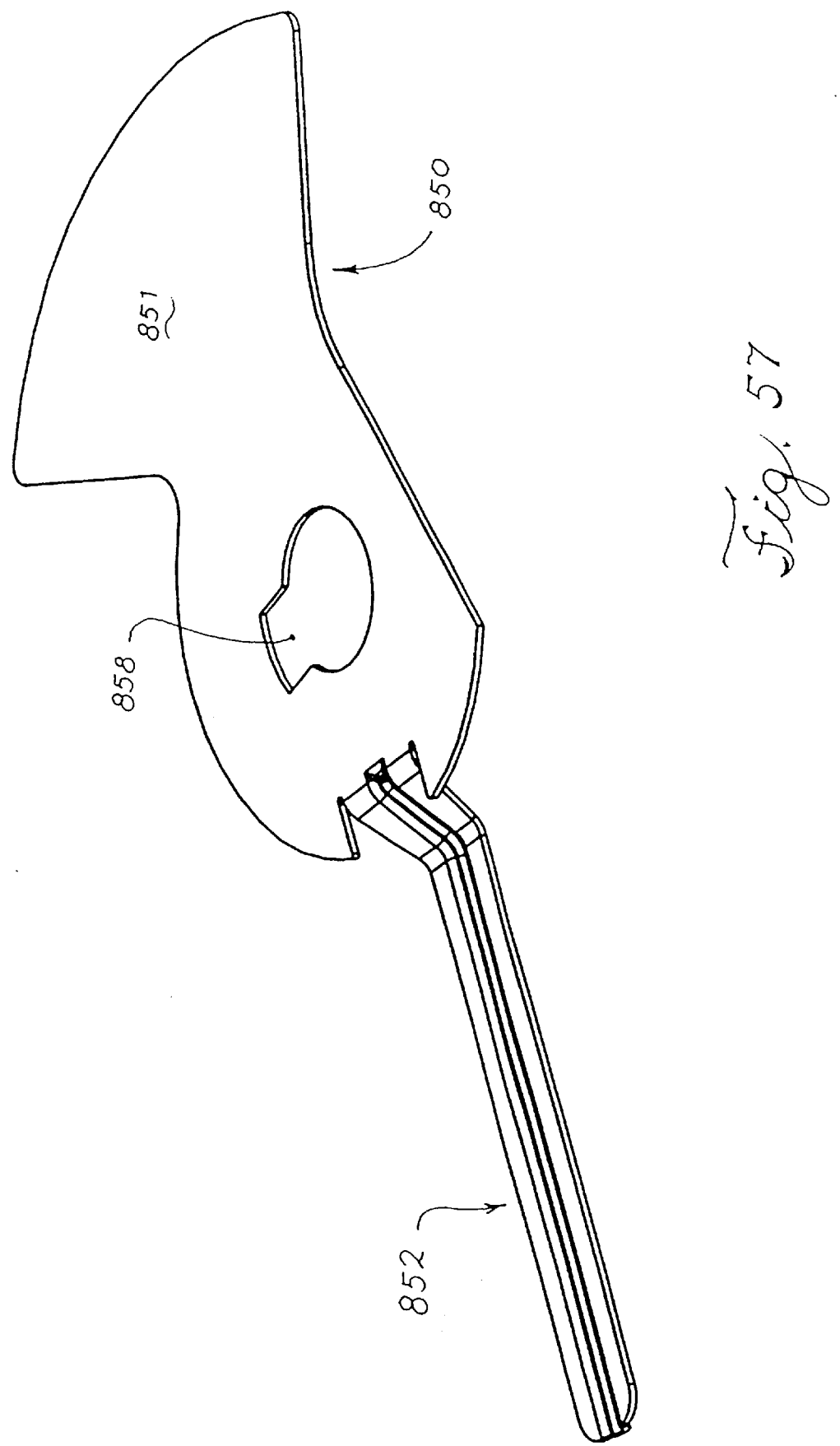
FIG. 57 is a perspective view of an alternative embodiment of a seed baffle.
Figure 63A:
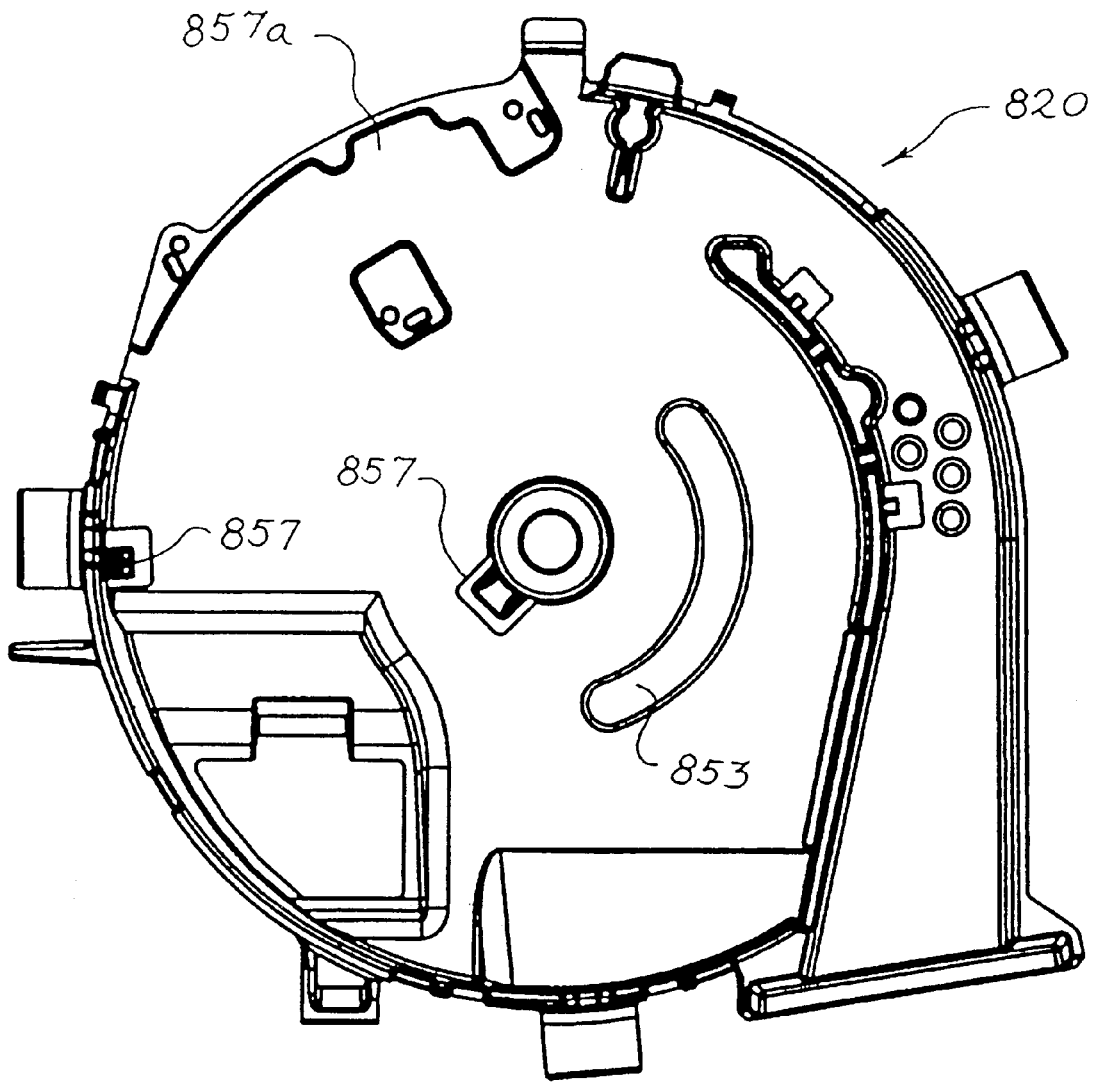
FIG. 63a is a front view of an alternative embodiment of a housing.
Figure 63B:
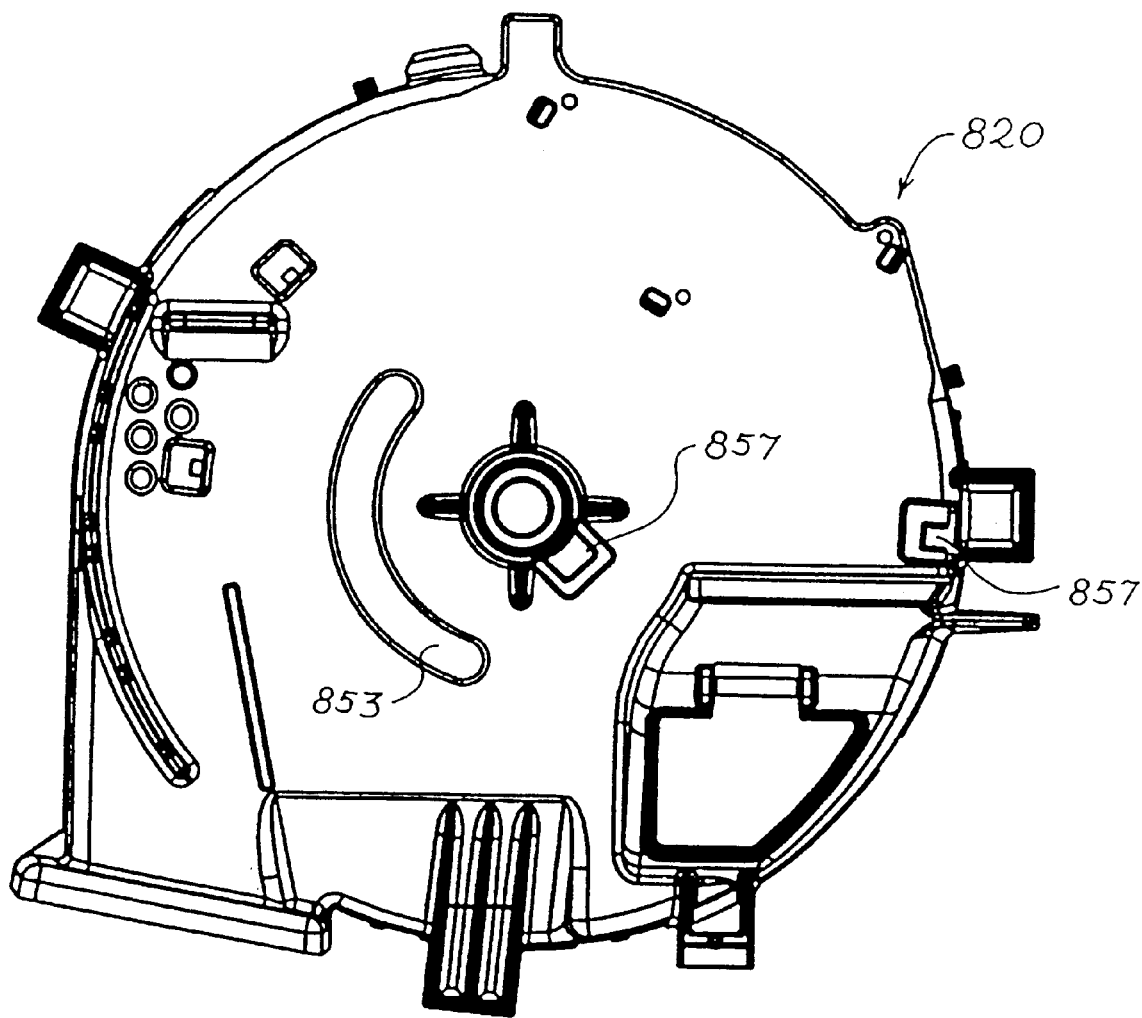

An alternative preferred embodiment of a seed baffle 850 is shown in FIG. 57. A body portion 851 and a handle portion 852 are preferably integrally connected. The seed baffle 850 may preferably be comprised of a single piece of rigid material such as, for example, steel, aluminum, or plastic. Alternatively, a rigid body portion 851 may be combined with a rigid but flexible handle portion 852. As shown in the embodiments of FIGS. 58 and 59, the handle portion 852 is inserted through an arcuate opening 853 formed in the housing 820, and is received in at least one notch 854 formed in a notch wall 855 which is integrally formed on an outer side 856 of the housing 820. The housing 820 may preferably be made of, for example, aluminum. As shown in FIG. 58, four notches 854 are provided, although the number of notches 854 may vary depending upon the particular application. The notches 854 receive and retain the handle portion 852 into a desired position. A flexible handle portion 852, for example, will aid in positioning the handle portion 852 in a notch 854 and biasing the handle portion 852 to retain the handle portion 852 within the notch 854 while the seed planter is in operation. As shown in FIGS. 57 and 59, the body portion 851 defines an opening 858 that allows the body portion 851 to be mounted for rotation about a hub 859. As shown in FIGS. 63a–b, the housing 820 includes two retaining members 857 which engage the body portion 851 and causes the body portion 851 to remain in contact with an inner surface 857a of the housing 820 when the seed baffle 850 is installed. One advantage of this arrangement is that no mechanical fasteners are required to mount the body portion 851 to the housing 820. Moreover, the one piece design eliminates the need for a linkage assembly thereby reducing costs associated with the manufacture and installation of the seed baffle 850.

In the embodiment shown in FIG. 59, the cover 840 may include indicators spaced along the cover 840 to allow the operator to ascertain the size of the seed chamber opening relative to the position of the handle portion 852 of the seed baffle 850. For example, as shown in FIG. 59, reference numerals such as 0, 1, 2, and 3 may be inscribed in the cover 840, each numeral corresponding to a different notch 854 (see FIG. 58). In operation, an operator may position the handle portion 852 into a notch corresponding to numeral 1, for example, to provide a small seed chamber opening when planting smaller or expensive seeds to prevent an excessive number of seeds from entering the seed chamber which may decrease seed metering efficiency. Alternatively, the operator may position the handle portion 852 into a notch corresponding to numeral 3, for example, to provide a large seed chamber opening when planting large seeds to allow adequate flow from the hopper to maintain an adequate amount of seeds in the seed chamber during operation. The operator may also position the handle portion 852 into a notch corresponding to numeral 0 to completely close the seed chamber opening. Closing the seed chamber opening may be desirable, for example, when draining seeds from the seed hopper.

A schematic illustration of the drive mechanism 200 is provided in FIGS. 12 and 13. As shown, the drive mechanism 200 comprises a driven shaft 202 that is rotatably mounted within the bore 83 defined in the housing 44 and coaxial with the longitudinal axis 84 of the seed meter assembly 32. As shown, the driven shaft 202 has a center section 204 with reduced diameter sections 206 and 208 axially extending from opposite sides of the center section 204 and extending to respective free ends of the shaft 202. Notably, the differences in diameter between the center section 204 and the reduced diameter section 208 results in the provision of a radial shoulder 210 therebetween. In the illustrated embodiment, the radial shoulder 210 on the shaft 202 abuts with an inward projection defined by the hub 82 on the rear wall 76 of housing 44 thereby limiting axial displacement of the driven shaft 202 to the left as shown in FIG. 6.

The reduced diameter section 206 projects outwardly from the rear wall 76 of the housing 44 and has a driven coupler 214 carried at the free end thereof for releasably coupling the driven shaft 202 to a conventional drive coupler mechanism such as that described in U.S. Patent Application entitled "Automatic Coaxial Engagement Drive Coupler" which was filed on Apr. 15, 1998. The driven coupler 214 may be comprised of a plastic resin including, for example, Estaloc™ grade 59600 manufactured by BF Goodrich Company. This particular grade has been found to provide adequate rigidity and is impact resistant. Additives may be added to the Estaloc™ to make the driven coupler 214 resistant to static charge build-up or to make it electrically conductive. As shown in FIGS. 12, 13 and 19, the driven coupler 214 has a mounting hub 216 that fits about and is releasably connected to the reduced diameter section 206 of the driven shaft 202 as with a suitable pin 218 or the like. The driven coupler 214 furthermore includes a driven lug 220 that axially extends generally parallel to but is disposed in radially spaced relation relative to the longitudinal axis 84 of the seed metering assembly 32. As will be appreciated, movement imparted to the driven lug 220 will likewise be transferred to the mounting hub 216 and thereby to the driven shaft 202. As is well known in the art, the driven lug 220 mates with a drive lug provided on a conventional and well known drive coupler that is disposed on the outside of the exterior surface 80 of the housing 44 and which conventionally forms part of the drive coupler mechanism. As will be appreciated by those skilled in the art, using only a single or one driven lug 220 on the drive mechanism 200 facilitates removal, when necessary, of the hopper 30 and the seed metering mechanism 32 from the planting unit 14.

Figure 20:
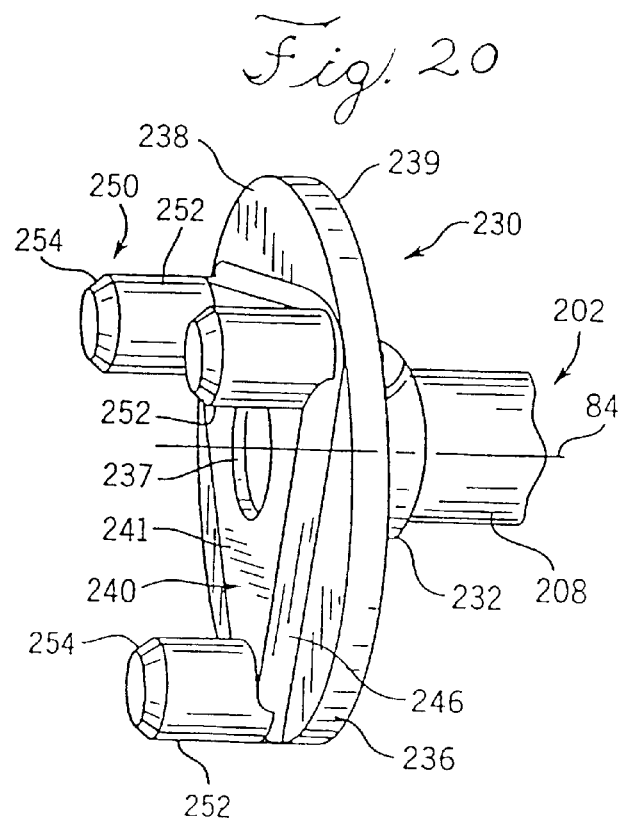
FIG. 20 is a perspective view of a drive hub forming part of a drive assembly of the seed metering mechanism of the present invention.
Figure 21:
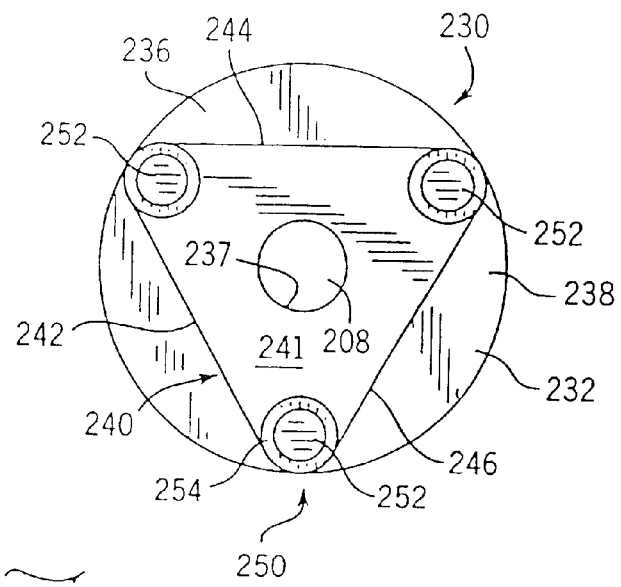
FIG. 21 is a right side view of the drive hub illustrated in FIG. 20.
Figure 22:
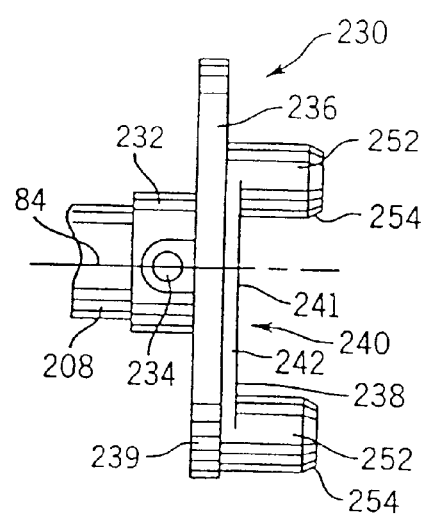
FIG. 22 is a rear elevational view of the drive hub illustrated in FIGS. 20 and 21.

A drive rotor 230 is mounted at the opposite end of driven shaft 202 on the reduced diameter section 208. As shown in FIGS. 20, 21 and 22, the drive rotor 230 comprises a mounting hub 232 that fits about and is releasably secured to the reduced diameter section 208 of the driven shaft 202 as with a suitable pin 234 (FIG. 22) or the like. Notably, and as shown in FIGS. 12 and 13, the mounting hub 232 has a greater diameter than the bore 83 defined in the hub 82 and through which the reduced diameter portion 208 axially extends. Accordingly, when the drive rotor 230 is fastened to the driven shaft 202, the driven shaft 202 is prevented from moving to the right as shown in FIGS. 12 and 13 by the mounting hub 232 abutting with the hub 82 in the housing 44 of the seed metering housing assembly 32.

Returning to FIGS. 20 through 22, the drive rotor 230 further includes first and second driving sections 240 and 250, respectively, that are arranged in centered relation about the longitudinal axis 84 of the seed metering mechanism 32. As shown, the drive rotor 230 includes an enlarged disc-like member 236 defining a central bore 237 and having generally planar axially spaced and generally parallel major surfaces 238 and 239, respectively, radially extending outwardly to the periphery of the drive rotor 230. Projecting axially outwardly from the major surface 238 of the disc-like member 236 are the first and second driving sections 240 and 250, respectively.

The first driving section 240 comprises a multi-sided configuration wherein each of the sides of the driving section 240 are equal to each other but define a flat surface area 241 that is axially spaced from and is smaller than the major surface 238 of the disc-like member 236 such that surface 238 acts as a stop for the axial arrangement of subsequent members or pieces placed thereabout as will be described in detail hereinafter. In the illustrated embodiment, driving section 240 has a generally triangular configuration including side surfaces 242, 244 and 246 that axially project from the major surface 238 of the disc-like member 236 of drive rotor 230. It will be appreciated, however, that other configurations for the driving section 240 would equally suffice without detracting or departing from the spirit and scope of the present invention. For example, the first driving section 240 could be configured with four equal sides or five equal sides that axially project away from the planar surface 238 of the disc-like member 236.

The second driving section 250 of the drive rotor 230 likewise comprises a multi-sided configuration that axially extends beyond the first driving section 240. In the illustrated embodiment, the second drive section 250 comprises a plurality of equally spaced and axially elongated pins 252. Moreover, the pins 252 are all arranged in a common radial distance from the longitudinal axis 84 of the seed metering mechanism 32. In the illustrated embodiment, each pin 252 has a generally cylindrical like configuration between opposite ends thereof. It will be appreciated, however, that other pin configurations would equally suffice without detracting or departing from the spirit and scope of the present invention. Moreover, each pin 252 has a chamfered configuration 254 at the distal end thereof for promoting axial placement of the seed metering disc 400 thereover. In the illustrated embodiment, the pins 252 are integrally formed with the disc-like member 236. It will be appreciated, however, that the pins 252 could be formed separate from and then added to the disc-like member 236.

Figure 60A:
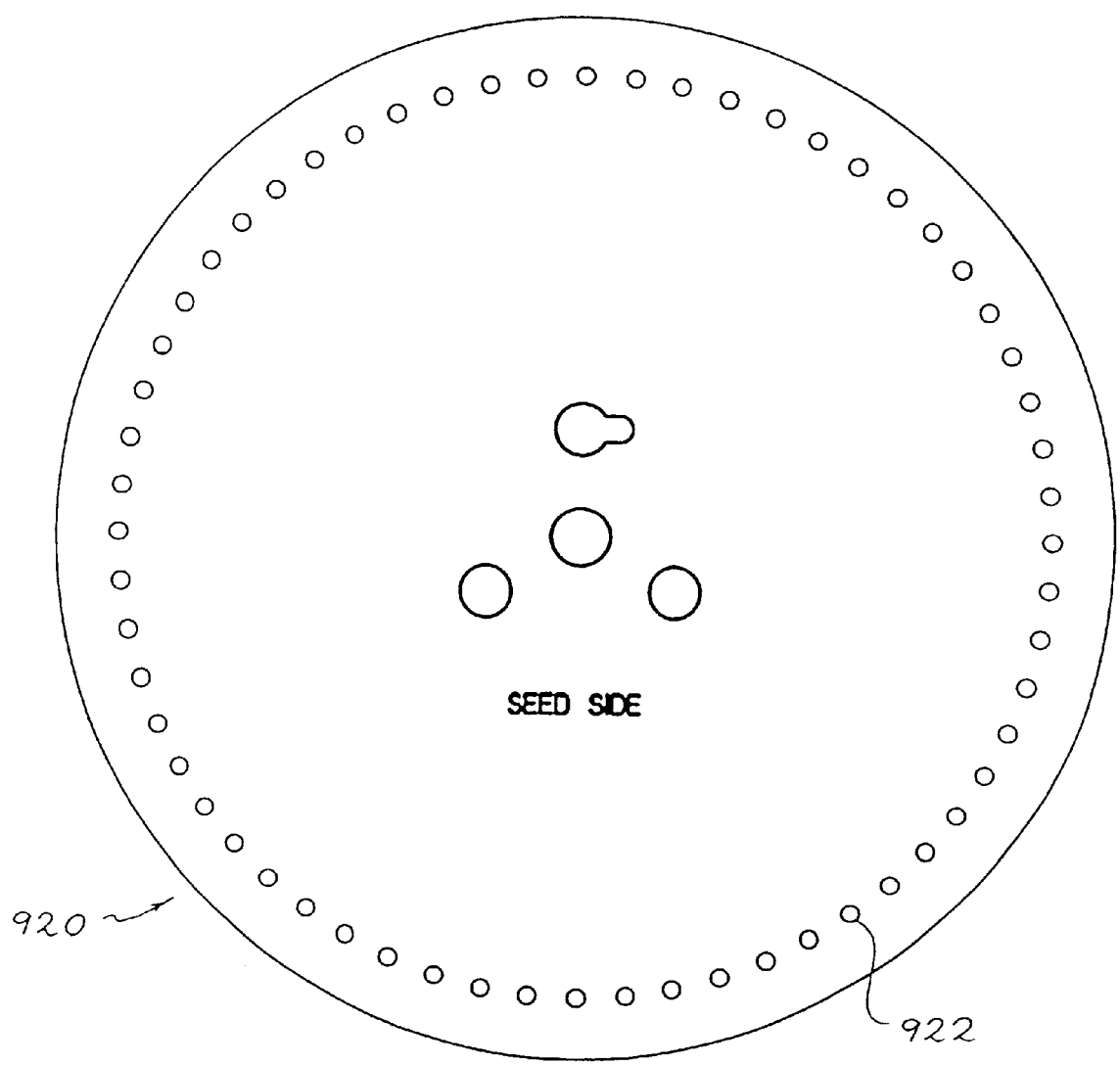
FIG. 60a is a seed side view of an alternative embodiment of a seed disc.

FIGS. 79–82 illustrate an alternative embodiment of a drive rotor 1130. The drive rotor 1130 includes a plurality of pins 1132 for engaging a seed disc. The drive rotor 1130 defines a through opening 1134 for mounting the drive rotor 1130. The through opening 1134 may preferably be keyed in any conventional manner so that drive rotor 1130 can be mounted for rotation in only one direction. Moreover, the pins 1132 may be keyed in any conventional manner to allow proper mounting orientation of a seed disc. As shown in FIG. 60a, the seed disc may include a keyed opening 921 for receiving the keyed pin 1132.

The agitator assembly 300 is arranged in driving relation relative to the drive rotor 230 of the drive assembly 200. As mentioned, the purpose of the agitator assembly is to inhibit seeds from compacting within the seed reservoir 86 of the housing assembly 32.

Figure 23:
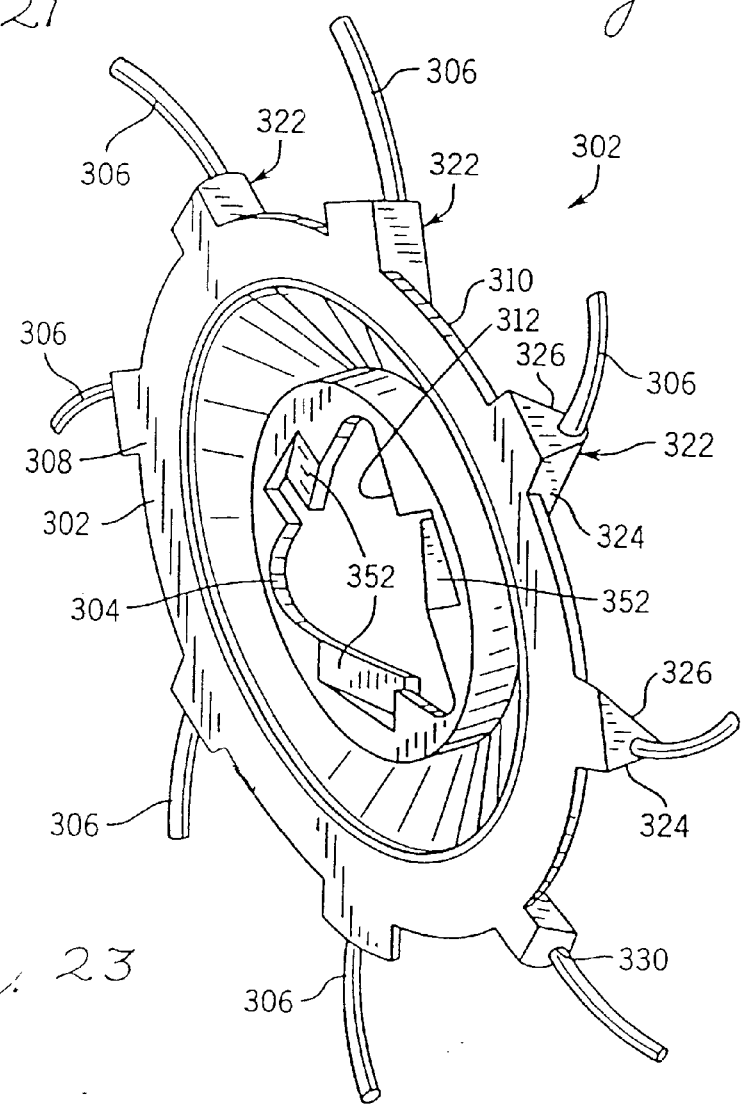
FIG. 23 is a perspective view of an agitator assembly used in combination with the seed metering mechanism of the present invention.

In the illustrated embodiment, and as shown in FIGS. 23 and 24, the agitator assembly 300 includes a disc shaped rotor 302 having a central hub 304 and a plurality of flexible and readily replaceable fingers 306 radially extending from the rotor 302. In the illustrated embodiment, the central hub 304 is axially displaced from the remainder of the rotor 302 and has first and second generally parallel side surfaces 308 and 310, respectively. Notably, the axial distance separating the first and second surfaces 308, 310 of the central hub 304 of rotor 302 is generally equal to the axial distance the side surfaces 242, 244 and 246 project away from the major surface of the disc-shaped member 236 of drive rotor 230 of the drive section 240.

The central hub 304 of agitator assembly 300 furthermore defines a centrally located through opening 312 that is configured to substantially correspond to the cross-sectional configuration of the first driving section 240 of drive assembly 200. That is, in the illustrated embodiment, the opening 312 in the rotor 302 of the agitator assembly 300 has a generally triangular configuration that substantially corresponds to the triangular shape of the first driving section 240. It will be appreciated, however, that changes in the configuration of the first driving section of drive assembly 200 will be equally reflected in the shape and size of the opening 312 in the rotor 302 of the agitator assembly 300. As such, when the rotor 302 of agitator assembly 300 is mounted on the first drive section of the drive rotor 230 of drive assembly 200, a drive connection is established between the drive rotor 230 of drive assembly 200 and the rotor 302 of agitator assembly 300.

The remaining portion of the disc-shaped rotor 302 radially extending from the central hub 304 has generally parallel first and second side surfaces 318 and 320, respectively. Toward the periphery of the rotor 302 there are provided a series of equally disposed receptacles 322 for releasably accommodating one end of each finger 306. Each receptacle 322 has inclined surfaces 324 and 326 projecting angularly away from the side surface 318 of the rotor 302. Such receptacles 322 act as fins or step-like extrusions. As such, and upon rotation of the rotor 302, the seed mass in the seed reservoir 86 defined by the housing 44 of the housing assembly 32, is agitated by the receptacles 322 in a manner preventing the seed mass from compacting itself during operation of the seed metering mechanism 32. Similarly, the fingers 306 projecting radially outwardly from each receptacle 322 tends to agitate the seed mass in the housing 44 upon rotation of the rotor 302.

In a preferred form of the invention, the fingers 306 projecting outwardly from the rotor 302 range in size from about 0.080 inches to about 0.095 inches in diameter and are preferably made from a nylon-like material or other suitable flexible material such as that used in grass trimming machines. Preferably, the fingers 306 radially extend outwardly for a distance equal to about 150 mm. Notably, the fingers 306 are disposed in a swept back configuration relative to the direction of rotation of the rotor 302. As such, should the fingers 306 engage an object along their path of travel, the fingers 306 merely tend to deflect around and out of the way of the obstruction without damaging either the obstruction or the finger 306. In a most preferred form of the invention, one end of each finger 306 is releasably accommodated within a hole or opening 330 defined by each receptacle 322 on the rotor 302. Accordingly, repair or replacement of the fingers 306 is readily and easily effected. It will be appreciated, however, that it is likewise within the spirit and scope of the present invention to form the fingers 306 as permanent cast or integral part of the rotor 302.

Figure 77:
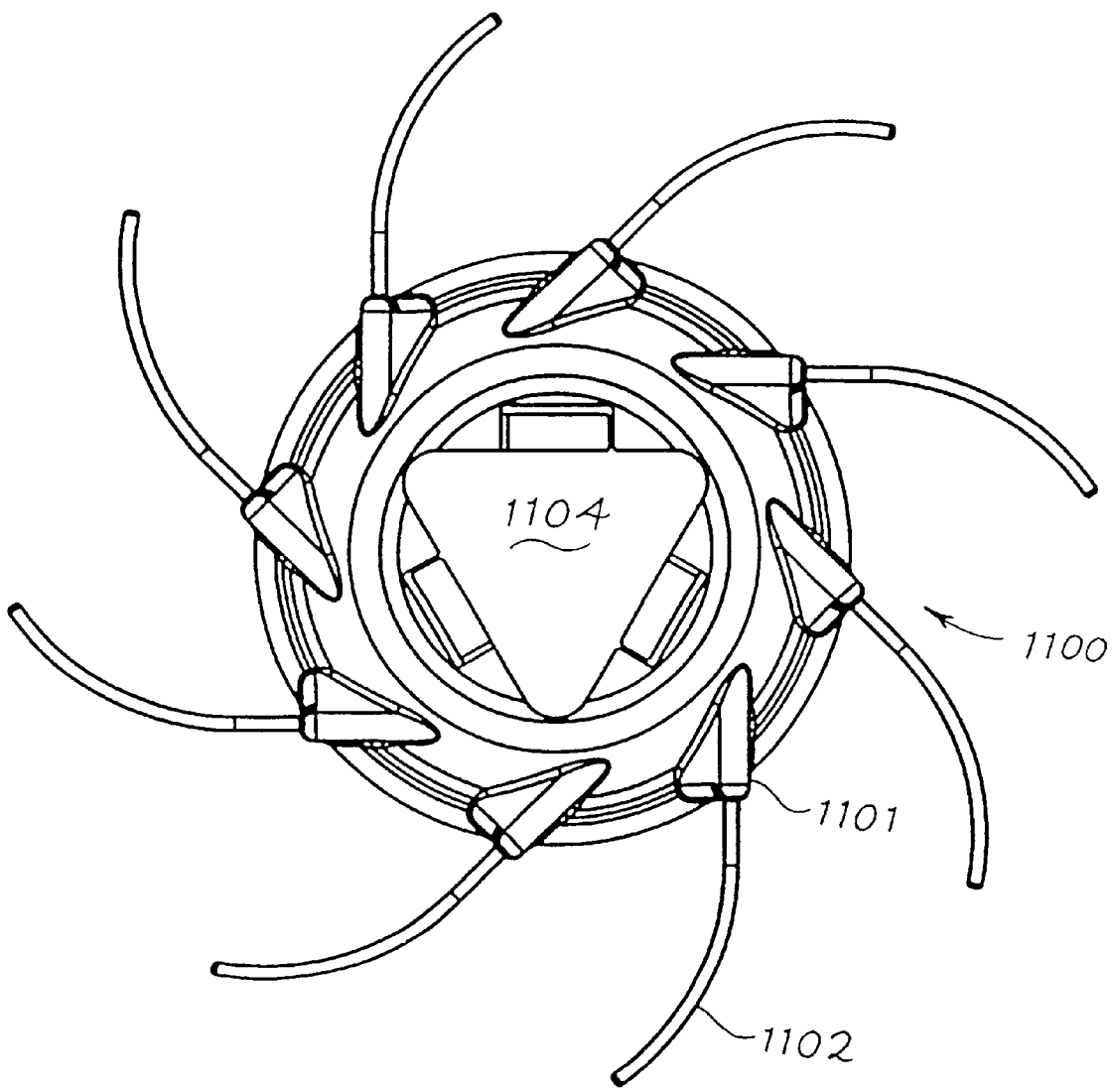
FIG. 77 is a front view of an alternative embodiment of an agitator made in accordance with the invention.
Figure 78:
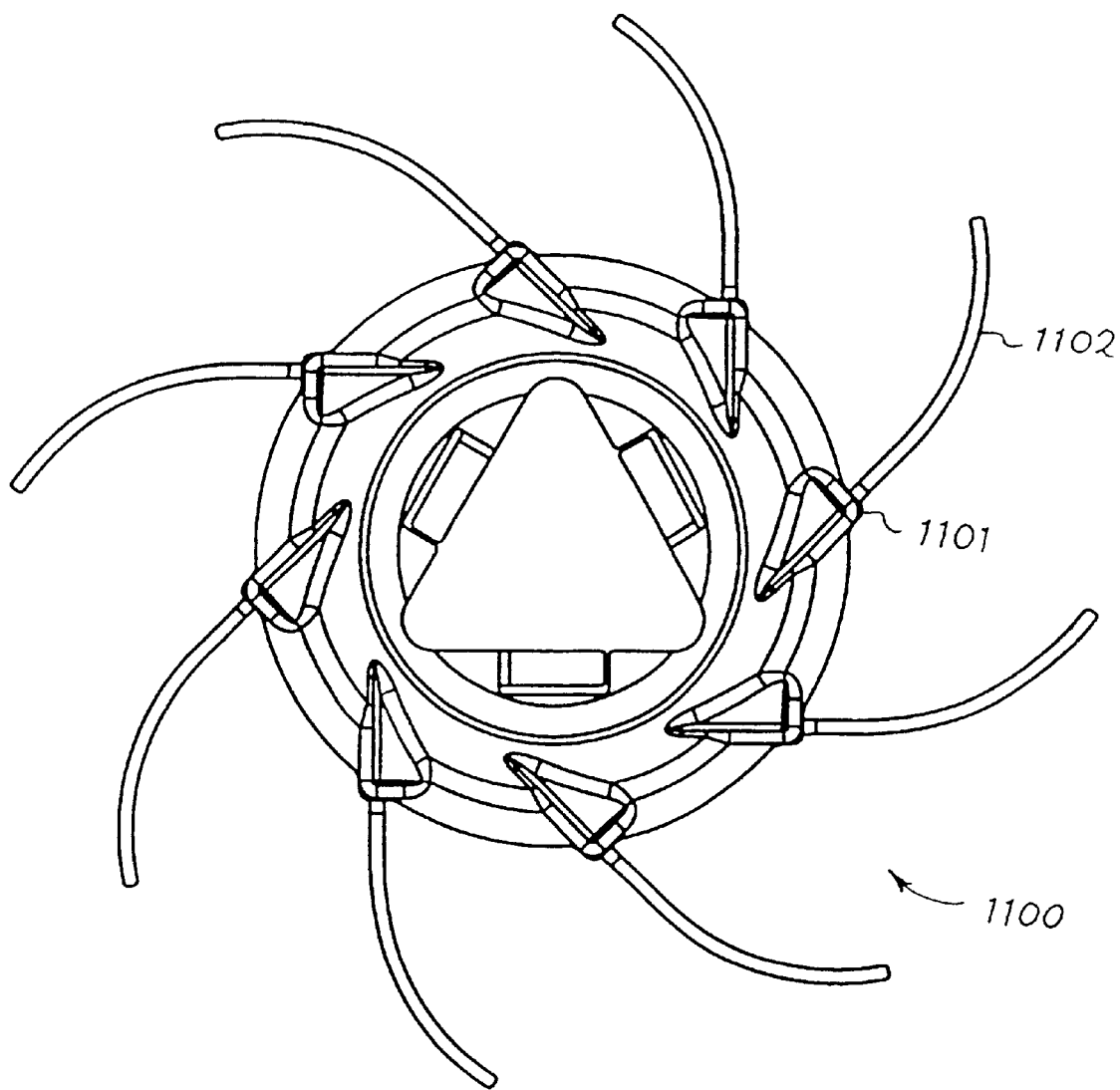
FIG. 78 is a back view of the embodiment of FIG. 78.
Figure 79:
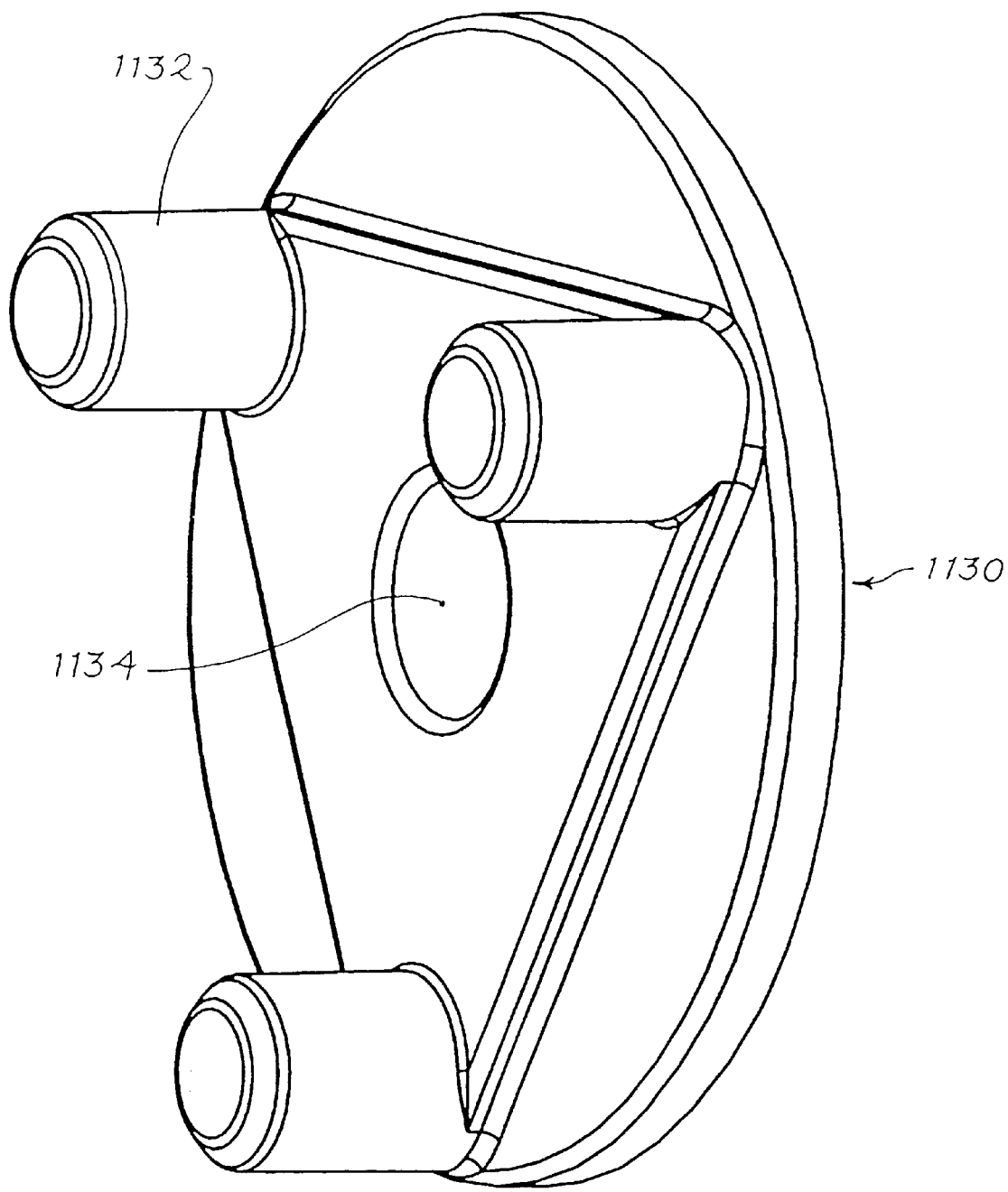
FIG. 79 is a perspective view of an alternative embodiment of a drive rotor made in accordance with the invention showing the seed disc engaging side.
Figure 80:
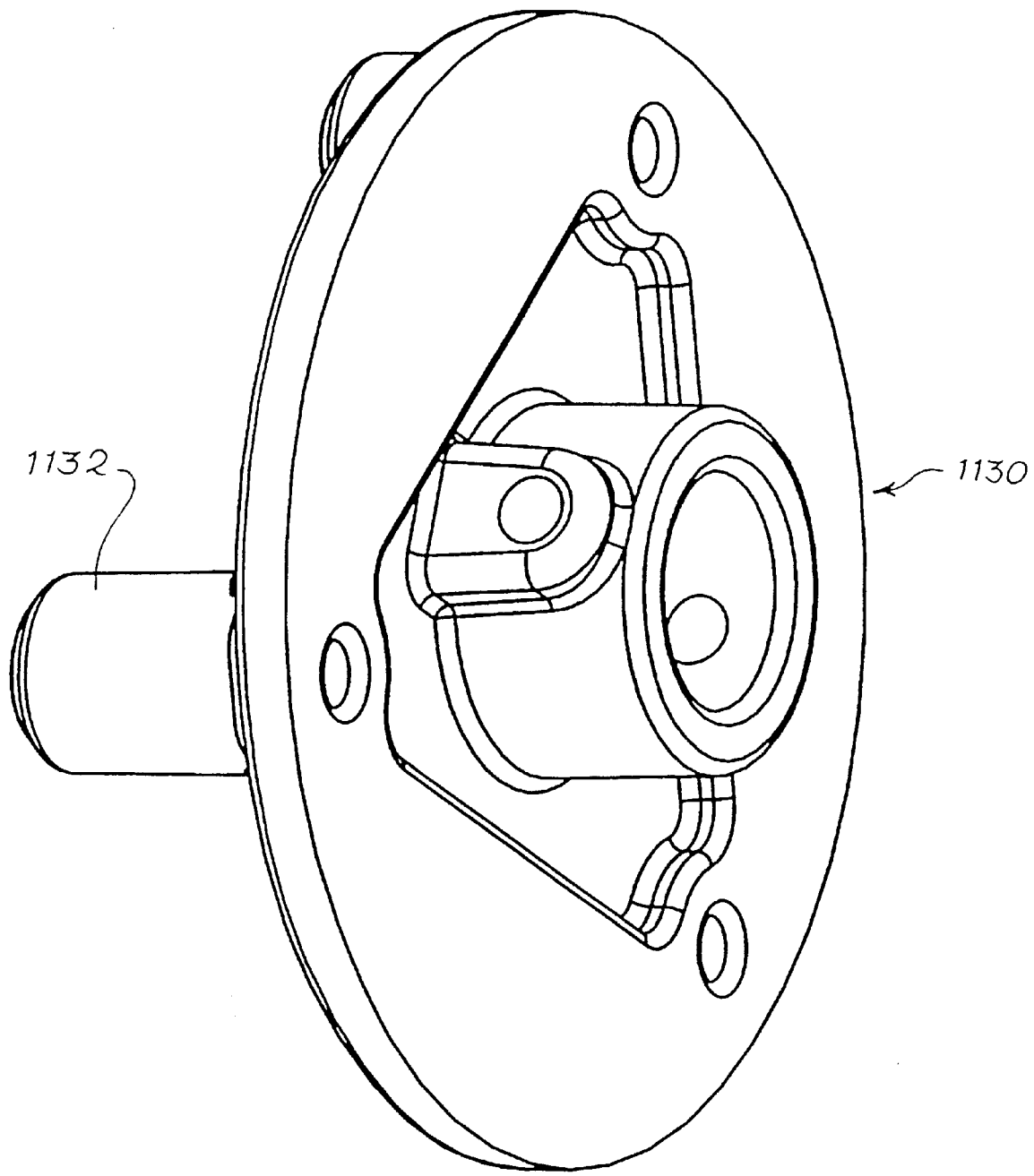
FIG. 80 is a back view of the embodiment of FIG. 79.
Figure 81:
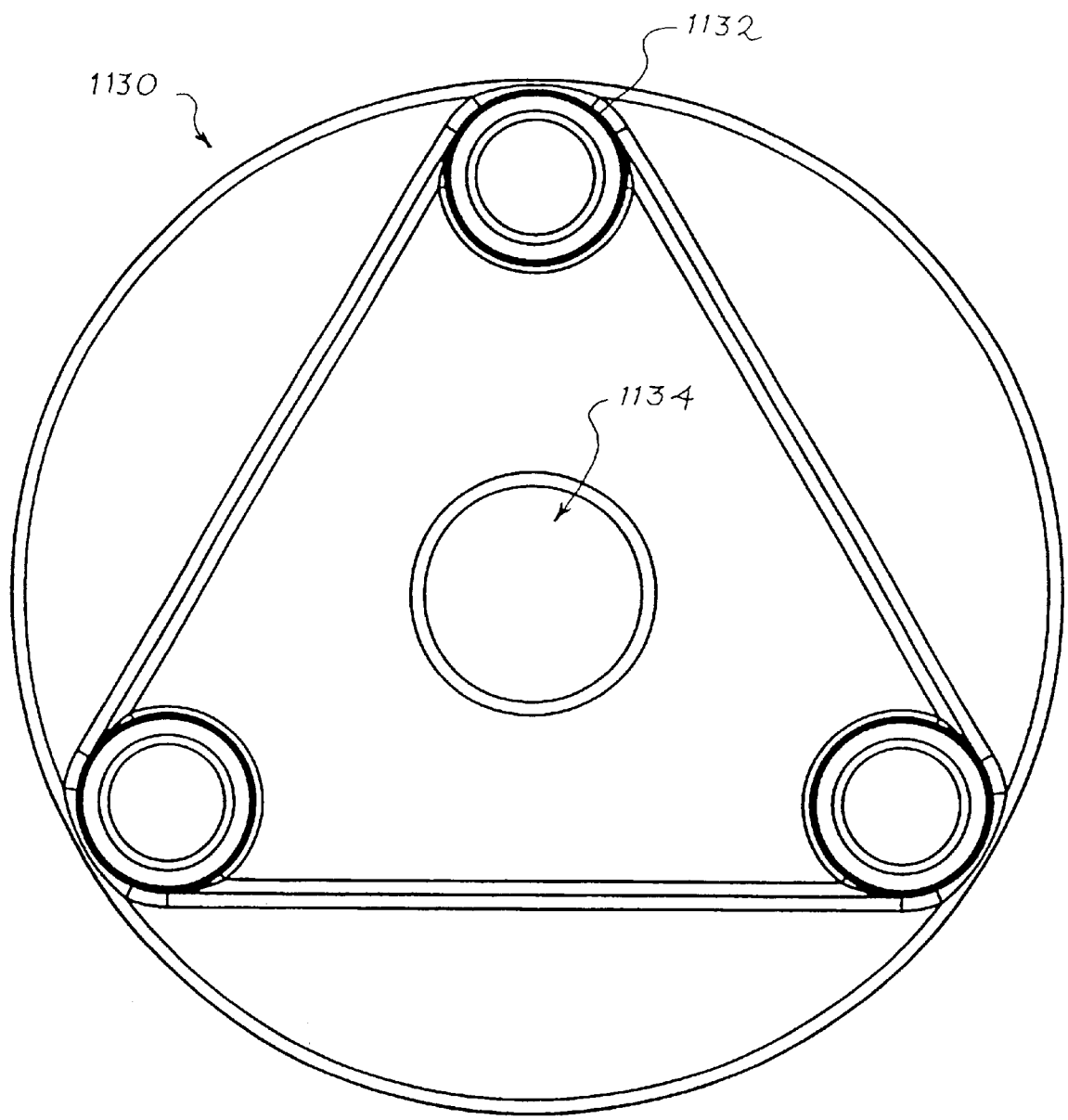
FIG. 81 is a plan view of the seed disc engaging side of the drive rotor of FIG. 79.
Figure 82:
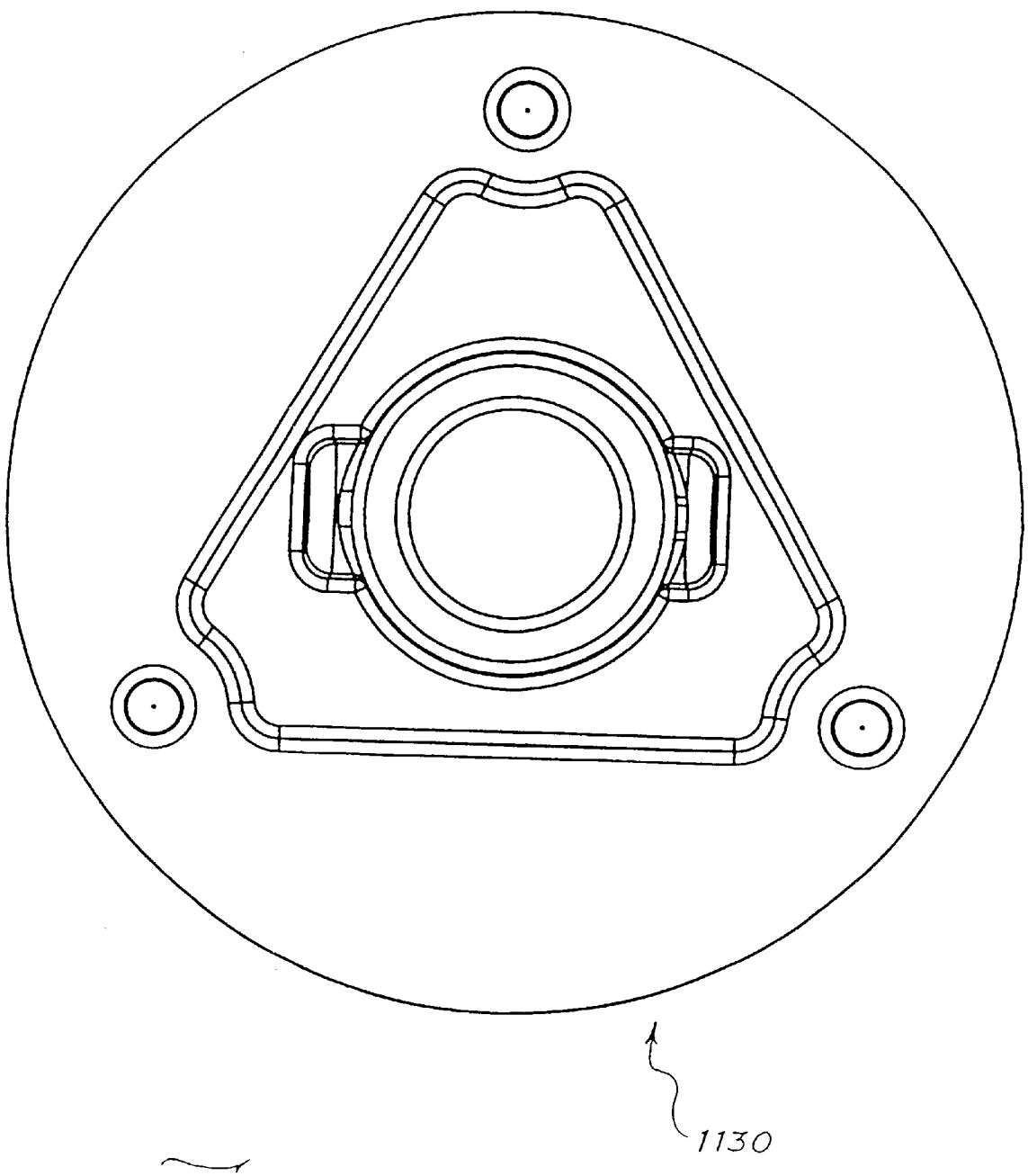
FIG. 82 is a back view of the embodiment of FIG. 81.

FIGS. 77–78 illustrate an alternative embodiment of an agitator 1100. In the embodiment shown, a plurality of equally spaced flanges 1101 extend around the periphery of the agitator 1100. A finger 1102 extends radially outwardly from each flange 1101. In the embodiment shown, the fingers 1102 are formed as an integral part of the agitator 1100. The agitator 1100 defines a centrally located through opening 1104 for mounting the agitator 1100. The through opening 1104 may preferably be keyed in any conventional manner so that the agitator 1100 can be mounted for rotation in only one direction. The advantage of the keying arrangement is that it prevents the agitator 1100 from being mounted improperly. The agitator 1100 may be comprised of aliphatic polyketones including, for example, Carilon® polymers manufactured by the Shell Chemical Company. Additives such as carbon fibers, carbon powder, or stainless steel fibers may be added to the Carilon® polymer to make the agitator 1100 resistant to static charge build-up or to make it electrically conducting. Carilon® has been found to provide a low coefficient of friction and excellent wear for pressure-velocity and abrasive wear applications, good dimensional stability, good lubricity, and good seed handling properties.

As shown in FIGS. 12 and 13, the rotor 302 of the agitator assembly 300 furthermore serves to axially urge the seed plate 400 in an axial direction and toward the cover 46 of the housing assembly 32. In this regard, and as shown in FIGS. 12, 13 and 26, the rotor 302 of the agitator assembly 300 includes spring structure 350 for resiliently urging the seed plate 400 toward the cover 46 of the housing assembly 32 to maintain a sealing relationship between the seed disc 400 and the cover 46 throughout operation of the seed metering mechanism 32.

In the illustrated form of the invention, the spring structure 350 comprises a plurality of leaf springs 352 that are preferably formed integrally with the rotor 302. As shown in FIGS. 25 and 26, and in the area of the central hub 304, preferably adjacent and parallel to each side of opening 312, the rotor 302 includes a plurality of fingers 352. In the illustrated embodiment, each finger 352 has a cantilevered configuration. That is, each finger 352 is joined at one end to the rotor 302. The free end of each finger 352, however, axially projects beyond side surface 308 of the rotor 302 to resiliently engage the seed plate 400.

During a seed planting operation, the tractor typically moves over the ground at a speed of about 4 to about 8 miles per hour. Seed spacings within the furrows can range between as little as 0.5 inches to as much as 10 inches between adjacent seeds. Accordingly, the rate of discharge from the vacuum seed metering mechanism 32 of the present invention can vary greatly from a very low discharge rate on the order of twenty seeds per second or less such as when the tractor is traveling at only about 4 miles per hour and up to 10 inch seed spacing is required to a very high rate on the order of about 130 seeds per second or greater where the tractor is traveling at a considerably faster speed and a seed spacing as little as 0.5 inches is required. It will be appreciated, therefore, that the seed metering mechanism 32 of the present invention must be capable of dispensing seeds at a rate which can vary considerably. To further complicate matters, the seed metering mechanism 32 of the present invention must be capable of handling different seeds of different sizes and surface characteristics. Ultimately, the important factor to be mastered relates to the ability to dispense seeds accurately.

Figure 27:
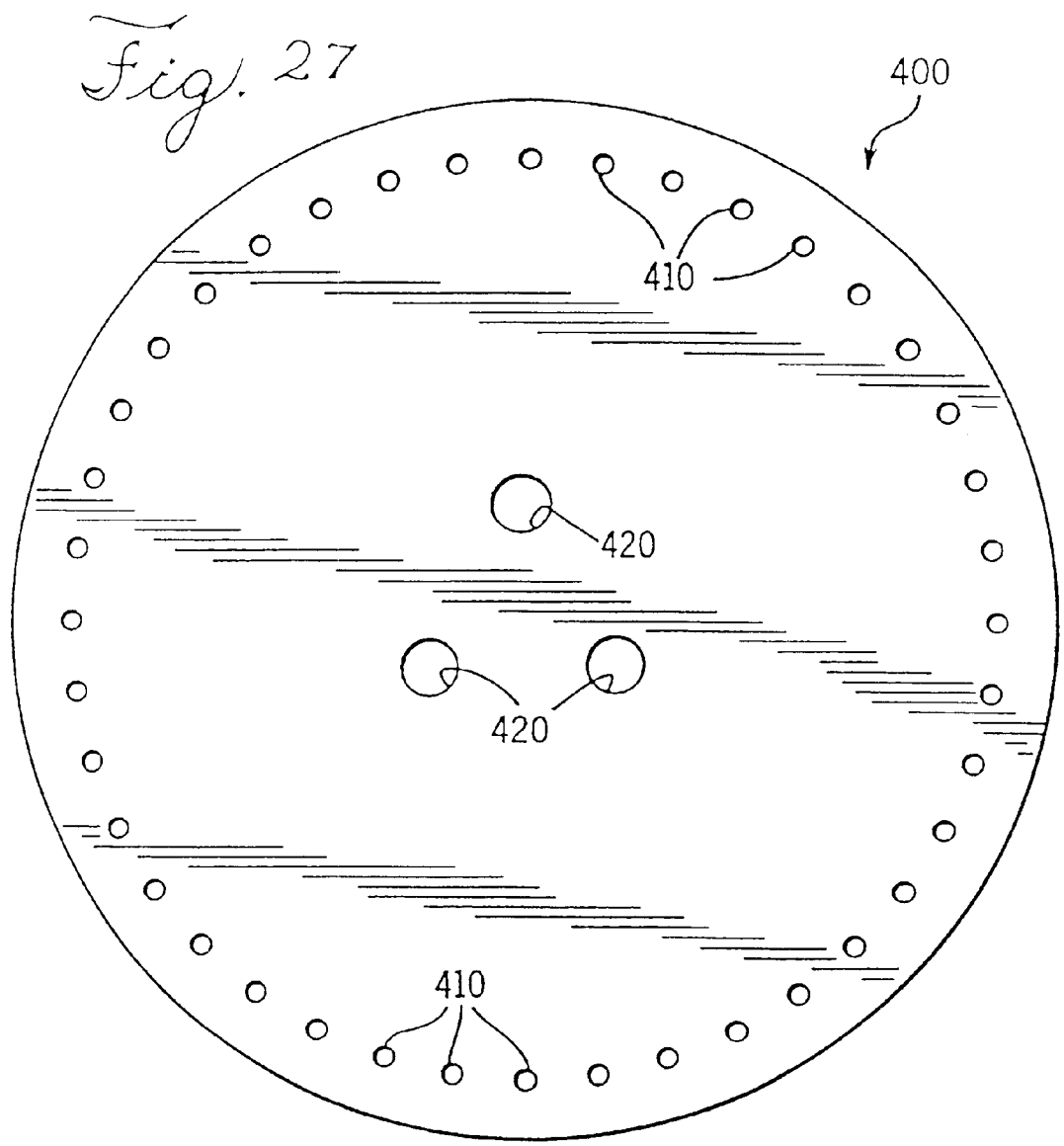
FIG. 27 is a right side view of one form of a seed metering plate to be used in combination with the seed metering mechanism of the present invention.
Figure 28:
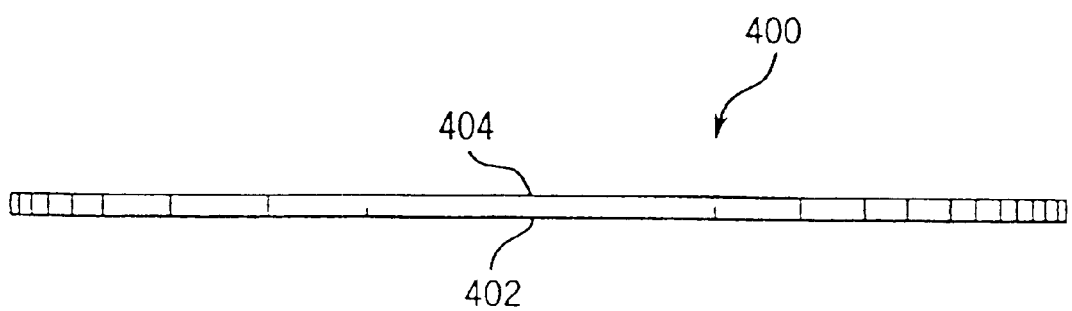
FIG. 28 is an end view of the seed metering plate shown in FIG. 26.

In this regard, an advantageous feature of the present invention relates to the ability of quickly and easily change seed discs to accommodate the particular seed being planted. Another advantageous feature that is inherent with the design disclosed by the present invention relates to the ability to change seed discs without requiring the use of tools or other fasteners thereby significantly reducing the downtime incurred upon replacement or changing of the seed disc. Suffice it to say, and as shown in FIGS. 27 and 28, the seed disc 400 is typically comprised of a metal material It is also within the spirit and scope of the present invention to fabricate the seed disc 400 from a suitable plastic material. In either embodiment, the seed disc 400 measures about 300 mm. in diameter. The centers of the seed disc openings may be positioned, for example, 17.5 mm from the periphery of the disc (the diameter measured between openings spaced across from each other on the disc being, for example, 265 mm). The 300 mm. size of seed disc 400 is significantly greater than any seed discs currently known in the art and allows greater versatility in planting operations. Each seed disc 400 has a diameter greater than the diameter of the radially outermost sealing face 58 on the cover 46 of the housing assembly 40.

The seed disc 400 has planar or flat first and second surfaces 402 and 404, respectively, extending generally parallel to each other. The seed disc 400 furthermore has a plurality of apertures 410 therein arranged in a circumferential row adjacent but inside of a circular outer edge 412. Each aperture 410 extends through the thickness of the seed disc 400 between the first and second surfaces 402 and 404, respectively, of the disc 400. As will be readily appreciated by those skilled in the art, and without departing or detracting from the spirit and scope of the present invention, the seed disc 400 can include additional rows of apertures (not shown) arranged closely adjacent and concentric to the first row of apertures 410. Notably, the sides or surfaces 402 and 404 of the disc 400 in the area of each opening is substantially planar or flat with the remainder of the disc 400. That is, the seed disc 400 is void of any recesses or voids arranged in surrounding relation to the openings 410. The flat configuration of the plate or disc 400 across the entirety thereof and especially in the area of the openings 410 reduces frictional contact of the outer surface of the seeds when they are released from the disc in the discharge area 98 of the seed metering mechanism.

As shown in FIG. 27, and toward the center thereof, each seed disc 400 includes a plurality of openings or drive sockets 420 that are equidistantly arranged relative to each other about a common diameter. Notably, the spacing between the openings 420 is equal to the spacing between the driving pins 252 of the second driving section 250 on the drive assembly 200. Moreover, the shape and size of the apertures 420 in discs 400 correspond to the shape of the pins 252 of the second driving section 250 of drive rotor 230. An important benefit is yielded by such construction. Because the disc 400 is mounted on the driving section 250 of drive rotor 230, the disc 400 and the openings 410 provided therein turn about a fixed axis 84 of rotation. Accordingly, the openings 410 move along a predetermined path of travel as the disc 400 turns or rotates within the housing assembly 40. Moreover, and as will be readily appreciated, different discs 400 are readily interchangeable within the seed metering mechanism 32 to accommodate different seed spacings and/or seeds having particular surface characteristics without the use of tools or fasteners. Notwithstanding the size of the seed disc 400, the openings 410 thereon travel about a predetermined path of travel between the seed chamber 86 and the discharge area 98 of the seed metering mechanism.

Figure 60B:
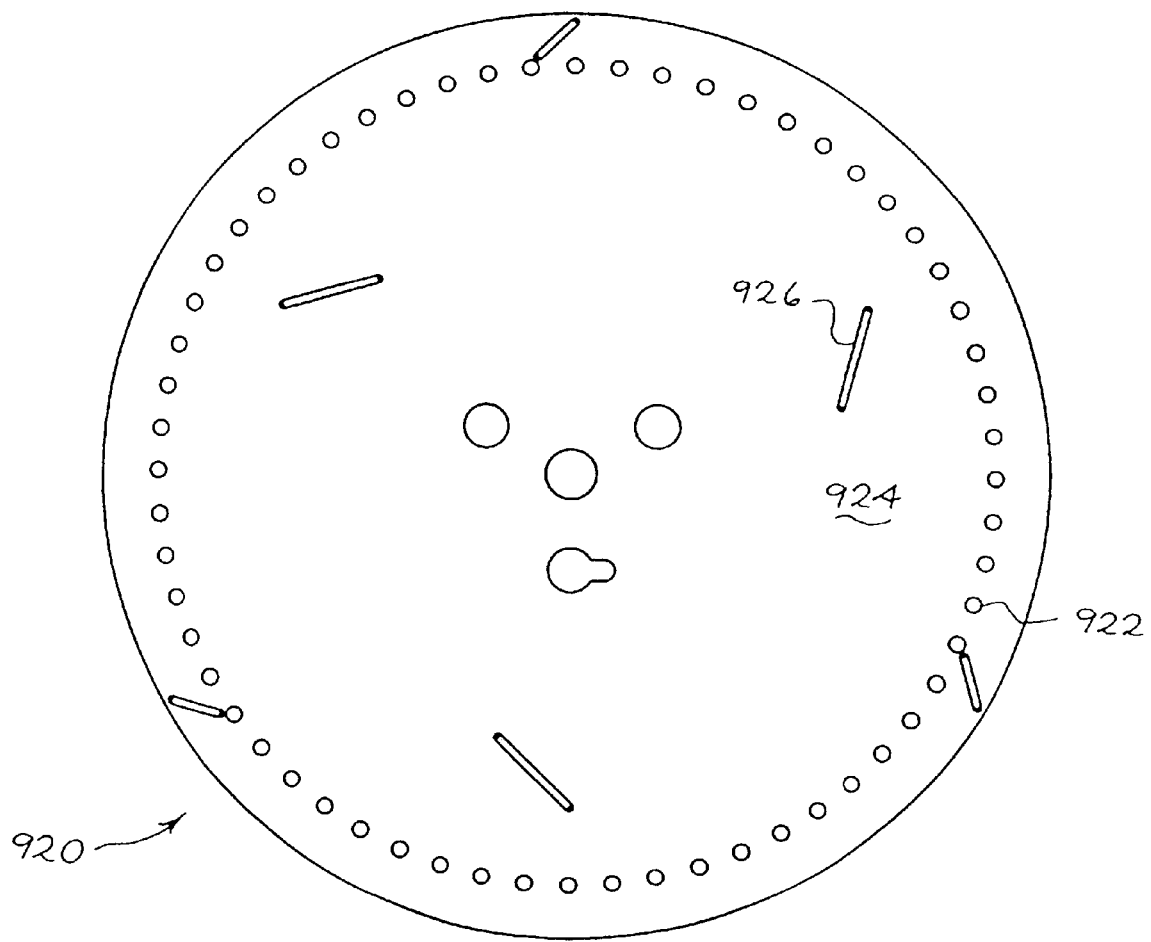

FIGS. 60a–b illustrate an alternative embodiment of a seed disc 920. A plurality of openings 922 are spaced along the perimeter of the seek disc 920. As shown in FIG. 60b, the vacuum side 924 of the seed disc 920 includes a plurality of wear depressions 926 formed therein. As shown in FIG. 60b, the wear depressions 926 may, for example, be elongated slots, and are preferably spaced so that the wear depressions 926 extend to where the cover contacts the seed disc. As shown in FIG. 60b, the wear depressions 926 may preferably extend underneath the contact surfaces and into the vacuum chamber to create air flow under the contact surfaces to allow cooling of the contact surfaces. The wear depressions 926 also channel debris away from the contact surfaces. In the embodiment shown, the wear depressions 926 may preferably be angled with respect to the radius of the seed disc to aid in debris removal. For example, the wear depressions 926 may be angled at approximately 45 degrees, although other angles may be adequate. The size, shape, and orientation of the wear depressions 926 may vary depending on the particular application, and various configurations, including a curved depression, are contemplated. The seed disc preferably includes a center opening 927 to allow the shaft to extend through the opening 927. This allows closer tolerances to be held and better alignment between the singulator spools and the seed disc openings.

Figure 60C:
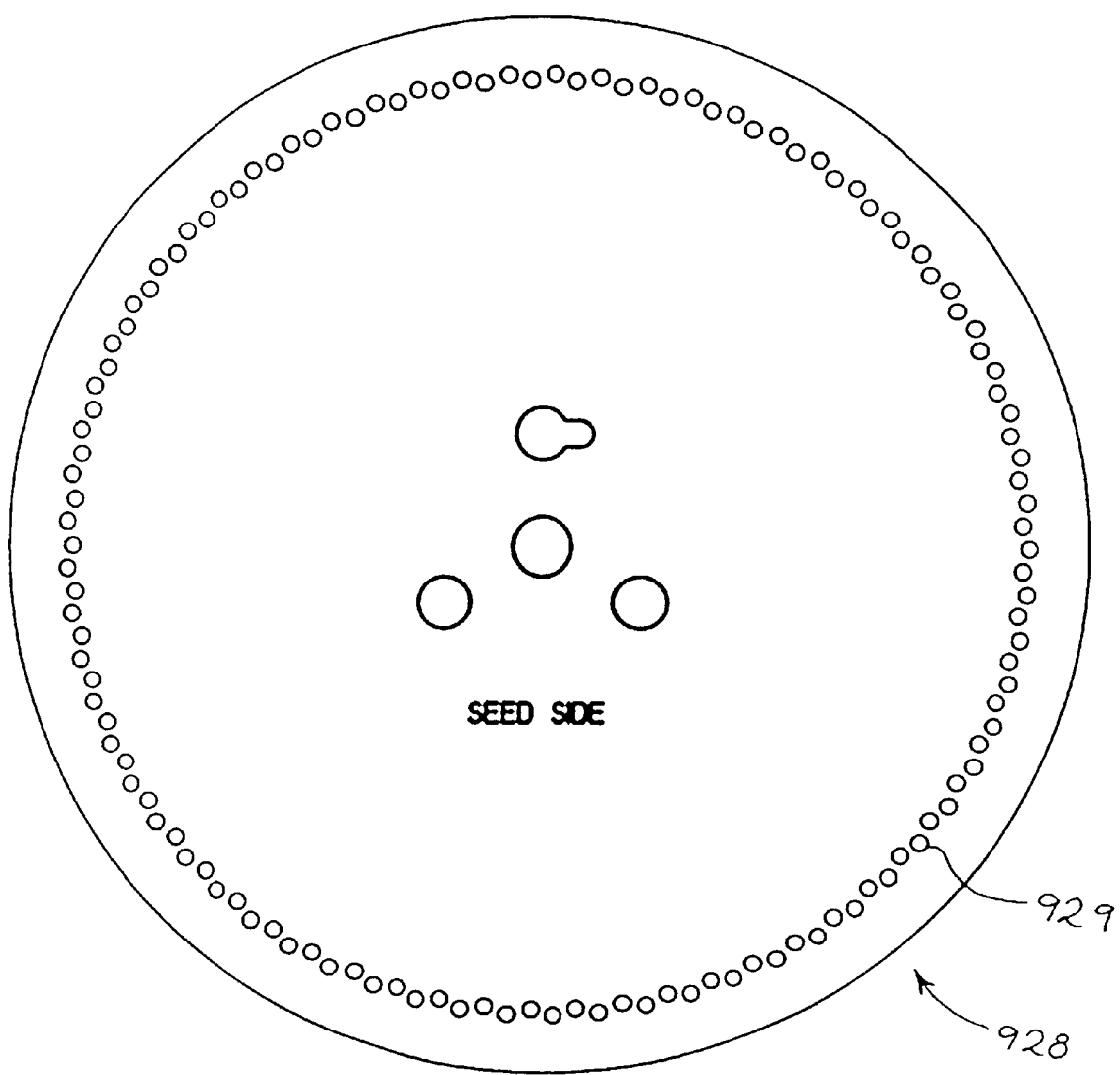
FIG. 60c is a seed side view of an alternative embodiment of a seed disc.
Figure 60D:
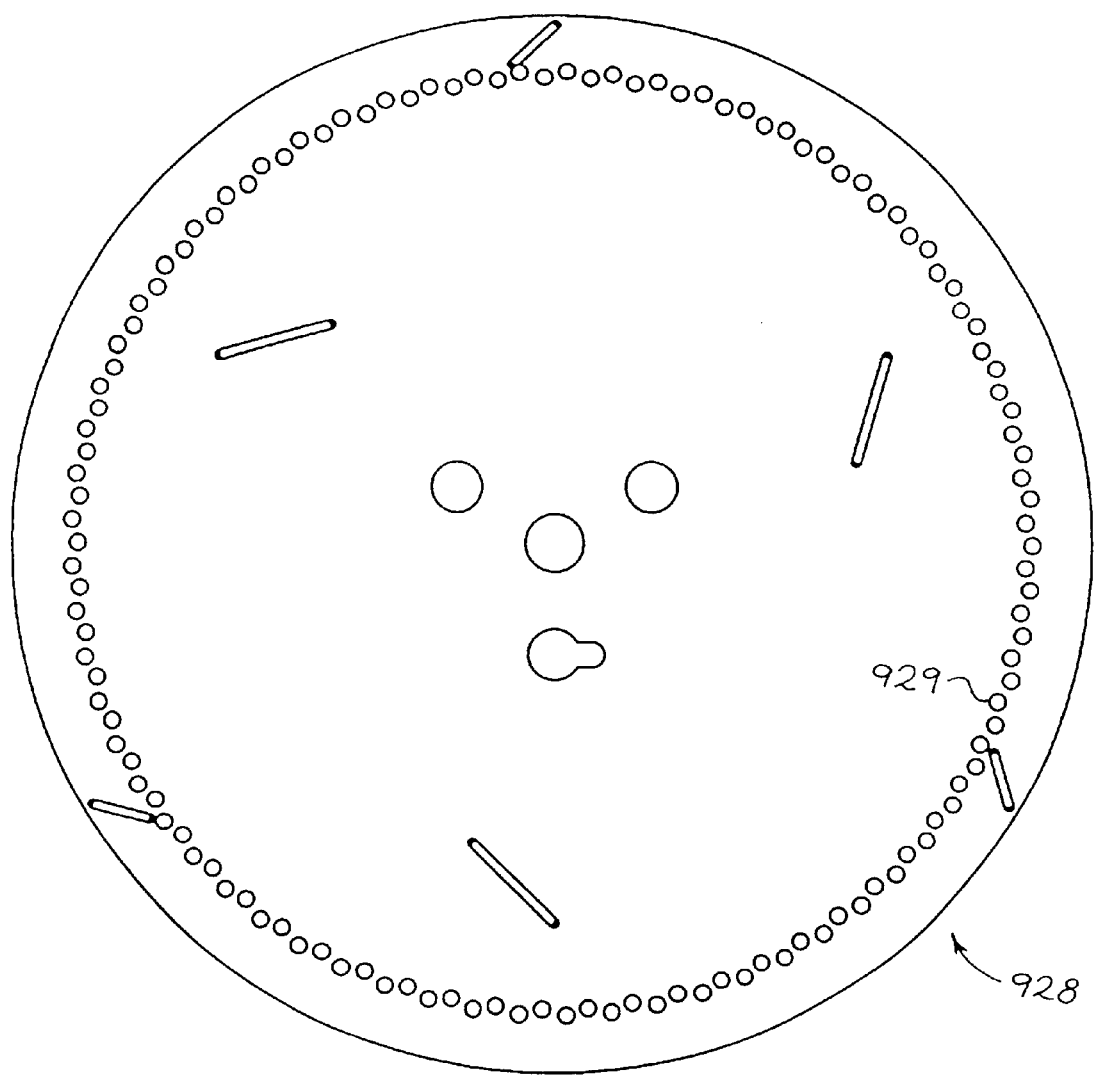
FIG. 60d is a vacuum side view of the embodiment of FIG. 60c.

The size, shape and configuration of openings 922 may vary depending on the particular seed to be planted. Moreover, the openings 922 may be chamfered on the vacuum side 924 of the seed disc 920 to aid in the removal of seed debris from the openings 922. The spacing of the openings 922 shown in FIGS. 60a–b may be suitable for crops such as, for example, corn. FIGS. 60c–d illustrate an alternative embodiment of a seed disc 928, which shows two rows of openings 929 which are off-set from one another for planting high density crops such as, for example, soybeans. The diameter of the discs may be, for example, 300 mm, and the diameter between the seed openings positioned on opposite sides of the disc, may be, for example, 265 mm.

Figure 61A:
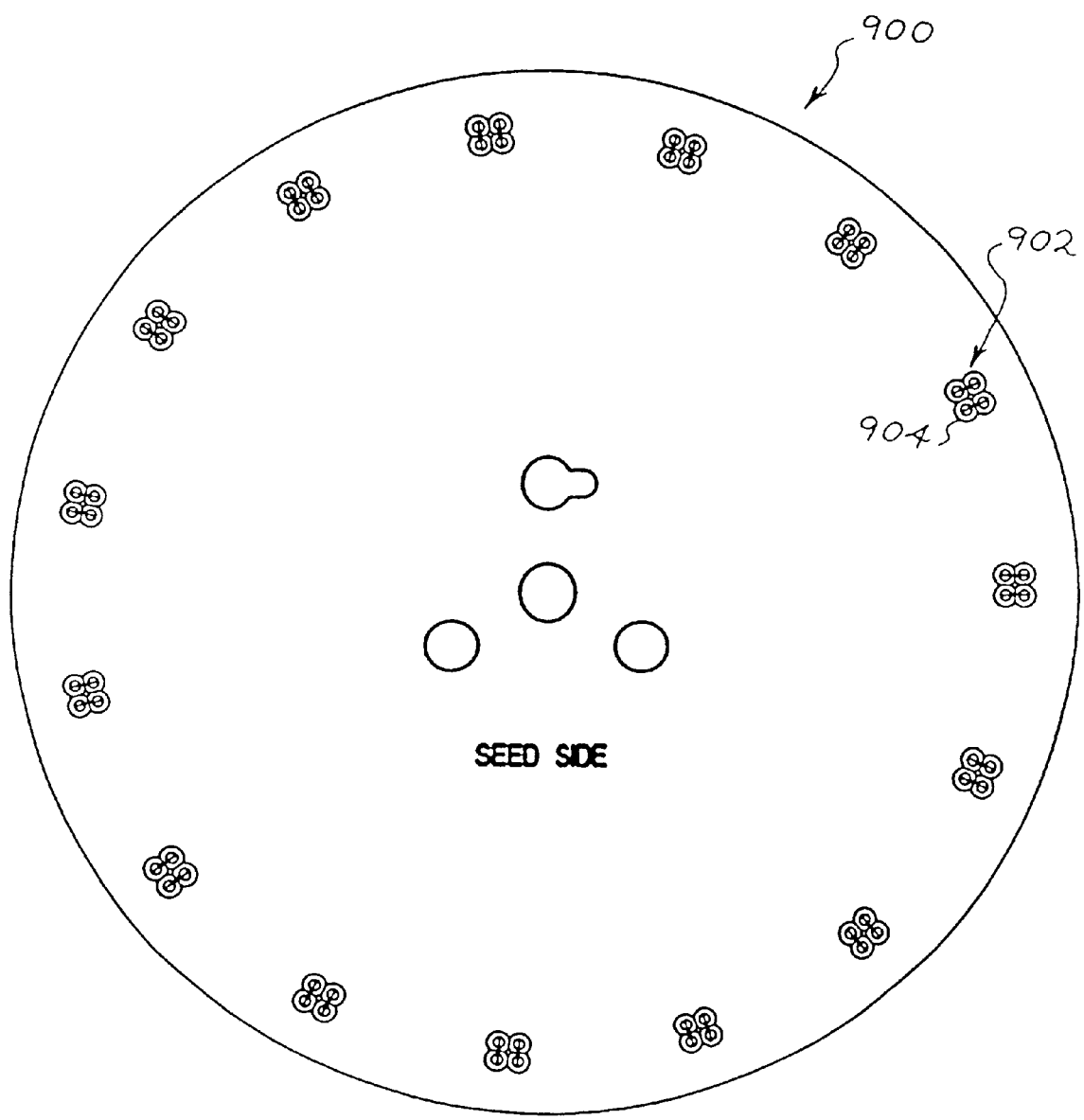
FIG. 61a is a seed side view of an alternative embodiment of a seed disc.
Figure 61B:
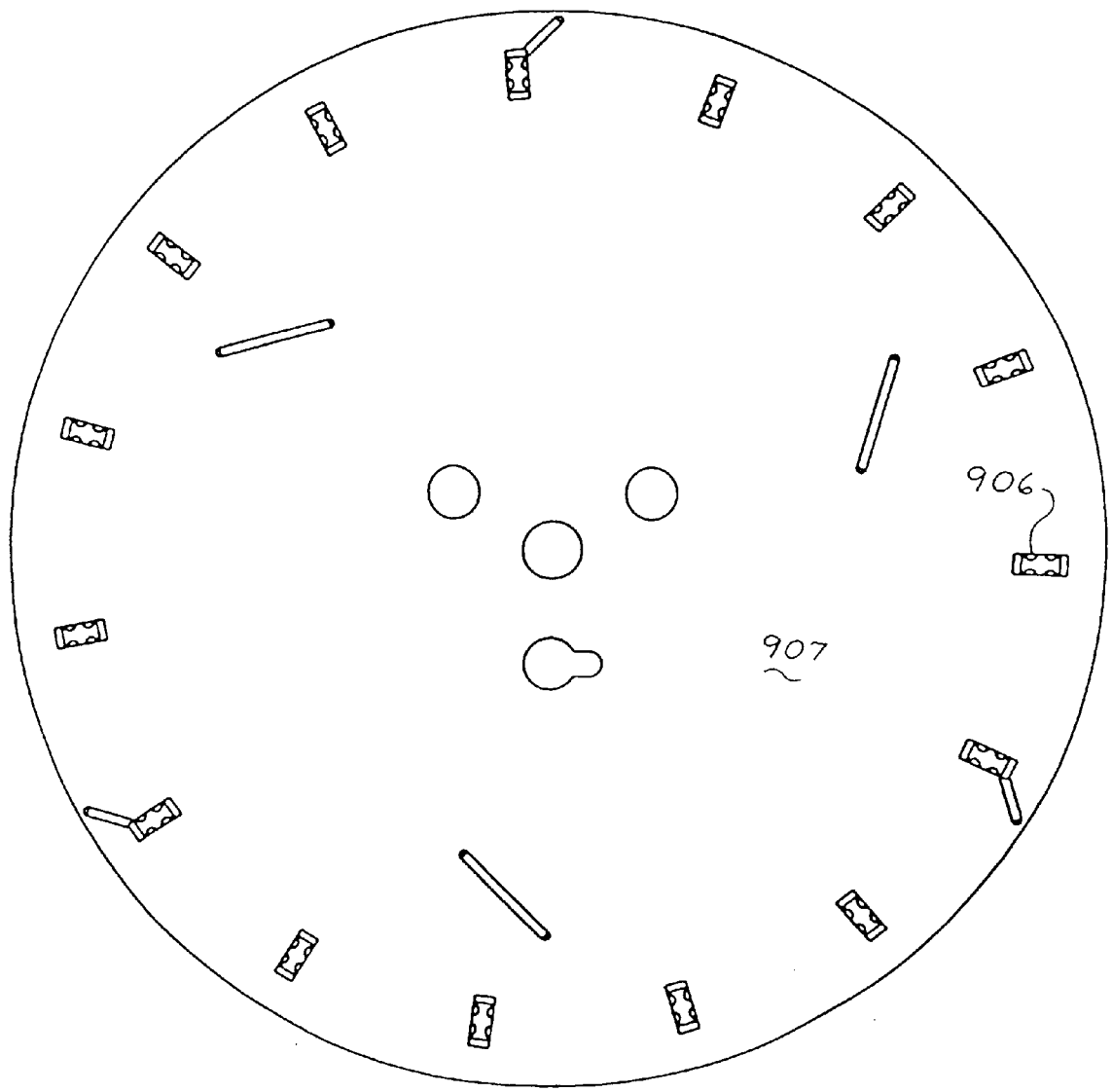
Figure 62A:
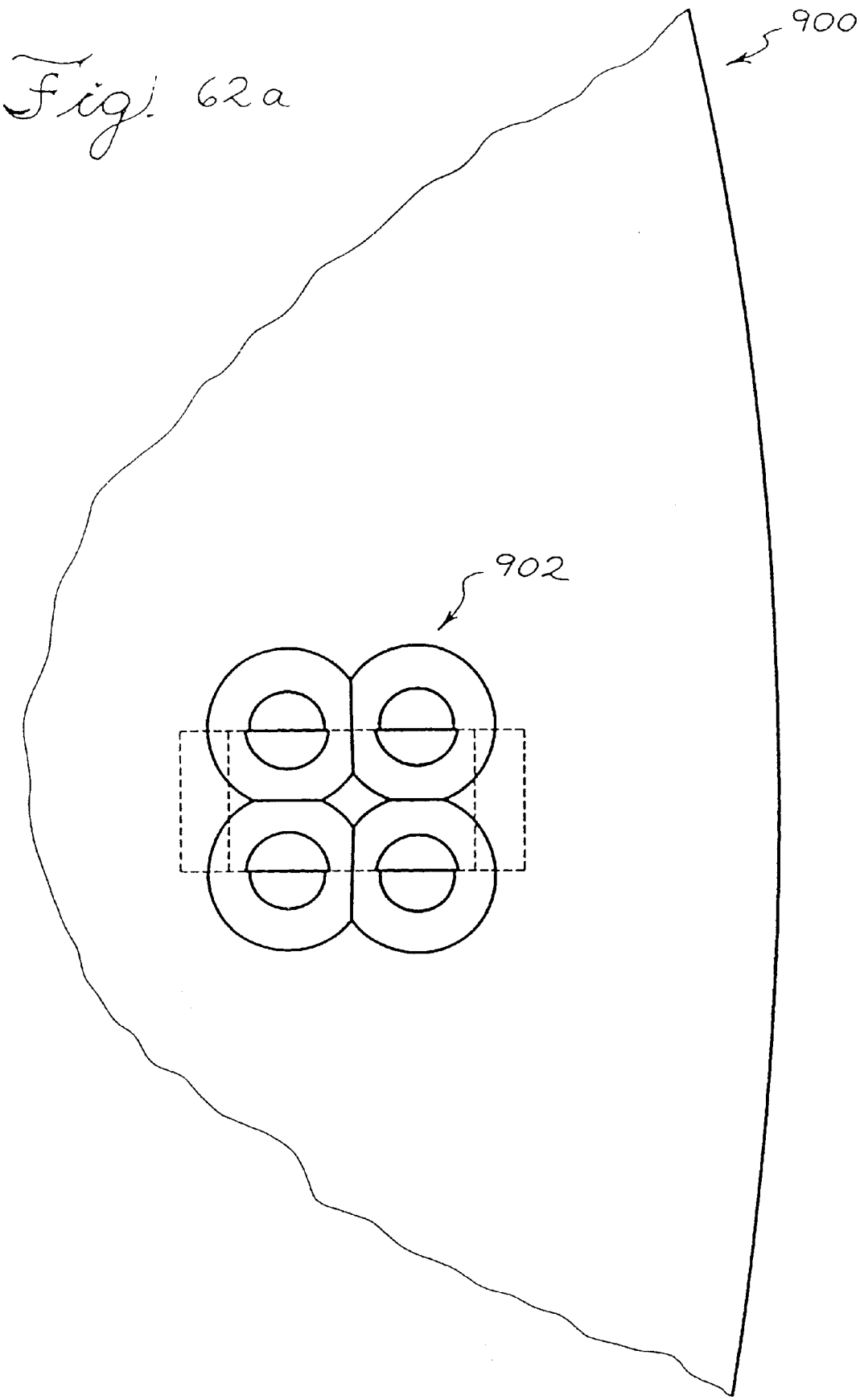
Figure 62B:
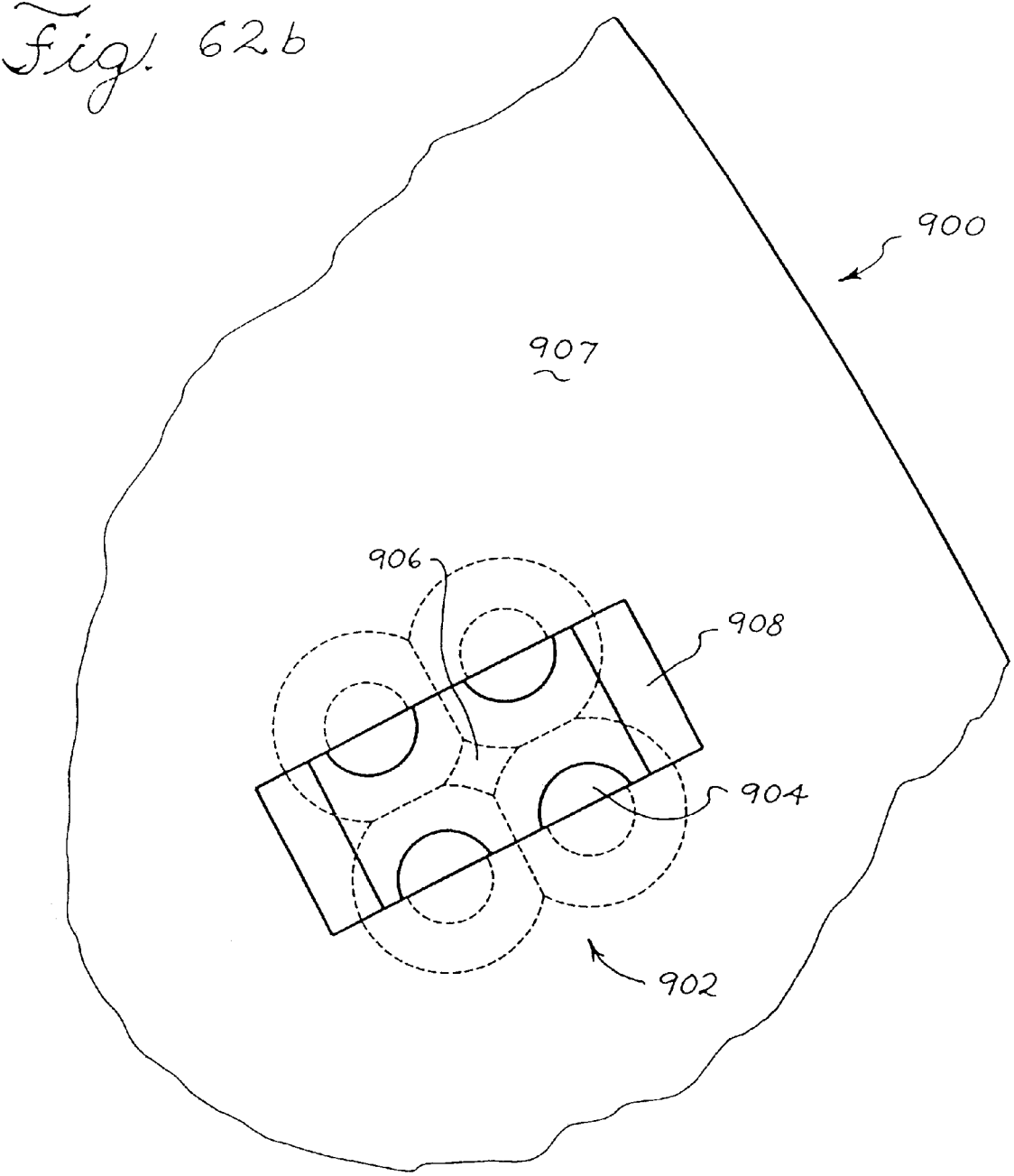
FIG. 62b is an enlarged view of a cluster of openings of the embodiment shown in FIG. 61b.

FIGS. 61a–b illustrates an alternate embodiment of a seed disc 900 for a multiple seed drop application. As shown in FIGS. 61a–b, the seed disc 900 includes a plurality of spaced-apart clusters of openings 902 which are oriented adjacent the perimeter of the seed disc 900. This arrangement allows the seeds to drop at substantially the same time as the disc rotates the cluster out of communication with the vacuum chamber. Each of the clusters 902 may be comprised of two or more openings 904 depending on the particular application. In the embodiment shown, four openings 904 are provided in each cluster 902. As shown in FIGS. 61b and 62b, a recessed area 906 is formed on the vacuum side 907 of the seed disc 900 and interconnects the openings 904. In the embodiment shown, the recessed area 906 may also include a ramp portion 908. In operation, a vacuum force is simultaneously applied to all four seeds due to the interconnection of the openings 904 by the recessed area 906, which retains the seeds on the seed disc 900. When the recessed area 906 exits the vacuum area, the vacuum force applied to all four seeds is cut-off simultaneously allowing all four seeds to fall from the seed disc 900 with negligible time delay between the seeds. This allows all four seeds to be dropped in a tight group which is desirable in certain applications including, for example, "hill-drop" cotton planting. The recessed area 906 may be any shape, size as configuration sufficient to link the openings 904 together so that when the recessed area 906 exits the vacuum area all of the seeds of the cluster 902 drop simultaneously. Alternatively, the openings 904 may be linked by any other passageway which communicates with each of the openings 904 to allow all of the seeds of the cluster 902 to drop simultaneously when the passageway exits the vacuum chamber.

The seed disc 900 may be comprised of aliphatic polyketones including, for example, Carilon® polymers manufactured by the Shell Chemical Company. Additives such as carbon fibers, carbon powder or stainless steel fibers may be added to the Carilon® polymer to make the seed disc 900 resistant to static charge build-up or to make it electrically conductive. Carilon® has been found to provide excellent wear for pressure-velocity and abrasive applications, good dimensional stability, good lubricity, and good seed handling properties.

As stressed throughout, an important aspect of seed metering mechanism 32 of the present invention relates to the ability to dispense the seeds to the ground with accuracy. This means that one seed and no more than one seed is planted at any desired location along the length of the furrow. As well known in the industry, dispensing or discharging more than one seed into the furrow at any single location, sometimes referred to as "doubling", is undesirable at the very least and is unacceptable for the majority of planting operations. The typical unavailability of suitable nutriments in the soil will simply not sustain or support the presence of two seeds at any single location.

Figure 29:
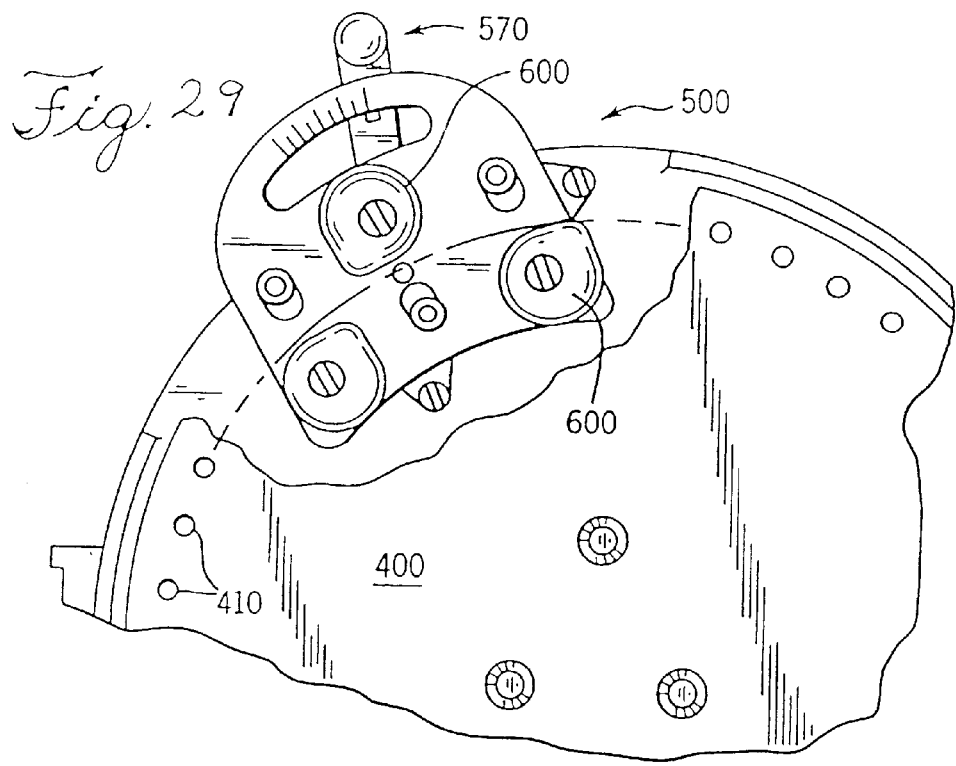
FIG. 29 is a right side view of a singulator apparatus arranged in combination with the seed metering mechanism of the present invention.

For these and other reasons, and as shown in FIG. 29, the seed metering mechanism 32 of the present invention furthermore includes a singulator assembly 500. During operation of the seed metering mechanism 32 of the present invention, a suction is created in chamber 50 of housing 46. As such, and as the apertures 410 on the seed disc 400 move through the seed mass in the seed reservoir 86 of housing 44, one or more seeds releasably attach themselves to the openings 410 in the seed disc under the influence of pressure differentials. As the seed disc 400 is drivingly rotated, the one or more seeds operably associated with each opening or aperture 410 moves with the seed disc toward the discharge area of the seed metering mechanism 32. Intermediate the location where at the seeds operably attach themselves to the seed disc 400 and the seed discharge area of the seed dispensing mechanism from which the seeds gravitationally fall to the ground, the singulator assembly 500 of the present invention is provided to insure that one and only one seed is present in each opening or aperture 410 as the particular seed pocket or opening approaches the discharge area of the seed dispensing mechanism 32. The seed singulator mechanism is indicated generally by reference numeral 500 in FIG. 29. In the illustrated form of the invention, the singulator assembly 500 is shown attached to the backwall 78 of housing 44 of the housing assembly 40 as through a plurality of suitable fasteners 502 and 504 and is less sensitive to revolving speed of the seed disc 400 than are known seed singulator devices.

Figure 30:
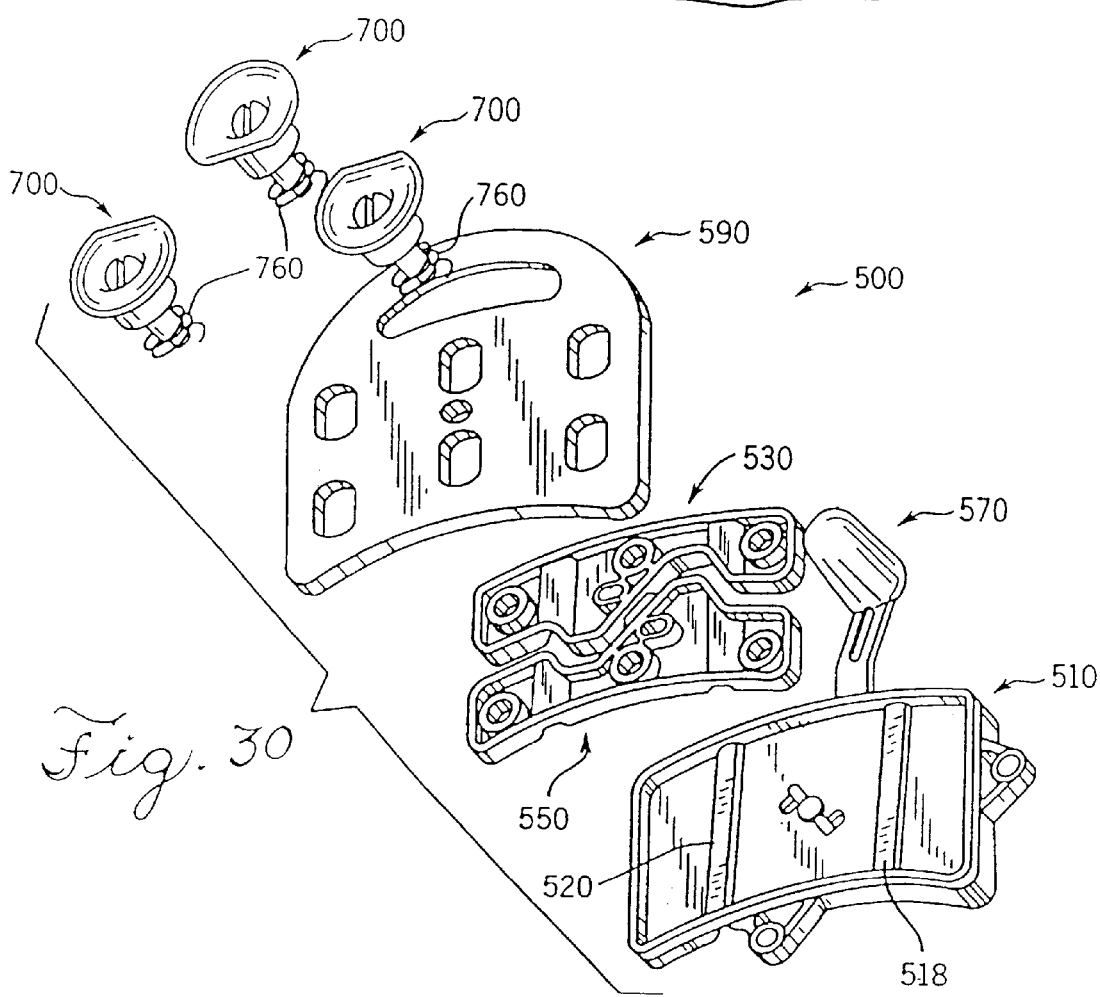
FIG. 30 is an exploded perspective view of the singulator apparatus shown in FIG. 29.

Turning to FIG. 30, the singulator assembly 500 is shown in exploded perspective view. As shown in FIG. 30, the singulator assembly comprises a base 510. a pair of manually movable brackets 530 and 550, a manually operated adjustment mechanism 570, and a cover 590. Notably, one of the unique features of the present invention concerns the ability of the component parts of the singulator assembly 500 to be assembled and adjusted relative to each other without the use of screws or other fasteners. Accordingly, no tools are required for assembly or adjustment of the singulator assembly of the present invention thereby reducing downtime normally incurred during the planting operation when adjustment of the seed singulator is required or desired. Another salient aspect of the singular assembly 500 relates to the provision of at least three singulator spools 700 that are mounted in specifically spaced relation relative to the path of travel of the apertures 410 of the seed disc 400.

Figure 31:
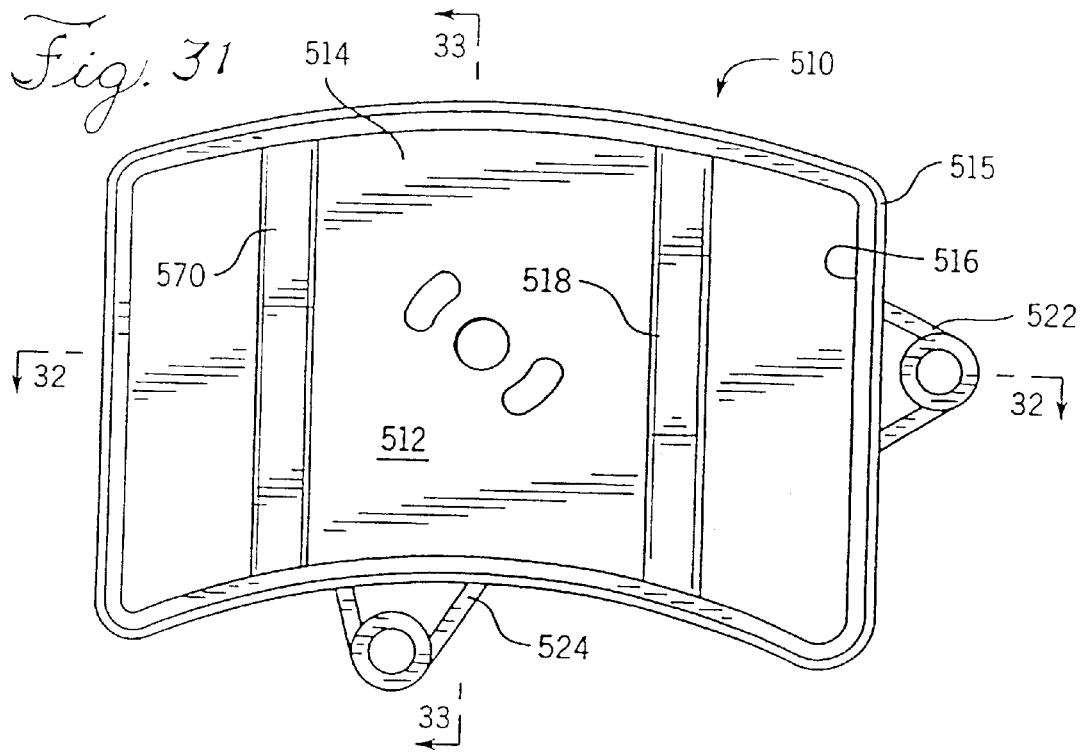
FIG. 31 is a right side view of a base forming part of the seed singulator.
Figure 32:
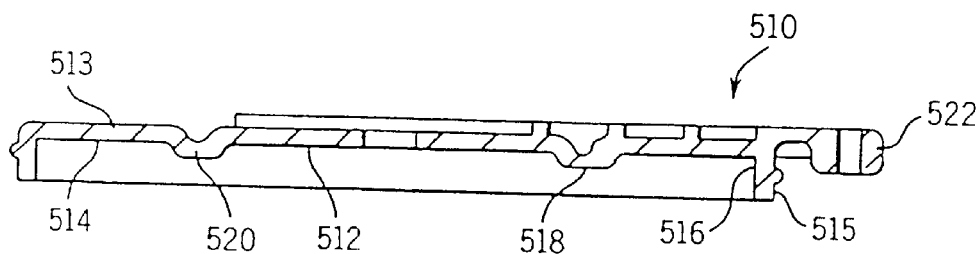
FIG. 32 is a sectional view taken along line 32—32 of FIG. 31.
Figure 33:
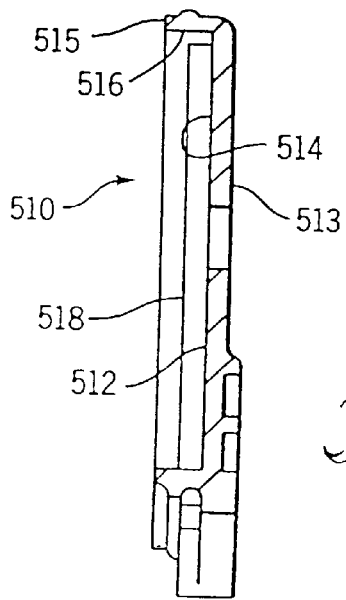
FIG. 33 is a sectional view taken along line 33—33 of FIG. 31.

Turning now to FIGS. 31 through 33, the base 510 of the singulator assembly 500 includes a generally rectangular back wall 512 having a back side 513 and a front side 514. Preferably, wall 512 of base 510 further includes a closed rim 515 extending about the peripheral edge of the back wall 512 and axially away from the front side 514 to define an enclosure or open cavity 516. A pair of vertical disposed and horizontally spaced rails 518 and 520, respectively, are provided within the enclosure 516. As shown in FIG. 31, the rails 518 and 520 are preferably integrally formed with the base 510. It will be appreciated, however, that rails 518, 520, which are independently formed relative to the base 510, would equally suffice. Apertured flanges 522 and 524 extend outwardly from the base 510 so as to allow releasable affixation of the base 510 to the housing 44 of the housing assembly as with suitable fasteners. Moreover, base 510 furthermore defines a central throughbore or opening 526 with radially elongated slots 527 and 528 that pass entirely through the base 510. The slots 527 and 528 are arranged in diametrically opposed relation relative to each other and in generally concentric relationship relative to the bore or opening 526.

Figure 64:
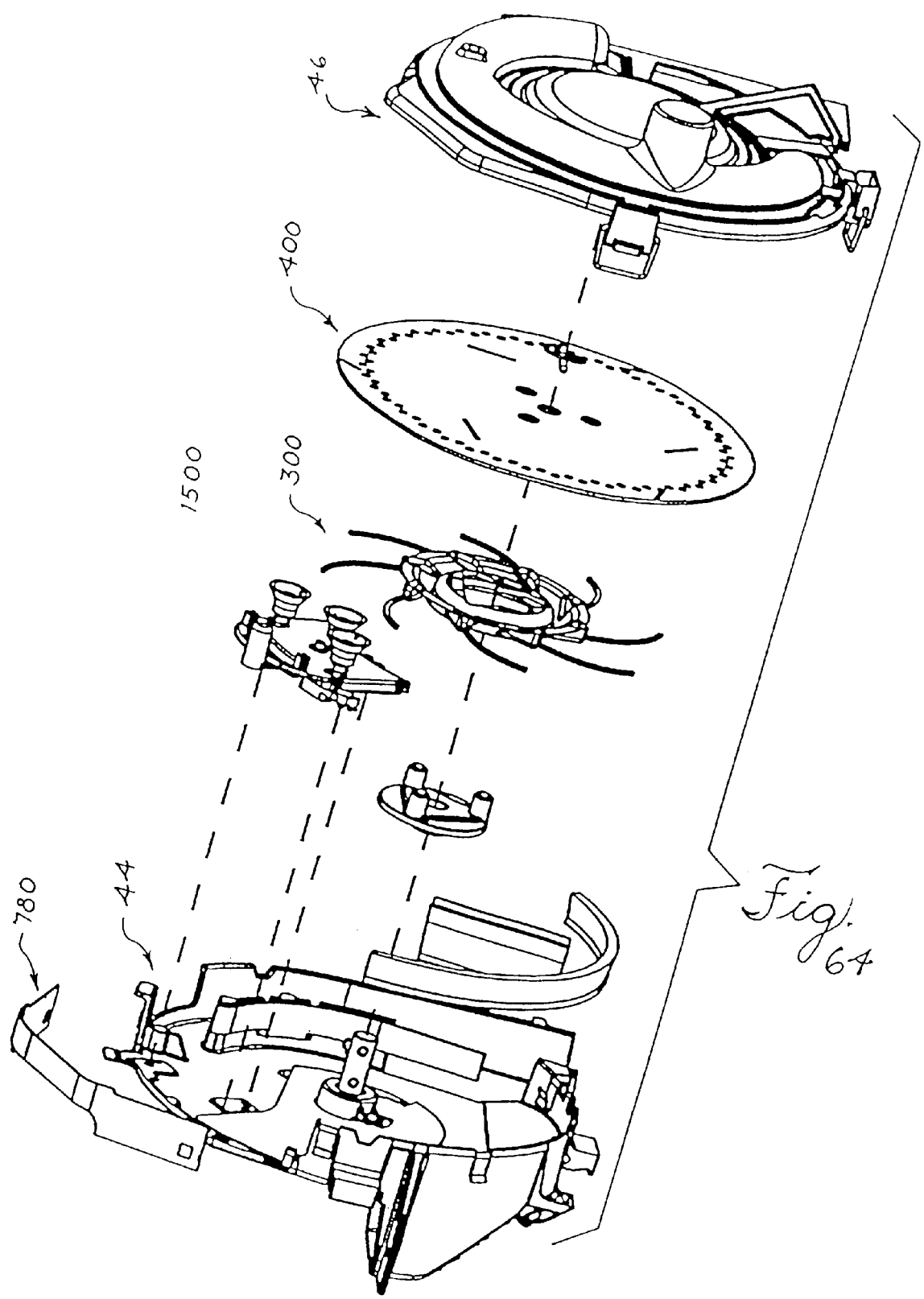
FIG. 64 is an exploded perspective view of a seed metering apparatus which includes an alternative embodiment of the singulator assembly of the present invention.
Figure 65:
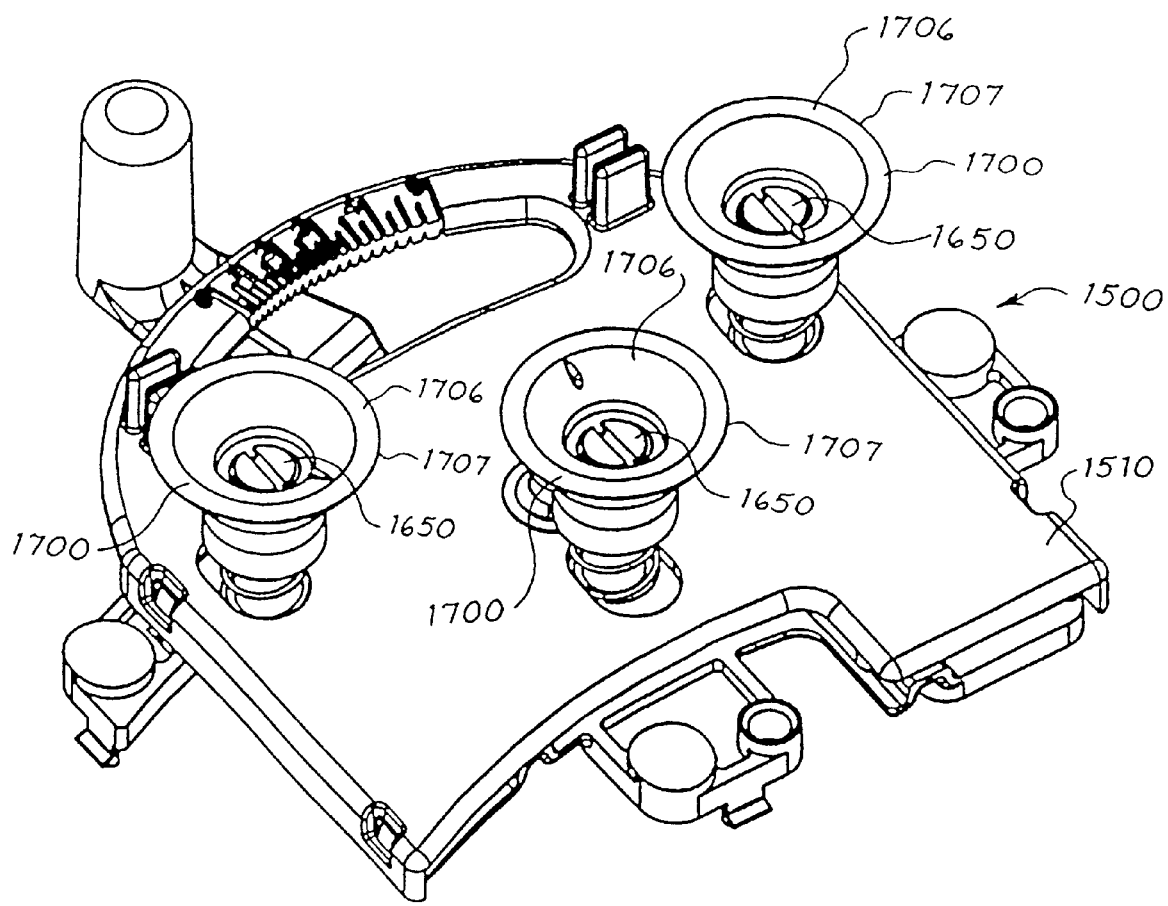
FIG. 65 is a front perspective view of the singulator assembly illustrated in FIG. 64.
Figure 66:
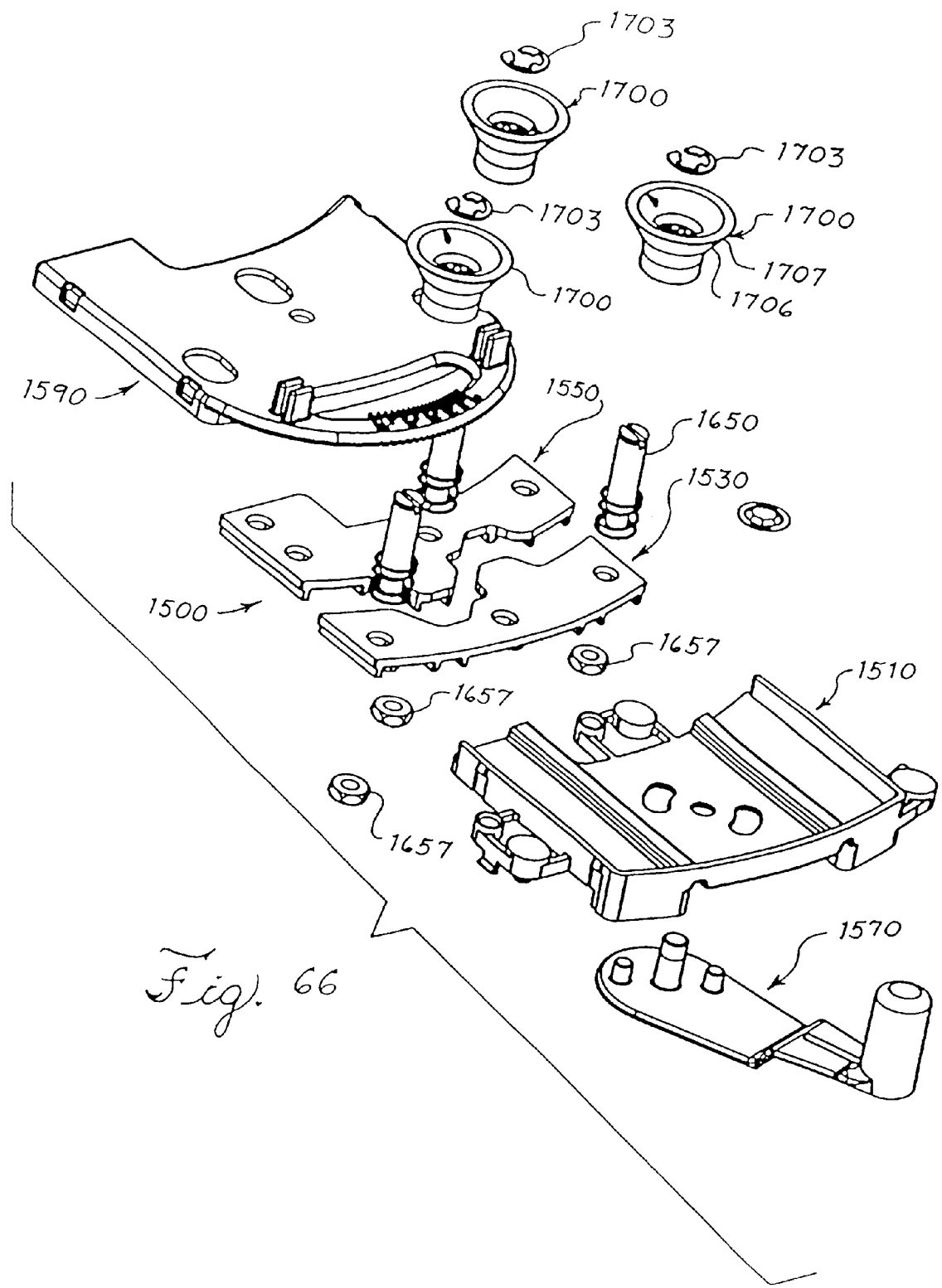
FIG. 66 is an exploded perspective view of the singulator assembly illustrated in FIG. 65.

An alternative embodiment of a singulator assembly 1500 is shown in FIGS. 64 through 76. In particular, FIG. 64 illustrates the seed metering mechanism of the present invention including the singulator assembly 1500. The singulator assembly 1500 is shown assembled in FIG. 65, while FIG. 66 illustrates an exploded perspective view of the singulator assembly 1500. The various components of the singulator assembly are more fully illustrated in FIGS. 67 through 76 and explained in more detail below.

Figure 67:
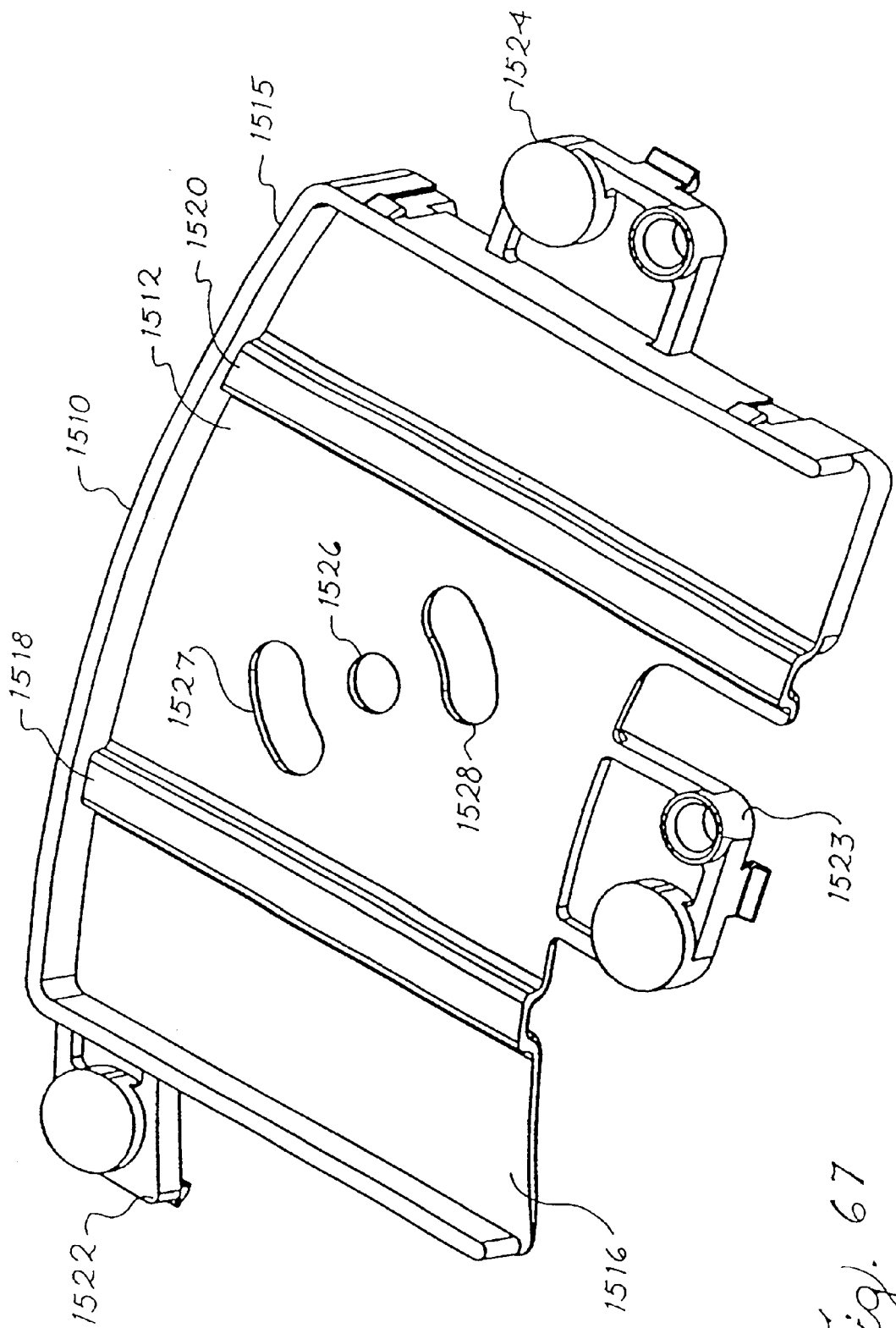
FIG. 67 is a front perspective view of an alternative embodiment of a base of the singulator assembly.
Figure 68:
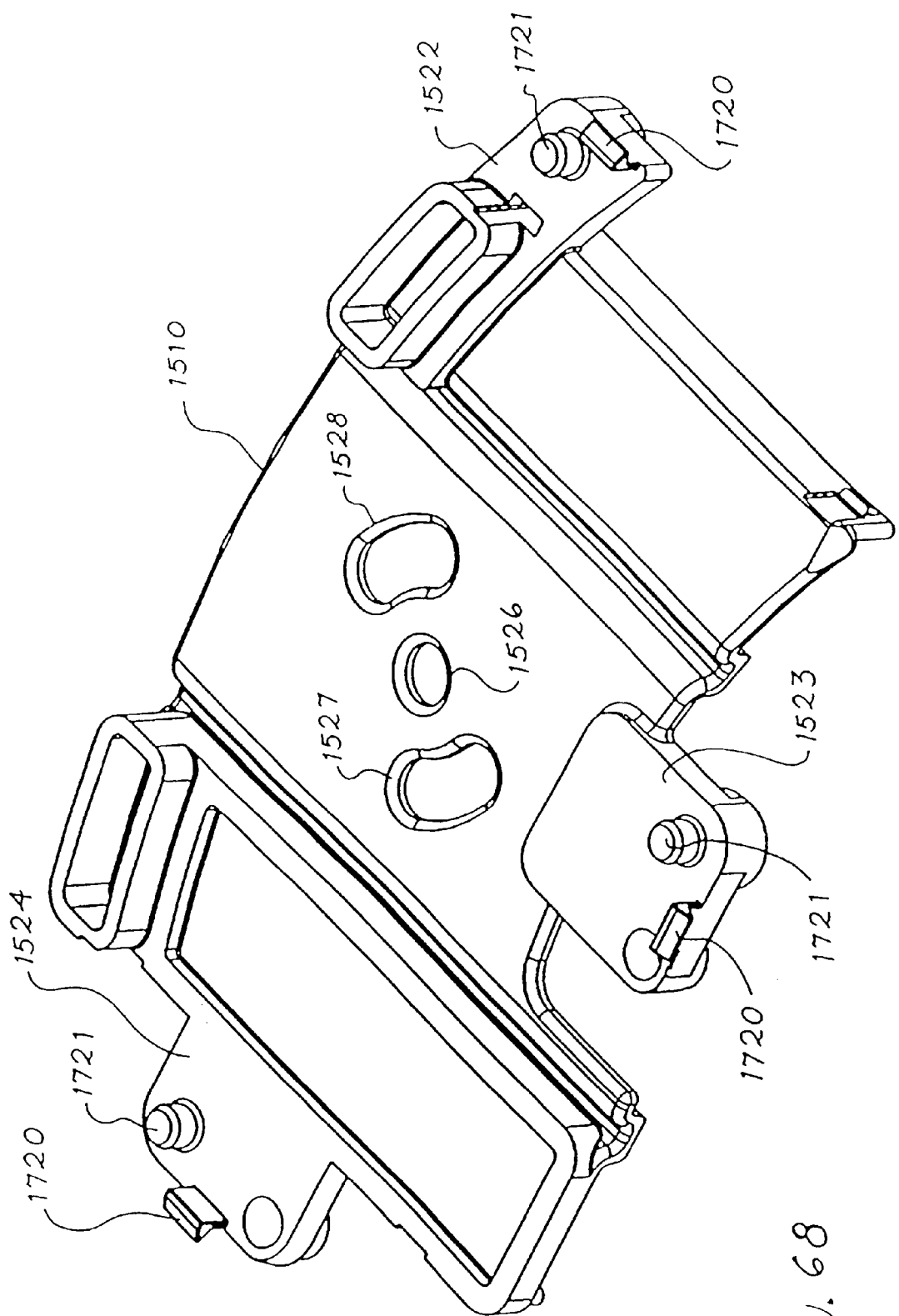
FIG. 68 is a back perspective view of the base illustrated in FIG. 67.
Figure 69:
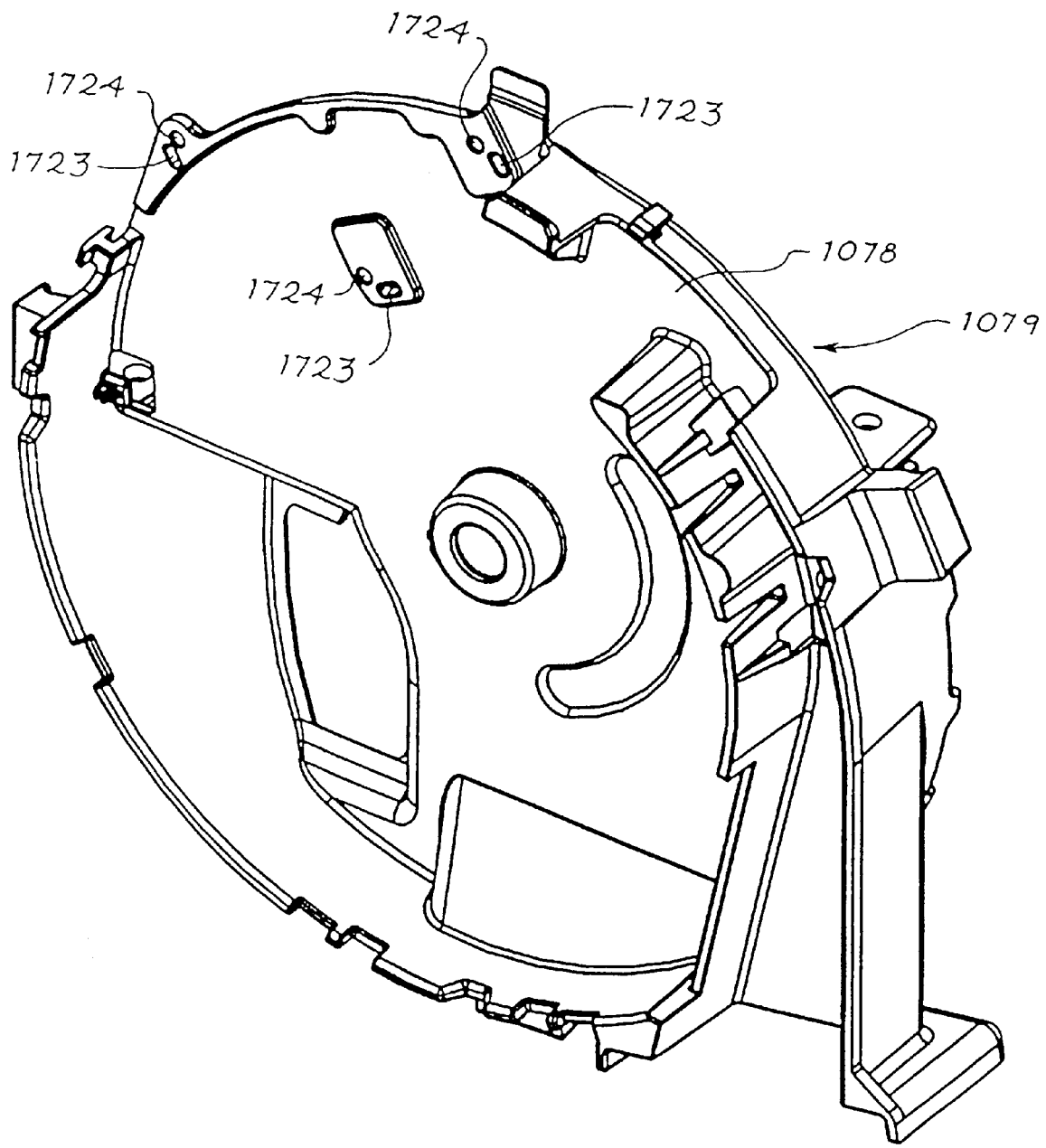
FIG. 69 is a perspective view of one embodiment of the housing.

FIGS. 67 and 68 illustrate an alternative embodiment of the base 1510 of the singulator assembly 1500 shown in FIG. 67. In the embodiment shown in FIGS. 67 and 68, the base 1510 includes a plurality of flanges 1522, 1523 and 1524 which extend outward from the base 1510. The flanges 1522, 1523 and 1524 are preferably integrally formed with the base 1510. It will be appreciated, however, that flanges 1522, 1523 and 1524 which are independently formed relative to the base 1510 would equally suffice. As shown in FIG. 68, each flange 1522, 1523, and 1524 includes a protrusion 1720 which projects from the flange. As shown in FIG. 68, each flange 1522, 1523 and 1524 further includes a locator pin 1721. In the embodiment shown in FIG. 69, a backwall 1078 of a housing 1079 defines a plurality of slots 1723 which are complementary in shape and size to the protrusions 1720 on each of the flanges 1522, 1523 and 1524. As shown in FIG. 69, the backwall 1078 of the housing 1079 further defines a plurality of apertures 1724 which are complementary in shape and size to the locating pins 1721. Thus, to releasably affix the base 1510 to the backwall 1078 of the housing 1079, the base 1510 is preferably snap-fit to the backwall 1078. In particular, the protrusions 1720 are inserted into the complementary slots 1723 in the backwall 1078, while the locating pins 1721 are inserted into the complementary apertures 1724 in the backwall 1078.

One embodiment of the bracket 530 is shown in FIGS. 34 through 36. As shown, bracket 530 includes a slidable member 532 that is preferably formed from hard plastic or nylon and is configured to slidably fit for vertical movement within the recess or opening 516 of base 510. Bracket member 532 includes a top surface 534 and a bottom surface 536. A pair of vertically disposed and horizontally spaced channels 538 and 540, respectively, are provided and extend along the bottom surface 536 of the bracket member 532. Notably, the size and spacing of the channels 538 and 540 are complementary to the size and spacing of the rails 518 and 520 on the base 510. Bracket member 532 further defines a plurality of horizontally spaced and internally threaded recesses 542, 544 and 546. The threaded recesses 542, 544 and 546 defined by bracket 532 are located in circumferentially spaced relation relative to each other on a common line of centers or a radius which is generally equal to the radius about which the holes or apertures 410 in the seed disc 400 are disposed. Bracket 532 further defines an elongated generally horizontal slot or opening 548 that passes between and opens to both the top and bottom surfaces 534 and 536, respectively, of the bracket member 532.

Figure 70:
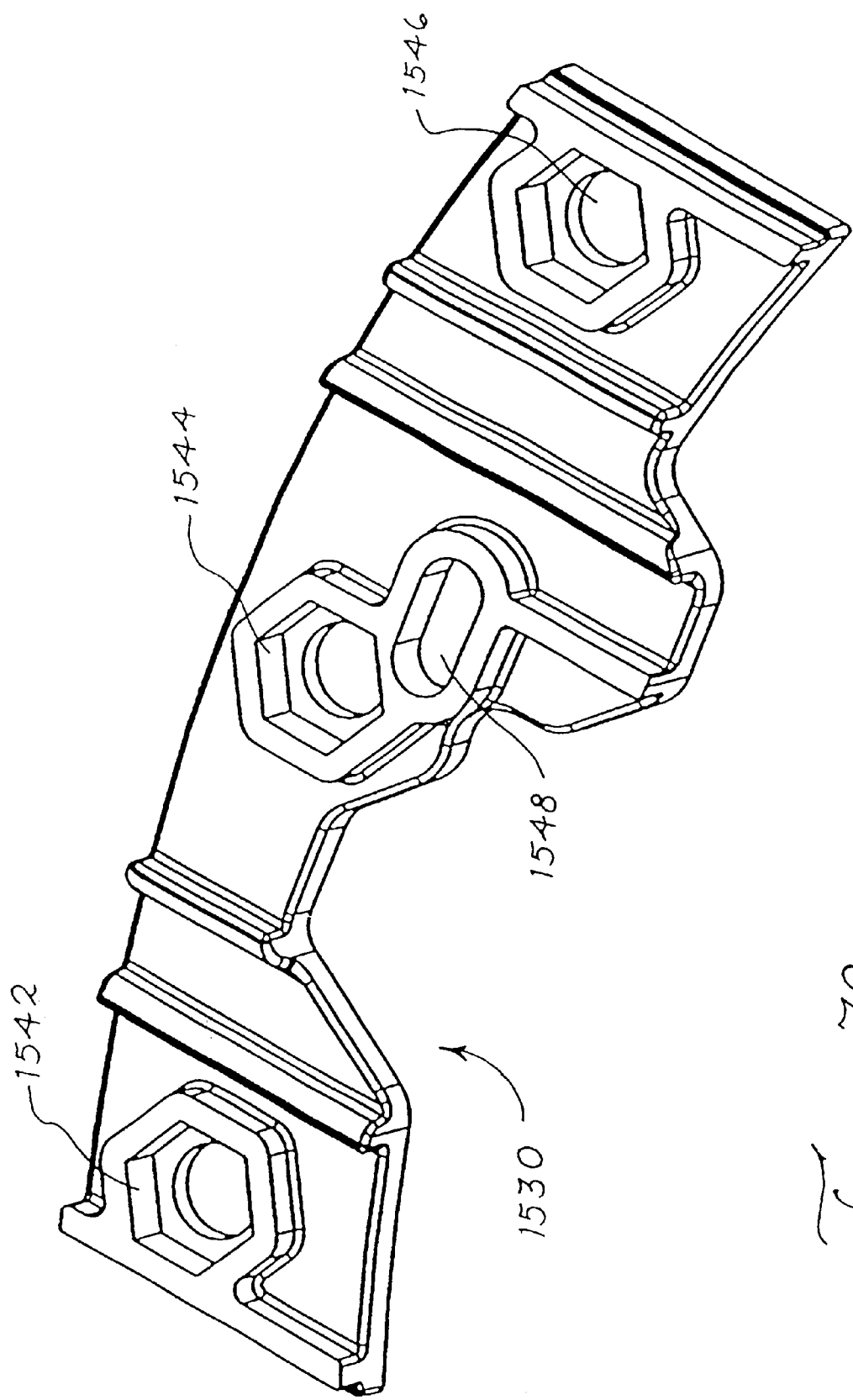
FIG. 70 is a perspective view of an alternative embodiment of a bracket of the singulator assembly of the present invention.

FIG. 70 illustrates an alternative embodiment of a bracket 1530. The bracket 1530 includes a plurality of horizontally spaced recesses 1542, 1544 and 1546. As shown in FIG. 66, a plurality of metal inserts 1657 which are threaded are provided to be inserted into and retained in the recesses 1542, 1544, 1546 of the bracket 1530. Preferably, the metal inserts 1657 are nuts.

One embodiment of the bracket 550 is shown in FIGS. 37 through 39. As shown, bracket 550 includes a slidable member 552 that is preferably formed from hard plastic or nylon and is configured to slidably fit for vertical movement within the recess or opening 516 of base 510 in vertically disposed relation to bracket 530. Bracket member 552 includes a top surface 554 and a bottom surface 556. A pair of vertically disposed and horizontally spaced channels 558 and 560, respectively, are provided and extend along the bottom surface 556 of the bracket member 552. Notably, the size and spacing of the channels 558 and 560 are complementary to the size and spacing of the rails 518 and 520 on the base 510. Bracket member 552 further defines a plurality of horizontally spaced and internally threaded recesses 562, 564 and 566. The threaded recesses 562, 564 and 566 defined by bracket 552 are likewise located on a common radius which is generally equal to the radius about which the holes or apertures 410 in the seed disc 400 are disposed. Bracket 552 further defines an elongated generally horizontal slot or opening 568 that passes between and opens to both the, top and bottom surfaces 554 and 556, respectively, of bracket member 552.

Figure 71:
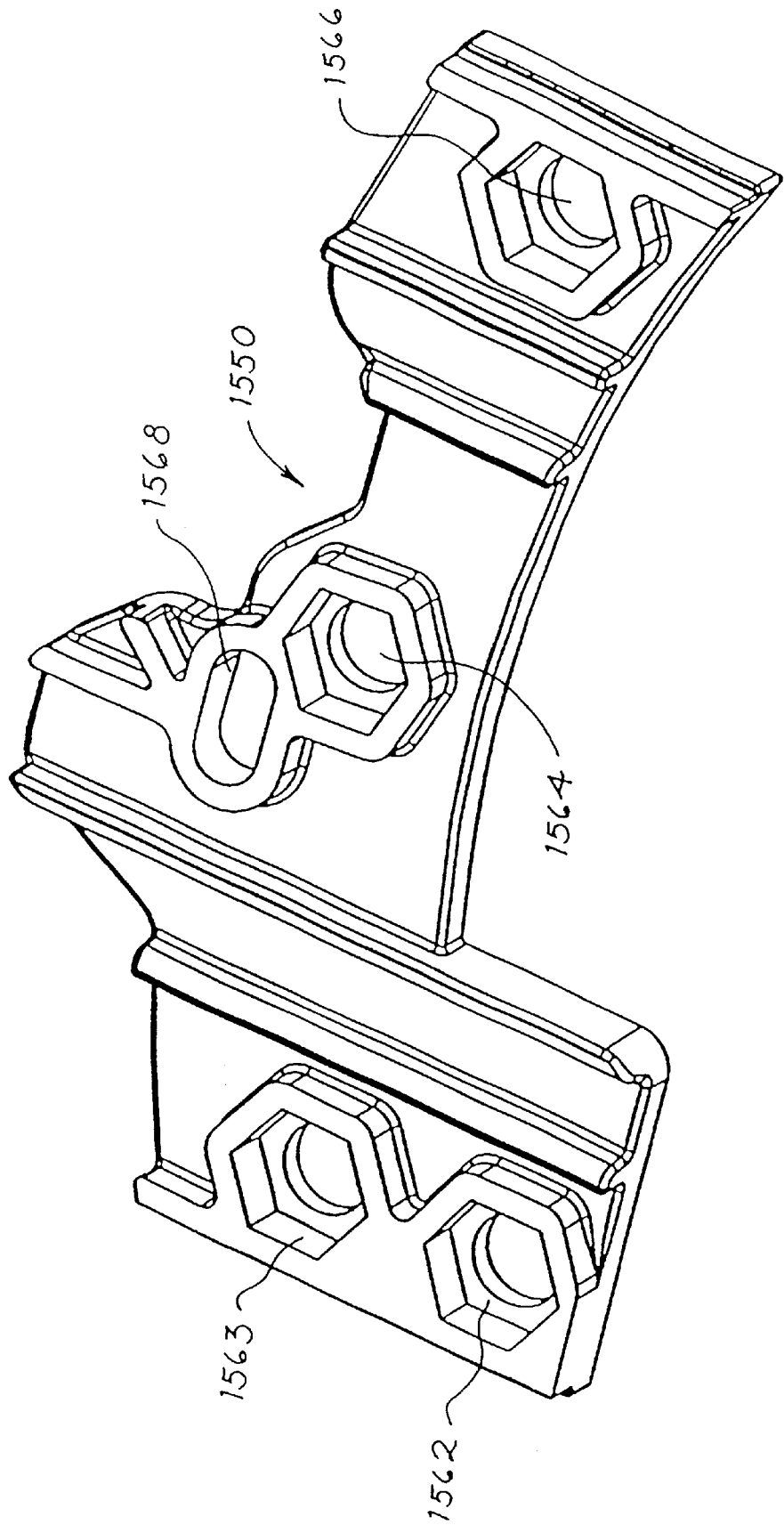
FIG. 71 is a perspective view of an alternative embodiment of a second bracket of the singulator assembly of the present invention.

FIG. 71 illustrates an alternative embodiment of a bracket 1550. The bracket 1550 includes a plurality of horizontally spaced recesses 1562, 1564 and 1566. As shown in FIG. 66, a plurality of metal inserts 1657 which are threaded are provided to be inserted into and retained in the recess 1564 of the bracket 1550. Preferably, the metal insert 1657 is a nut.

One embodiment of the manually operated adjustment mechanism 570 for the singulator assembly is shown in FIGS. 40 through 42. As shown, the adjustment mechanism 570 comprises an elongated lever 572. The lower end of lever 572 is provided with a mounting pin 574 and a pair of actuating pins 576 and 578 disposed in equally spaced relation and on opposite sides of the mounting pin 574. Notably, the mounting pin 574 is preferably formed integral with the lever 572 which is formed from plastic or nylon.

With the brackets 530 and 550 arranged in the enclosure 516 defined by base 510, the lever 572 is arranged on the backside 513 of the base 510 and the mounting pin 574 is inserted endwise through the opening 526 in the base 510. Notably, the diameter of the mounting pin 574 is substantially equal to the diameter of the hole or opening 526 in the base 510 such that the lever 572 is permitted to pivotally move and rock about an axis 575 defined by the mounting pin 574. Similarly, the actuating pins 576 and 578 on the lever 572 project endwise through the arcuate slots 527 and 528, respectively, of the base 510. As such, the actuating pin 576 on lever 572 projects into the slot or opening 548 defined on bracket 530 while actuating pin 578 projects into the slot or opening 568 defined on bracket 550. As will be appreciated by those skilled in the art, this arrangement allows the brackets to vertically move toward and away from each other along the rails 518 and 520 defined in the enclosure 516 of base 510 in response to manual pivotal or rocking movement of the lever 572 about the axis 575. To facilitate movement of the lever 572, the upper end of lever 570 is provided with a handle 580 that projects generally normal to the handle or lever 72 to readily allow manual manipulation of the handle or lever 570.

Figure 43:
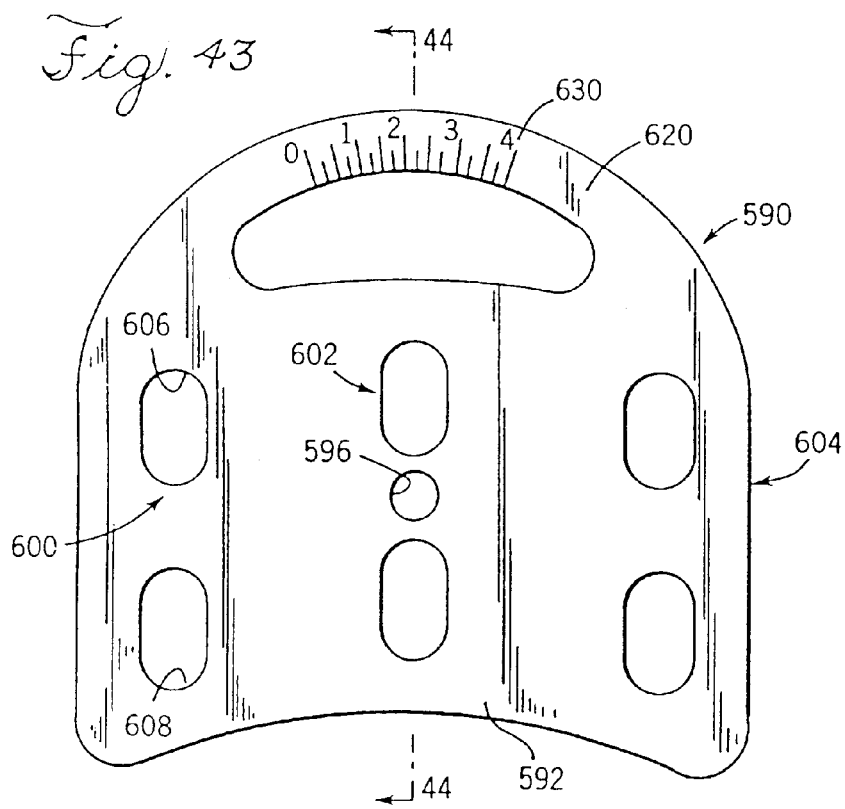
FIG. 43 is a side view of a cover forming part of the singulator apparatus of the present invention.
Figure 44:
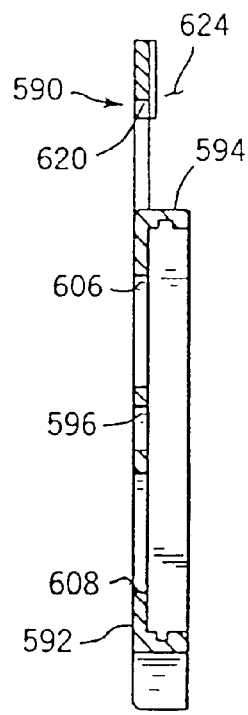
FIG. 44 is a sectional view taken along line 44—44 of the cover illustrated in FIG. 43.

One embodiment of the cover 590 for the singulator assembly 500 is schematically illustrated in FIGS. 43 and 44. The cover 590 preferably includes a generally rectangular front wall 592 having a closed rim 594 extending about the peripheral edge thereof. Notably, the configuration of the front wall 592 and the rim 594 closely proximates if not corresponds to the configuration of the back wall 512 and closed rim 514 on base 510. Cover 590 furthermore includes a central throughbore or opening 596 that is adapted to resiliently receive the free end of the mounting pin 574 of lever 572. Preferably, the free end of the mounting pin 574 is configured to resiliently fit through the opening 596 in the front wall 592 of cover 590 in a manner securing the front wall 592 of cover 590 to the base 510 without use of further fasteners and yet allowing access to the interior of the singulator assembly when required.

Cover 590 further defines a plurality of vertically aligned and horizontally spaced pairs of openings 600, 602 and 604. Each vertically aligned pair of openings 600, 602 and 604 comprises two vertically. elongated slots 606 and 608. As will be appreciated, the horizontal spacing between the pairs of openings 600, 602 and 604 is equal to the horizontal spacings between the threaded recesses 542, 544 and 546 of bracket 532 and the recesses 562, 564 and 566 of bracket 552. As will be appreciated, the elongated configuration of the openings 600, 602 and 604 allows for vertical displacement of the brackets 530 and 550 within the recess 516 of the base 510.

Figure 72:
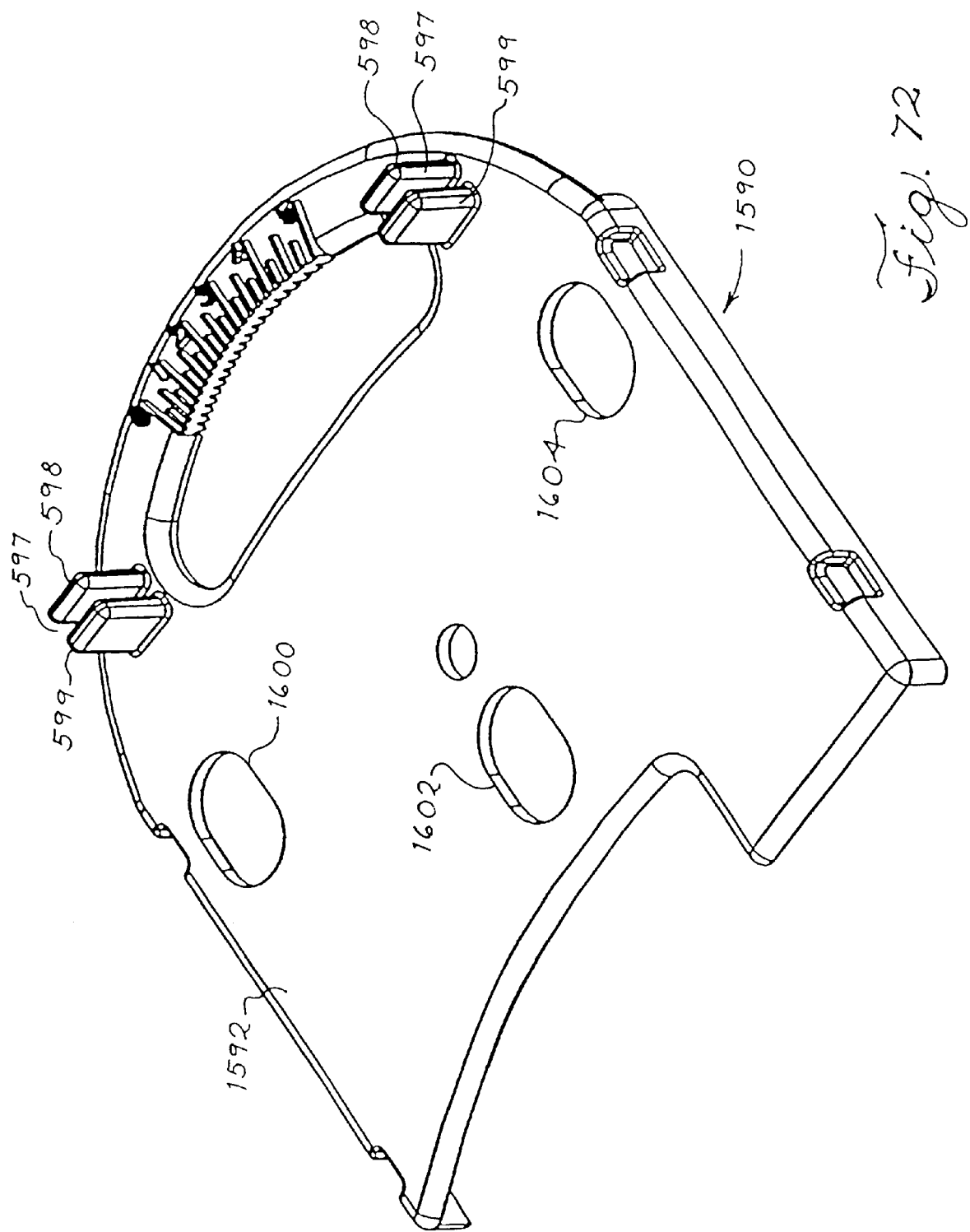
FIG. 72 is a perspective view of an alternative embodiment of the cover of the singulator assembly of the present invention.

FIG. 72 illustrates an alternative embodiment of the cover 1590. The cover 1500 defines a plurality of openings 1600, 1602 and 1604. As will be appreciated, the spacing between the openings 1600, 1602 and 1604 corresponds to the spacing between recesses 1542, 1546 of the bracket 1530 shown in FIG. 70 and the recess 1564 of the bracket 1550 shown in FIG. 71. The elongated configuration of the openings 1600, 1602 and 1604 allows for vertical displacement of the brackets 1530 and 1550 within the cavity of the base.

Moreover, in the alternative embodiment shown in FIG. 72, the cover 1590 includes a plurality of guides 597. The guides 597 are utilized to retain a meter screen 780, which is shown in FIG. 64. As shown in FIG. 72, each guide 597 includes a pair of projections 598, 599 which extend outward from the front wall 1592 of the cover 1590. The projections are sized and shaped to hold a meter screen 780. The meter screen 780 is provided to insure that seeds do not exit out of the housing of the seed metering mechanism. In particular, the agitator assembly of the present invention, as it agitates seeds in the seed reservoir, may cause seeds to fly up toward the top of the housing. If this occurs, the meter screen 780 shown in FIG. 64 prevents seeds from exiting the top of the housing by blocking seeds from exiting the top of the housing. Preferably, the meter screen 780 is formed of a plastic material. In addition, the projections 598, 599 shown in FIG. 72, are formed of a plastic material. Furthermore, each projection 598 is generally rectangular in shape and is positioned in a close relationship to its paired projection 599 such that the distance between the projections 598, 599 is proximate enough to retain the meter screen 780 within the projections 598, 599. The projections 598, 599 are preferably independently formed relative to the cover 590. It will be appreciated, however, that projections 598, 599 which are integrally formed with the cover 590 would equally suffice.

As shown in FIG. 72, the cover includes two guides 597, with each guide 597 having its own pair of projections 598, 599. Thus, in this embodiment, the meter screen 780 is slid or pushed through one guide 597 (with its projection 598, 599) into the second guide 597 (with its projections 598, 599). As shown in FIG. 72, two guides 597 are preferably used as part of the singulator assembly. It will be appreciated, however, that additional guides 597 may be formed on the cover 1590 to be utilized to retain the meter screen 780.

Cover 590 furthermore defines a generally vertical upstruck and arcuate bracket 620 that is generally coplanar with the top surface 622 of the cover 590. Notably, the bracket 620 has a relatively thin construction and thus a void or space 624 is provided on the rear side of the bracket 620. It is within this space or void 624 wherein the upper end of the lever 572 moves. Moreover, the bracket 620 is configured such that the handle 590 of lever 572 can extend thereover. Additionally, the top surface of the bracket 620 has indicia 630 thereon for readily providing a visual indication of the position of the lever 572.

Figure 45:
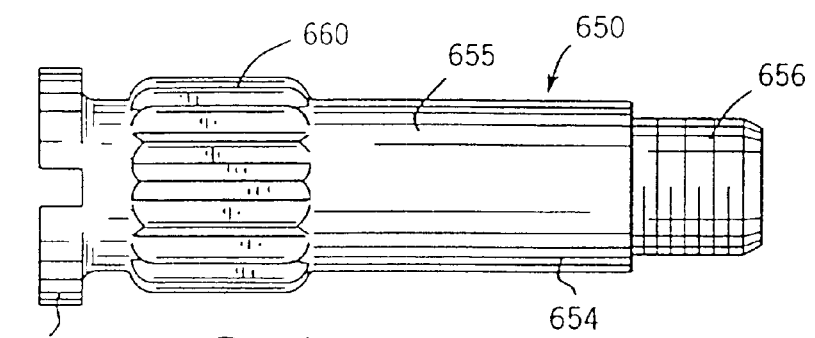
FIG. 45 is an elevational view of a spool stud forming part of the singulator apparatus shown in FIGS. 29 and 30.
Figure 46:
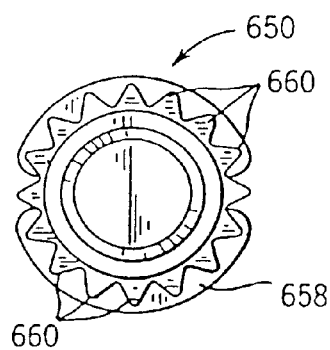
FIG. 46 is an end view of the spool stud shown in FIG. 45.

The singulator assembly 500 further comprises a series of mounting studs 650 on which the singulator spools 700 are mounted. An exemplary form of stud 650 for mounting a single singulator spool 700 to the singulator assembly 500 is shown in FIGS. 45 and 46. As shown, each stud 650 comprises an elongated member 654 having a shank portion 655 with a shouldered and externally threaded end 656 and an enlarged head portion 658 at an opposite end thereof. Preferably, each stud member 654 is formed of metal. In the illustrated embodiment, each stud 650 is provided with a series of axially extending external splines 660 axially extending from the head portion 658 of each stud for about one-half the length thereof. Each stud 650 is provided with 4, 6, 8, 12 or more splines 660 as desired. Notably, the outside diameter of the stud member 654 is sized such that it is permitted to endwise pass through the vertically elongated slots 606 and 608 comprising each pair of openings 600, 602 and 604 in the cover 590 of the singulator assembly 500. Moreover, the external threading at end 656 of each stud member 654 corresponds to the internal threading or a metal insert (nut) within the recesses 542, 544 and 546 of bracket 530 (FIGS. 34 through 36) and within the recesses 562, 564 and 566 of bracket 550 (FIGS. 37 through 39). Furthermore, it should be noted that the axial length of each spool member 702 is less than the axial distance separating the enlarged head portion 658 and the external threading 656 of each spool mounting stud 650.

Figure 73:
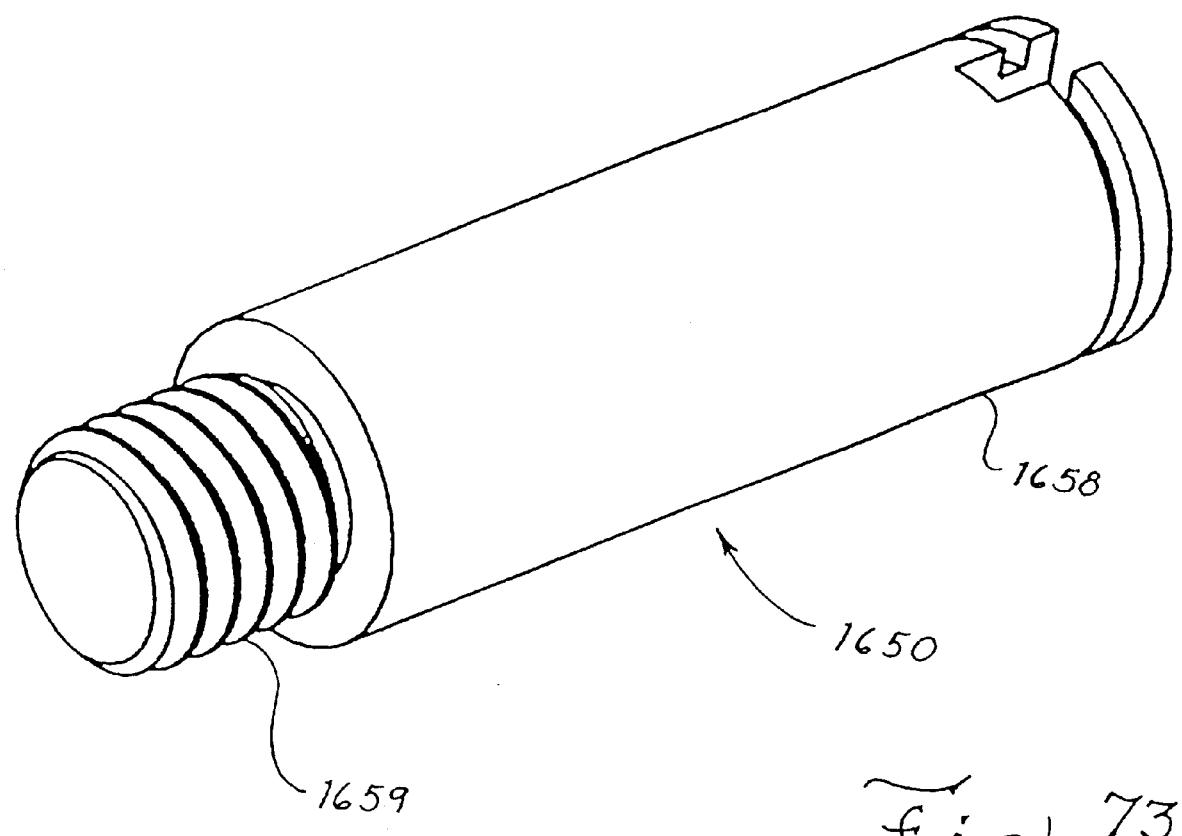
FIG. 73 is a perspective view of an alternative embodiment of a mounting stud of the singulator assembly of the present invention.

FIGS. 73 through 76 illustrate an alternative embodiment of the mounting studs 1650 and the singulator spools 1700 of the present invention. As shown in FIG. 73, each stud 1650 is comprised of a shank portion 1658 with an externally threaded end 1659. Preferably, each stud 1650 is formed of metal. More preferably, each stud 1650 is formed of brass. Notably, the outside diameter of the stud 1650 is sized such that it is permitted to endwise pass through the openings 1600, 1602 and 1604 in the cover 1590 shown in FIG. 72. Moreover, the external threading at end 1659 of each stud 1650 corresponds to the metal inserts 1657 (see FIG. 66) which are inserted into the recesses 1542, 1546 of the bracket 1530 shown in FIG. 70 and within the recess 1564 of the bracket 1550 shown in FIG. 71. As stated above, the metal inserts 1657 are preferably nuts which are inserted into the recesses 1542, 1546 of the bracket 1530 and recess 1564 of the bracket 1550 and are sized and shaped to be retained therein. Thus, in order to retain the studs 1650 to the brackets 1530, 1500, the threaded end 1659 of each stud 1650 is threadably connected to the metal inserts 1657. The studs 1650 are thus removably threaded to the brackets 1530, 1550. Therefore, when the studs wear and need to be replaced, the worn studs may be removed and replaced by new studs.

An exemplary form of singulator spool 700 is schematically illustrated in FIGS. 47 through 50. As shown in FIG. 47, each singulator spool 700 comprises an elongated preferably metal tubular member 702 defining a longitudinal axis 704 which, when mounted to the seed metering mechanism, extends generally normal or perpendicular to the sides of the seed disc 400. In the illustrated embodiment, and at that end 706 of each spool disposed closely adjacent the seed disc 400 during operation of the seed metering mechanism, each spool member 702 preferably has a seed engaging portion projecting radially outwardly from the remainder of the spool. As shown, each spool member 702 preferably has a flared or frusto-conical seed engaging or surface configuration extending away from a planar bottom surface 707 defined by the spool member 702. As shown in FIGS. 47, 49 and 50, the flared profile at the free end 706 of each spool 700 increases in diameter toward end 706. Moreover, and as shown in FIGS. 47, 49 and 50, the bottom planar edge 707 of the spool 700 and the flared end 706 intersect with each other to define a relative sharp edge 709 extending about the periphery of the spool 700.

The singulator spool members 702 may be comprised of aliphatic polyketones including, for example, Carilon® polymers manufactured by the Shell Chemical Company.

As shown in FIG. 48, the peripheral edge 710 of the free end 706 of spool member 702 has a changing or eccentric profile relative to the longitudinal axis 704 of the spool member 702. That is, the seed engaging portion of each arcuate segment of the edge 710 of the enlarged free end of the spool member 702 is disposed at different radial distance from the longitudinal axis 704 of the spool member 702. The changing or eccentric profile allows or permits a changing circumferential surface area of the seed deflector portion of each spool 700 to be selectively positioned relative to the predetermined path of travel of the openings thereby changing the spacing of the seed deflector relative to the fixed path of travel of the openings 410 in the seed disc 400 and relative to each other. In this regard, and as shown in FIG. 47, the spool member 702 has a locating mark 703 thereon for providing a visual indication of the setting of the seed deflector 706 relative to the fixed path of travel of the seeds carried by the disc 400. In the illustrated embodiment, the locator or indicating mark 703 is provided adjacent or on the seed engaging surface portion of the seed deflector. It will be appreciated, however, that the locating or indicating mark can be provided elsewhere on the spool 700 without detracting or departing from the spirit and scope of the present invention.

As shown in FIGS. 49 and 50, each spool member 702 further defines an opening 712 extending axially through the spool member 704. As will be appreciated, rather than providing the peripheral edge 710 of the seed contacting surface eccentric relative to the axis 704 of the spool, it is also within the spirit and scope of the present invention to provide the opening 712 in eccentric relationship relative to the spool member. At the flared end 706, the opening 712 in each spool member 704 has an enlarged counterbore portion 714 that is sized to accommodate the enlarged head portion 658 of the mounting stud 650 (FIGS. 45 and 46). The counterbore portion 714 of opening 712 is recessed or has a depth that allows the spool to be endwise moved without exposing the head portion 658 of the spool mounting 650 therebeyond. Because the enlarged counterbore portion 714 and the opening 712 are of different diameters, a radial wall or annular shoulder 713 is defined therebetween. Upon assembly, the enlarged head portion 658 engages with the annular shoulder 713 thereby limiting movement of the spool 700 relative to side of the seed disc 400. As mentioned, the overall length of the spool member 702 is less than the length of the mounting stud 650 thereby allowing axial or endwise displacement of the spool member 702 along the length of the stud 650. In this regard, a lengthwise portion of the opening 710 is provided with a series of internal splines 720 that are engagable with the external splines 660 on each mounting stud 650 for holding the seed engaging portion of the respective spool 700 in releasably fixed relation relative to the axis of rotation 704.

As mentioned above, the end 706 of each spool 700 has a flared or frusto-conical configuration. The slanted or angular configuration at the free end 706 of the spool 700 changes as a function of the angular orientation of the slanted surface relative to the longitudinal axis 704 of the spool 700. That is, the angular orientation of the flared end 706 of spool 700, in the area shown by lines 49—49 in FIG. 48, is equal to about a 45 degree angle relative to the planar bottom edge of the spool 700. In contrast, the angular orientation of the flared end 706 of spool 700, in the area shown by lines 50—50 in FIG. 48, may equal about 45 degrees to 50 degrees relative to the planar bottom edge 707 of the spool 700. As will be appreciated, the inclined surface configurations extending about the seed engaging portion of each spool defines an included angle ranging between about 35 degrees and about 70 degrees between the inclined surface configuration and the adjacent face or side of the seed disc 400. Accordingly, different effects or removal forces can be imparted to the seeds carried on the seed plate as a function of which angular orientation of the spool 700 is disposed relative to the seed pocket or opening 410 in the seed plate 400.

As will be appreciated, the changing profile of the free edge 710 allows the disposition of the spool 700 to be manually changed relative to the path of movement of the openings 410 on the seed disc 400 moving therepast. The interaction of the external spline like configurations 660 on the stud 650 and the internal spline like configurations 720 on the spool 700 prevent the spool 700 from turning or rotating relative their respective stud 650. Also, however, it is important to note that the interaction between the splines 660 and 720 allows the angular orientation of the spool 700 to be angularly adjusted as required to effect the necessary action relative to the seeds carried by the seed plate 400 toward the discharge area of the seed metering mechanism 32 of the present invention. It will be readily appreciated, of course, that the opening 710 in the spool 700 can be eccentric relative to the longitudinal axis 704 of the spool member 702 thereby effecting different adjustments of the spool 700 relative to the circular path of travel of the openings 410 in the seed disc 400.

Figure 74:
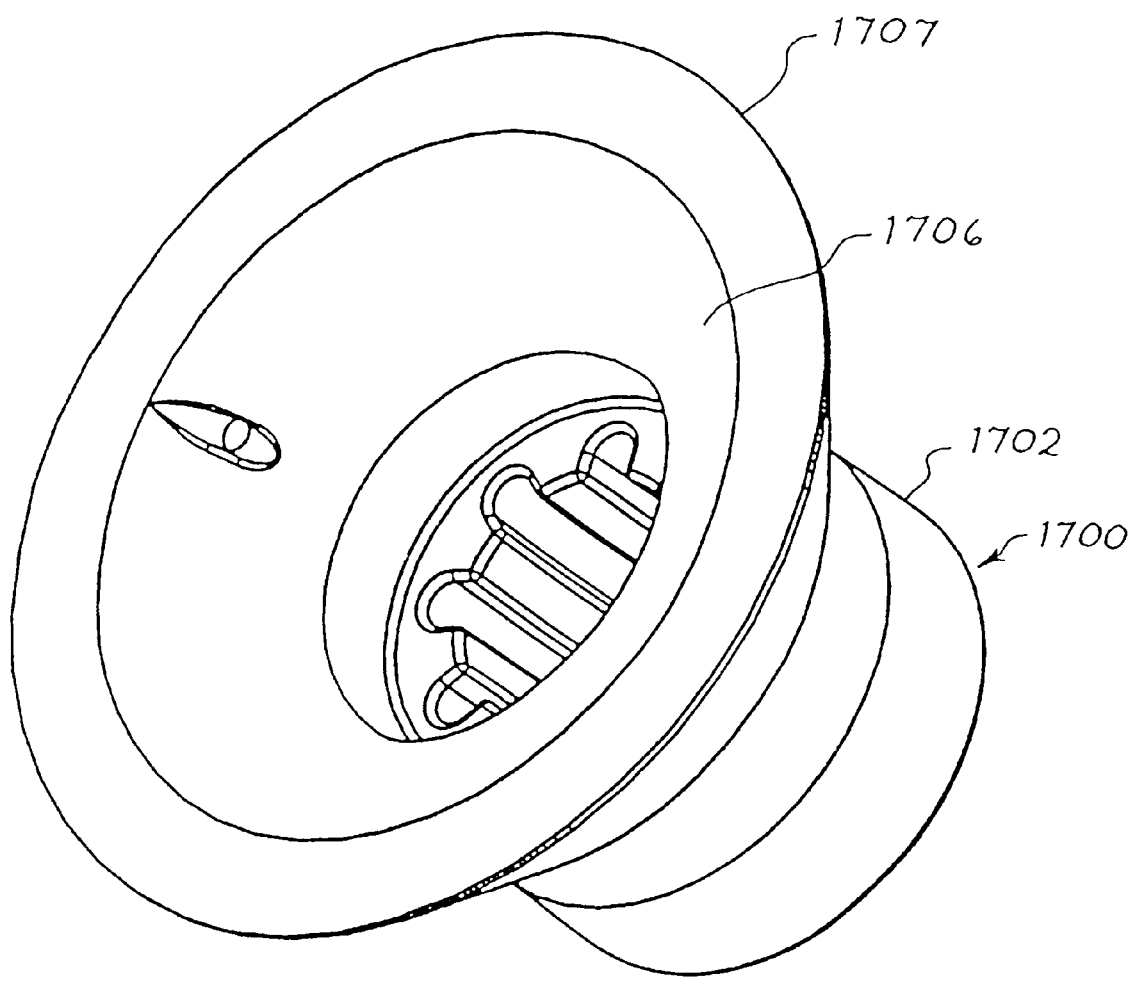
FIG. 74 is a perspective view of an alternative embodiment of singulator spool of the singulator assembly of the present invention.
Figure 75:
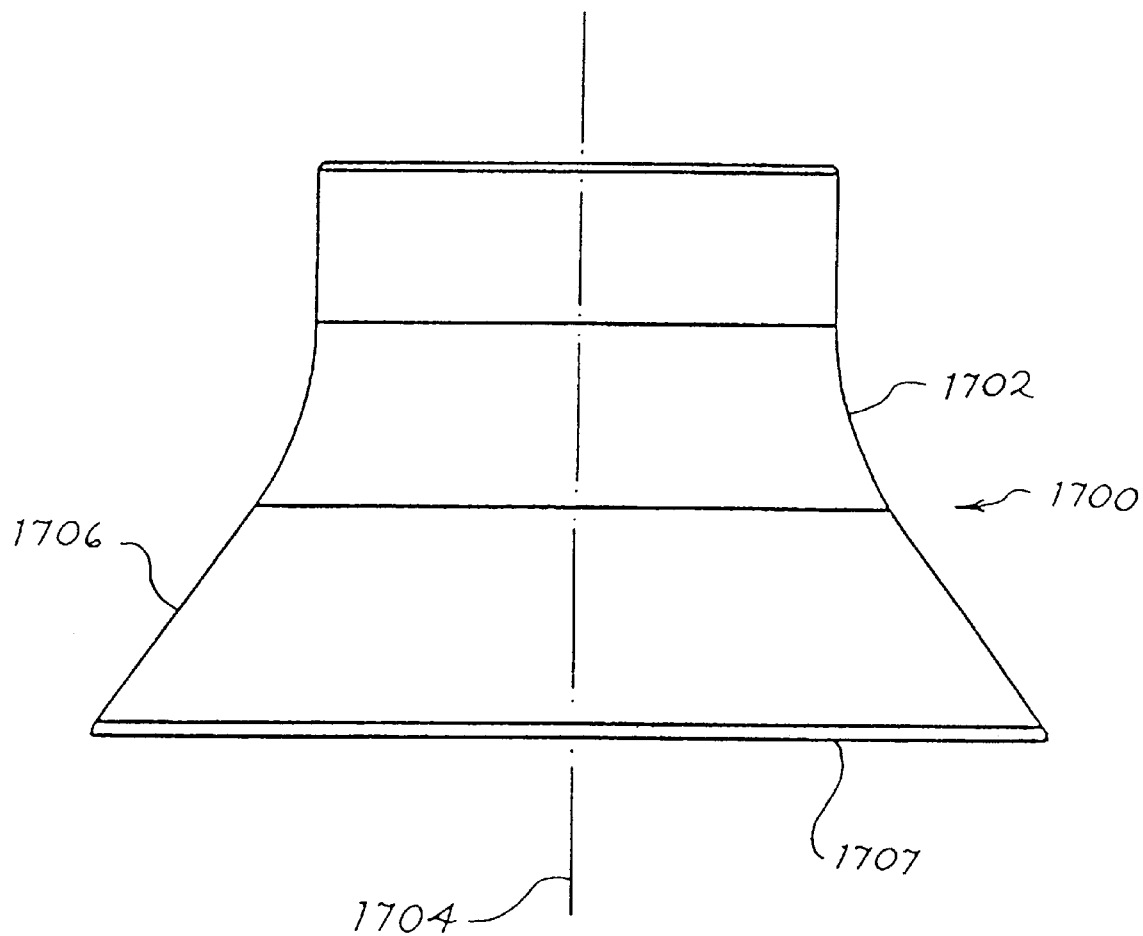
FIG. 75 is a side view of the singulator spool illustrated in FIG. 74.
Figure 76:
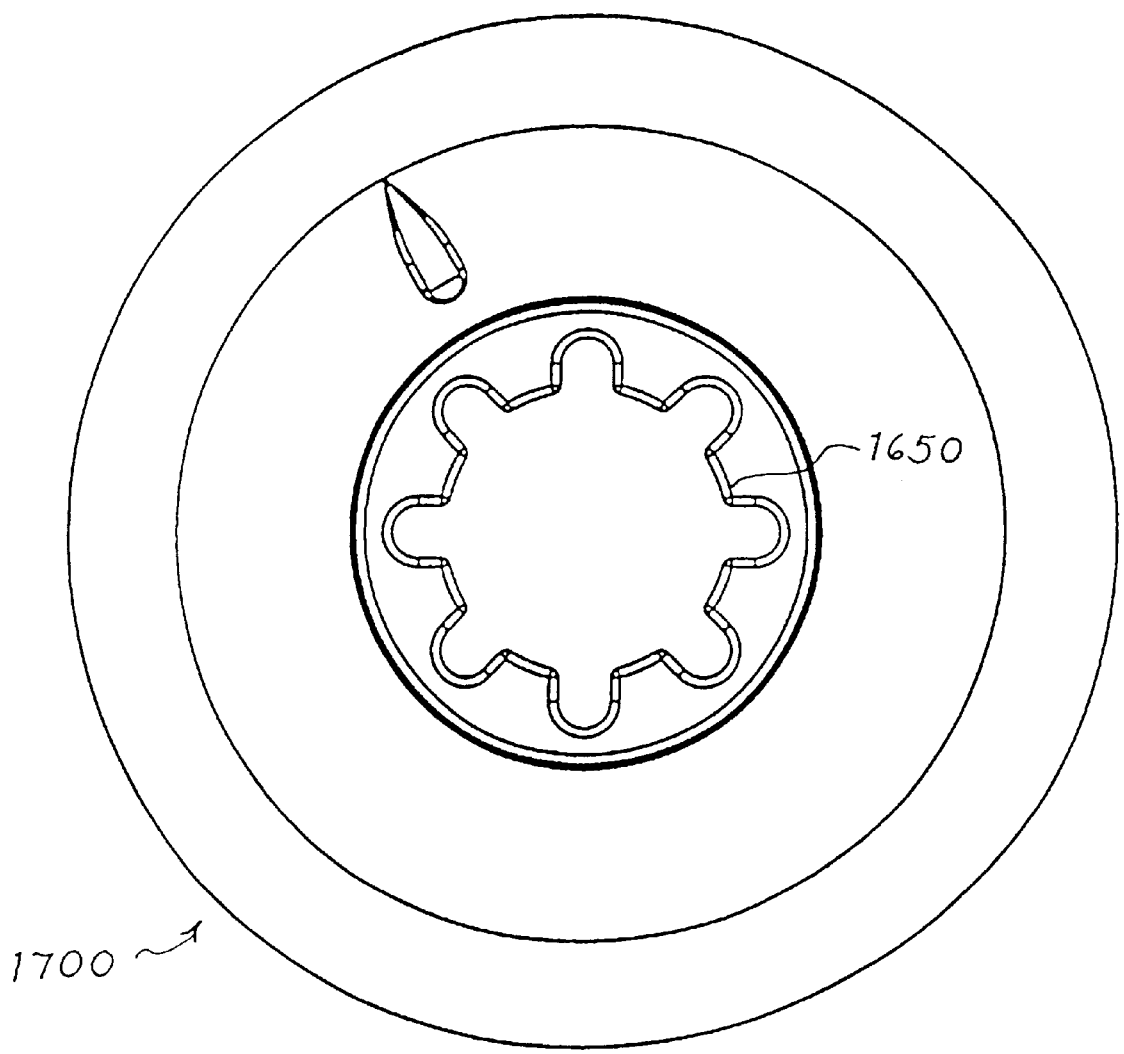
FIG. 76 is a plan view of the singulator spool illustrated in FIG. 74.

An alternative embodiment of the singulator spool 1700 of the present invention is illustrated in FIGS. 74 through 76. As shown, in this embodiment, each spool 1700 is comprised of an elongated tubular member 1702 having a longitudinal axis 1704 which, when mounted to the seed metering mechanism, extends generally normal or perpendicular to the sides of the seed disc. Preferably, the tubular member 1702 is formed of metal. More preferably, the tubular member is formed of a plastic material or nylon. Even more preferably, the tubular member is formed of Carilon® polymers, which is manufactured by the Shell Chemical Company. Additives such as carbon fibers, carbon powder, or stainless steel fibers may be added to the Carilon® polymer to make the spool members 702 resistant to static charge build-up or to make it electrically conducting. Carilon® has been found to provide excellent wear for pressure-velocity and abrasive applications, good dimensional stability, good lubricity, and good seed handling properties. In addition, Carilon® has similar properties to nylon, but, unlike nylon, Carilon® does not swell when subjected to moisture and thus Carilon® has more dimensional stability than nylon. As shown in FIGS. 65 and 66, each spool 1700 is mounted on a respective mounting stud 1650 (shown in FIG. 73) with a retaining ring 1703 retaining the spool 1700 onto the stud 1650. The spools 1700 are thus removably attached to the studs 1650. Therefore, when the spools 1700 wear and need to be replaced, the worn spools may be removed and replaced by new spools.

In the embodiment shown in FIGS. 65, 66, and 74 through 76, at the end of the spool 1700 that is disposed closely adjacent to the seed disc during operation of the seed metering mechanism is the bottom edge 1707. At the bottom edge 1707, each spool member 1702 preferably has a seed engaging portion 1706 which projects radially outward from the remainder of the spool 1700. As shown, each spool member 1702 has a flared or frusto-conical seed engaging portion 1706 which extends away from a planar bottom edge 1707 defined by the spool member 1702. In addition, the flared portion 1706 of each spool 1700 increases in diameter toward the bottom edge 1707.

Therefore, in the embodiment shown in FIGS. 65, 66, and 74 through 76, the flared portion 1706 of the spool 1700 serves to perpendicularly lift and remove unwanted multiples of seeds from the seed disc 400 such that gravity can act thereon and return the multiple seeds to the seed reservoir of the seed metering mechanism 32. Moreover, the flared portion 1706 on each spool member 1700 also disrupts and gently separates a multiplicity of seeds that are held together on one seed hole in the seed disc thereby allowing the multiple seeds to fall under the influence of gravity and return to the seed reservoir of the seed metering mechanism 32.

When assembled to the seed metering mechanism, each spool 1700 is arranged such that the flared end 1706 extends into the path of travel of the seed apertures. In a preferred form of the invention, each spool 1700 is adjusted such that the flared end 1706 covers approximately one-half of the diameter, or less, of each aperture 410 of the seed disc 400. In another preferred form of the invention, each spool 1700 is adjusted such that the flared end 1706 covers approximately one-third of the diameter, or less, of each aperture 410 of the seed disc 400.

In the embodiment of a spool 1700 shown in FIGS. 74 through 76, the inner diameter of the spool 1700 is cylindrical or round. In this manner, the spools 1700 may spin on the mounting studs 1650 shown in FIG. 73. Because the inner diameter of the spools 1700 are cylindrical, the wear between the spools 1700 and the seed disc will be spread over a larger surface area. In addition, in this embodiment, because the inner diameter of the spools 1700 are cylindrical, the spools 1700 do not have a changing profile relative to the path of travel of the openings in the seed discs. Therefore, the singulator assembly 1500 is not adjusted by turning or rotating the singulator spools 1700 relative to its mounting stud 1650. Instead, the only adjustment of the singulator assembly 1500 in this embodiment is through the use of the handle to move the brackets 1530 and 1550 that carry the singulator spools 1700 with respect to the base 1510. This allows the operator to adjust for seeds having different shapes and sizes to vary the spool configurations.

Returning to FIG. 30, each spool 700 is mounted on a respective mounting stud 650 as shown. Notably, however, there is further provided a compression spring 760 or other form of resilient means for resiliently urging the spool axially outward and away from the cover 590 toward the seed disc 400. As such, the planar bottom surface of the spool 700 is resiliently urged toward an adjacent relationship with the seed plate 400 and the edge of the spool serves to engage and orient the seeds traveling toward the discharge area of the seed metering mechanism 32. The spring 760 furthermore allows the spool to be axially displaced against the action of the spring 760 until the cooperative instrumentalities, which in the illustrated embodiment includes the splines 660 on mounting member 650 and the splines 720 of the spool 700, are released from each other thereby allowing rotation of the spool 700 about the axis 714 thereby adjusting the seed engaging surface relative to the predetermined path of the openings 410 on the seed disc 400. As mentioned, the recessed bore 714 is sized to allow for axial displacement of the spool 700 relative to the mounting member 650 without exposing the head portion 658 thereof. After the seed engaging portion of the spool is properly positioned relative to the path of travel of the seed openings 410 in the disc 400, the spool 700 is automatically returned to an operable position wherein the seed engaging portion is disposed adjacent the side of the disc 400 under the influence of the compression spring 760. Thereafter, the cooperating instrumentalities on the mounting member 650 and spool releasably hold the seed engaging portion of the spool in fixed relation relative to the axis 714.

With the present invention, a single singulator spool or up to six singulator spools can be used as part of the singulator assembly 500. As shown in FIG. 29, in a preferred form of the invention, normally two singulator spools 700 will be arranged to one side of the arcuate path of travel of the openings in the seed disc 400 while at least one singulator spool 700 will be arranged on the opposite side of the arcuate path of travel of the openings 410 in the seed disc 400. As will be appreciated from an understanding of the present invention, the singulator assembly 500 offers several degrees of adjustment for orientating the seeds within the pockets or openings 410 of the disc 400 as well as for disengaging surplus seeds from the plate 400. First, the singulator spool 700 may be individually adjusted by turning or rotating the singulator spool 700 relative to its respective mounting stud 650. Thus, different profiles on the singulator spool 700 can be properly orientated relative to the path of travel of the openings between adjacent spools 700.

Alternatively, the singulator assembly 500 can be adjusted through use of the handle 570, to move the brackets 530 and 550 that carry the singulator spools 700. As will be appreciated, movement of the brackets 530 and 550 endwise within the cavity 516 defined by base 510 will move the singulator spools 700 carried by the brackets 530 and 550 relative to the arcuate path of travel of the openings 410 on the seed disc 400 thereby further effecting adjustment of the singulator apparatus 500. To properly adjust the brackets 530 and 550 and the spools 700 carried thereon relative to the fixed path of travel of the openings 410 in the disc 400, the indicia 630 provided on the cover 590 of the singulator apparatus 500 visually guides the operator to adjust the spools 700.

Still another salient feature of the present invention relates to improving the release of the seeds from the seed disc 400 at the discharge area 98 of the seed metering mechanism 32. Testing has revealed that imparting vibrations to the housing assembly 40 of the seed metering mechanism 32 facilitates the release of seeds from the seed plate 400 in the discharge area of the mechanism 32. In this regard, and as shown in FIG. 11, there is preferably provided a mechanism 800 for imparting vibrations to the housing assembly 40. The vibration imparting mechanism 800 can take a myriad of shapes and sizes. Mechanism 800 can be driven in any suitable manner. Preferably, a mechanism that produces vibrations in the range of about 115 hz. to about 135 hz. appears to work well. In the illustrated form of the invention, an electrically operated vibration type mechanism including a housing 802 is securely fastened in and about the seed discharge area 98 of the seed metering mechanism and appears to operate satisfactorily. As will be appreciated, the vibration mechanism 800 can be mounted inside or outside of the housing 40 without departing or detracting from the spirit and scope of the present invention. Moreover, the vibrating mechanism 800 can be secured to the cover 46 to impart vibrations to the housing assembly 40.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A seed planter apparatus comprising:
   a seed meter including a housing assembly, the housing assembly including a cover releasably connected to a shell, the housing assembly including at least one opening formed in the housing assembly adjacent a seed discharge area to promote the release of seeds from a disc rotatably attached to the housing assembly, the disc dividing an interior of the housing assembly to include a vacuum chamber and a seed chamber, the disc including a plurality of openings formed adjacent a periphery of the disc, and wherein the at least one opening formed in the housing assembly comprises a plurality of openings formed through the housing assembly.

2. The planter apparatus of claim 1 wherein the at least one opening is formed through the shell.

3. The planter apparatus of claim 1 wherein the at least one opening is formed in the cover.

4. The planter apparatus of claim 3 wherein the disc includes a center opening to receive an end portion of a rotatable shaft.

5. The planter apparatus of claim 3 wherein the shaft is received in an opening formed in a hub formed in the shell.

6. The planter apparatus of claim 5 wherein the hub is adapted to receive a baffle.

7. The planter apparatus of claim 1 wherein the seeds are partially covered by a singulator spool.

8. The planter apparatus of claim 7 wherein the singulator includes a plurality of spools.

9. The planter apparatus of claim 1 wherein the housing assembly includes an axially extending circumferential wall, the circumferential wall including an opening formed thereon to allow air to flow into the seed chamber.

10. The planter apparatus of claim 9 wherein the opening found in the circumferential wall is covered by a screen.

11. The planter apparatus of claim 1 wherein the seed disc is comprised of aliphatic polyketone.

12. The planter apparatus of claim 1 wherein the cover is comprised of plastic resin.

13. A method of operating a seed planter apparatus comprising the steps of:

providing a housing assembly including a cover releasably connected to a shell, the housing assembly including at least one opening formed in the housing assembly adjacent a seed discharge area, a disc rotatably attached to the housing assembly, the disc dividing an interior of the housing assembly to include a vacuum chamber and a seed chamber, the disc including a plurality of openings formed adjacent a periphery of the disc;

rotating the disc;

holding seeds in the disc openings while the disc openings align with the vacuum chamber for seed and air flow communication therewith;

releasing the seeds from the openings as the disc openings align with the vacuum chamber; and flowing air through the opening formed in the housing assembly to promote the release of seeds from the disc.

* * * * *